(12) United States Patent
MolavianJazi et al.

(10) Patent No.: US 12,526,799 B2
(45) Date of Patent: Jan. 13, 2026

(54) ACKNOWLEDGEMENT INFORMATION FOR MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 17/937,343

(22) Filed: Sep. 30, 2022

(65) Prior Publication Data

US 2023/0129120 A1   Apr. 27, 2023

Related U.S. Application Data

(60) Provisional application No. 63/254,870, filed on Oct. 12, 2021.

(51) Int. Cl.
*H04L 5/00* (2006.01)
*H04L 1/1867* (2023.01)
(Continued)

(52) U.S. Cl.
CPC ....... *H04W 72/1273* (2013.01); *H04L 5/0053* (2013.01); *H04W 72/23* (2023.01)

(58) Field of Classification Search
CPC ..... H04L 1/1854; H04L 5/001; H04L 5/0055; H04L 5/0094; H04W 72/232; H04W 72/0446

See application file for complete search history.

(56) References Cited

U.S. PATENT DOCUMENTS

2020/0267579 A1\* 8/2020 Akoum ................ H04B 7/0695
2020/0267700 A1   8/2020 Hosseini et al.
(Continued)

FOREIGN PATENT DOCUMENTS

CN      112314025    \*  2/2021  .......... H04L 5/0044
WO   2020205652 A1    10/2020
(Continued)

OTHER PUBLICATIONS

3GPP TSG RAN WG1 Meeting#92 bis, R1-1804102 Title: Discussion on HARQ timing for DL SPS (Year: 2018).\*
(Continued)

*Primary Examiner* — Faruk Hamza
*Assistant Examiner* — Abusayeed M Haque

(57) ABSTRACT

Apparatuses and methods for acknowledgement information for multi-cell scheduling in a wireless communication system. A method of a user equipment (UE) includes receiving first information for a set of cells and second information for first time-domain resource allocation (TDRA) tables. The first TDRA tables correspond to respective first cells from the set of cells. An entry of a TDRA table from the first TDRA tables indicates a time resource for a physical downlink shared channel (PDSCH) reception on a cell from the first cells. The method further includes identifying a second TDRA table, determining acknowledgment information corresponding to the set of cells based on a union of rows of the first TDRA tables and the second TDRA table, and transmitting a physical uplink control channel (PUCCH) with the acknowledgment information. An entry of the second TDRA table indicates time resources for receptions of first PDSCHs on the set of cells.

20 Claims, 10 Drawing Sheets

(51) Int. Cl.
*H04W 72/1273* (2023.01)
*H04W 72/23* (2023.01)
*H04W 72/232* (2023.01)

(56) References Cited

U.S. PATENT DOCUMENTS

| | | | |
|---|---|---|---|
| 2020/0305183 A1 | 9/2020 | Papasakellariou | |
| 2021/0045105 A1 | 2/2021 | Yoon et al. | |
| 2021/0168762 A1* | 6/2021 | Huang | H04B 7/0456 |

FOREIGN PATENT DOCUMENTS

| | | | | |
|---|---|---|---|---|
| WO | WO2021227624 | * | 3/2021 | ........... H04L 1/1607 |
| WO | 2021162858 A1 | | 8/2021 | |

OTHER PUBLICATIONS

3GPP TSG RAN WG1#98b, R1-1910179 Title: RS design and other physical layer design issues for NR V2x sidelink (Year: 2019).*
International Search Report and Written Opinion issued Jan. 25, 2023 regarding International Application No. PCT/KR2022/015366, 7 pages.
Extended European Search Report issued Nov. 22, 2024 regarding Application No. 22881334.1, 7 pages.
OPPO, "Discussion on PDSCH/PUSCH enhancements", 3GPP TSG RAN WG1 #105-e, R1-2104767, May 2021, 7 pages.
MediaTek Inc., "Multi-PDSCH scheduling design for 52.6-71 GHZ NR operation", 3GPP TSG RAN WG1 #106bis-e, R1-2109562, Oct. 2021, 12 pages.
"5G; NR; Physical channels and modulation (3GPP TS 38.211 version 16.5.0, Release 16)", ETSI TS 138 211 V16.5.0, Apr. 2021, 138 pgs.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.5.0 Release 16)", ETSI TS 138 213 V16.5.0, Apr. 2021, 188 pages.
"5G; NR; Physical layer procedures for data (3GPP TS 38.214 version 16.5.0 Release 16)", ETSI TS 138 214 V16.5.0, Apr. 2021, 173 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; NR and NG-RAN Overall description; Stage-2 (3GPP TS 38.300 version 16.5.0 Release 16)", ETSI TS 138 300 V16.5.0, Apr. 2021, 153 pages.

* cited by examiner

ACKNOWLEDGEMENT INFORMATION FOR MULTI-CELL SCHEDULING

CROSS-REFERENCE TO RELATED APPLICATION AND CLAIM OF PRIORITY

This application claims priority under 35 U.S.C. § 119(e) to U.S. Provisional Patent Application No. 63/254,870 filed on Oct. 12, 2021. The above-identified provisional patent application is hereby incorporated by reference in its entirety.

TECHNICAL FIELD

The present disclosure relates generally to wireless communication systems and, more specifically, the present disclosure relates to acknowledgement information for multi-cell scheduling.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to acknowledgement information for multi-cell scheduling.

In one embodiment, a method for operating a user equipment (UE) is provided. The method includes receiving first information for a set of cells and second information for first time-domain resource allocation (TDRA) tables. The first TDRA tables correspond to respective first cells from the set of cells. An entry of a TDRA table from the first TDRA tables indicates a time resource for a physical downlink shared channel (PDSCH) reception on a cell from the first cells. The method further includes identifying a second TDRA table, determining acknowledgment information corresponding to the set of cells based on a union of rows of the first TDRA tables and the second TDRA table, and transmitting a physical uplink control channel (PUCCH) with the acknowledgment information. An entry of the second TDRA table indicates time resources for receptions of first PDSCHs on the set of cells.

In another embodiment, a UE is provided. The UE includes a transceiver configured to receive first information for a set of cells and second information for first TDRA tables. The first TDRA tables correspond to respective first cells from the set of cells. An entry of a TDRA table from the first TDRA tables indicates a time resource for a PDSCH reception on a cell from the first cells. The UE further includes a processor operably coupled to the transceiver. The processor is configured to identify a second TDRA table and determine acknowledgment information corresponding to the set of cells based on a union of rows of the first TDRA tables and the second TDRA table. An entry of the second TDRA table indicates time resources for receptions of first PDSCHs on the set of cells. The transceiver is further configured to transmit a PUCCH with the acknowledgment information.

In yet another embodiment, a base station (BS) is provided. The BS includes a transceiver configured to transmit first information for a set of cells and second information for first TDRA tables. The first TDRA tables correspond to respective first cells from the set of cells. An entry of a TDRA table from the first TDRA tables indicates a time resource for a physical downlink shared channel (PDSCH) transmission on a cell from the first cells. The BS further includes a processor operably coupled to the transceiver. The processor is configured to identify a second TDRA table and determine acknowledgment information corresponding to the set of cells based on a union of rows of the first TDRA tables and the second TDRA table. An entry of the second TDRA table indicates time resources for transmissions of first PDSCHs on the set of cells. The transceiver is further configured to receive a PUCCH with the acknowledgment information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
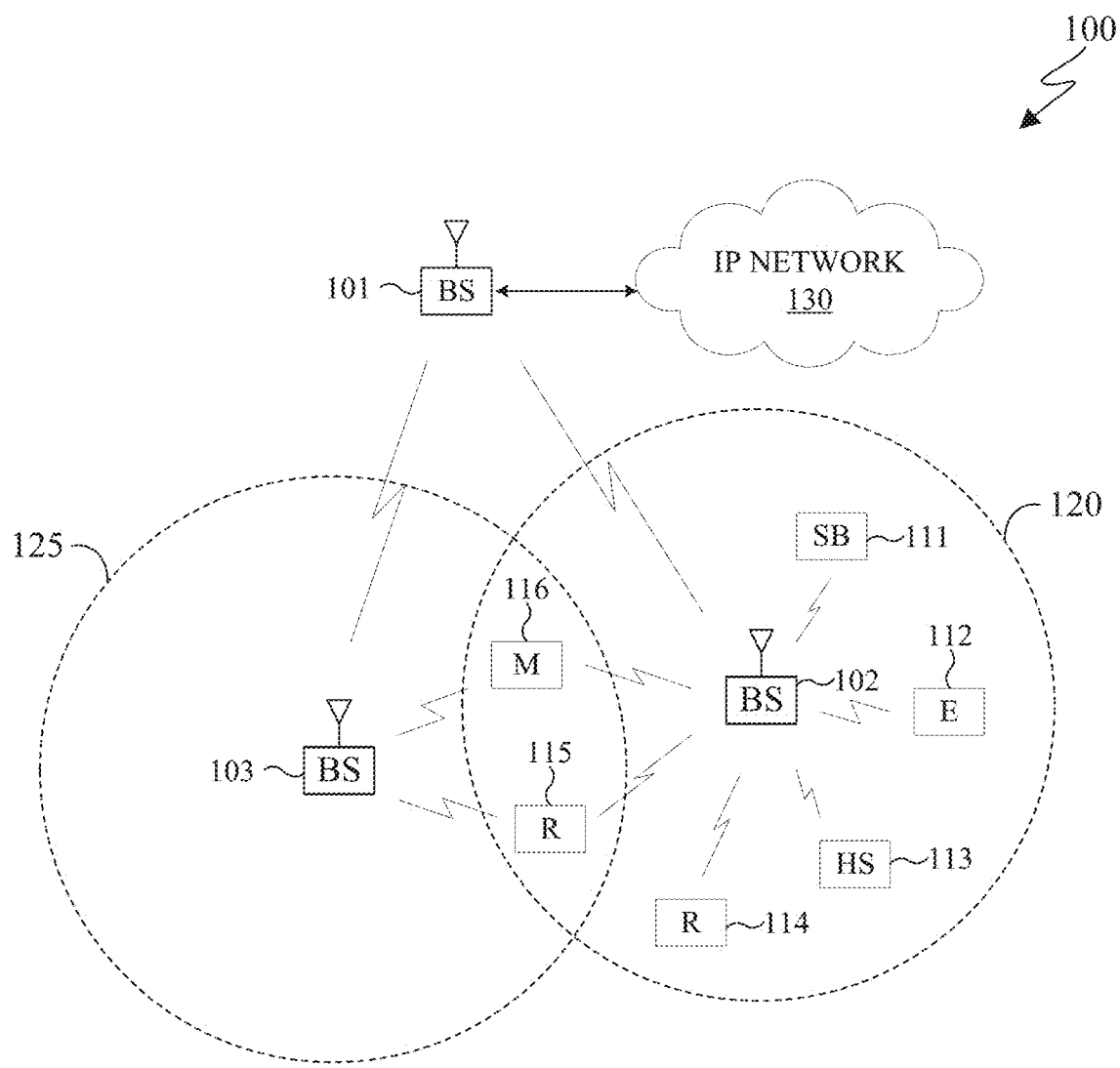
FIG. 1 illustrates an example wireless network according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" ["REF1"]; 3GPP TS 38.212 Rel-16 v16.5.0, "NR; Multiplexing and channel coding" ["REF2"]; 3GPP TS 38.213 Rel-16 v16.5.0, "NR; Physical layer procedures for control" ["REF3"]; 3GPP TS 38.214 Rel-16 v16.5.0, "NR; Physical layer procedures for data" ["REF4"]; 3GPP TS 38.321 Rel-16 v16.4.0, "NR; Medium Access Control (MAC) protocol specification" ["REF5"]; 3GPP TS 38.331 Rel-16 v16.4.1, "NR; Radio Resource Control (RRC) protocol specification" ["REF6"]; and 3GPP TS 38.300 Rel-16 v16.5.0, "NR; NR and NG-RAN Overall Description; Stage 2" ["REF7"].

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
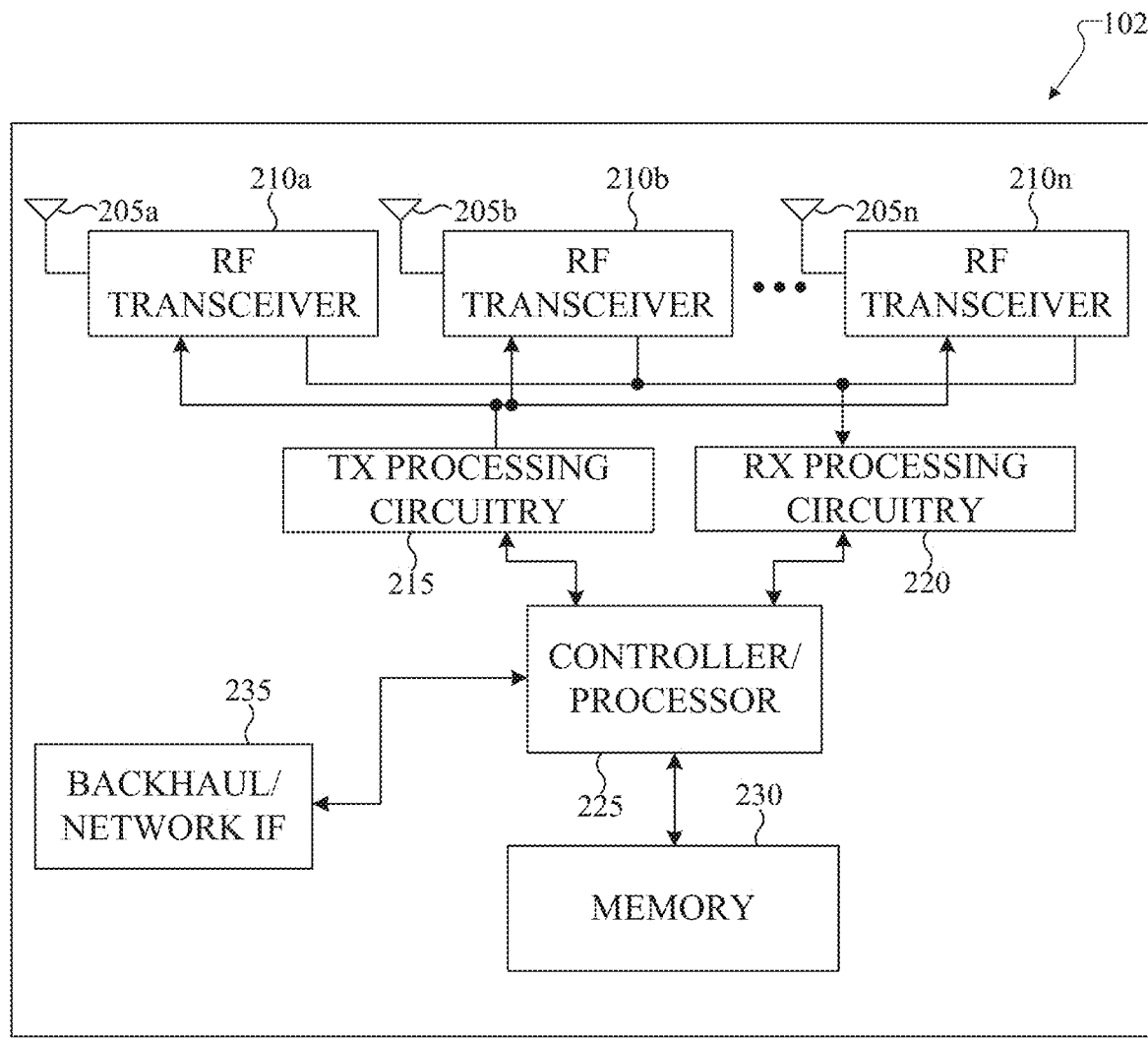
FIG. 2 illustrates an example BS according to embodiments of the present disclosure.
Figure 3:
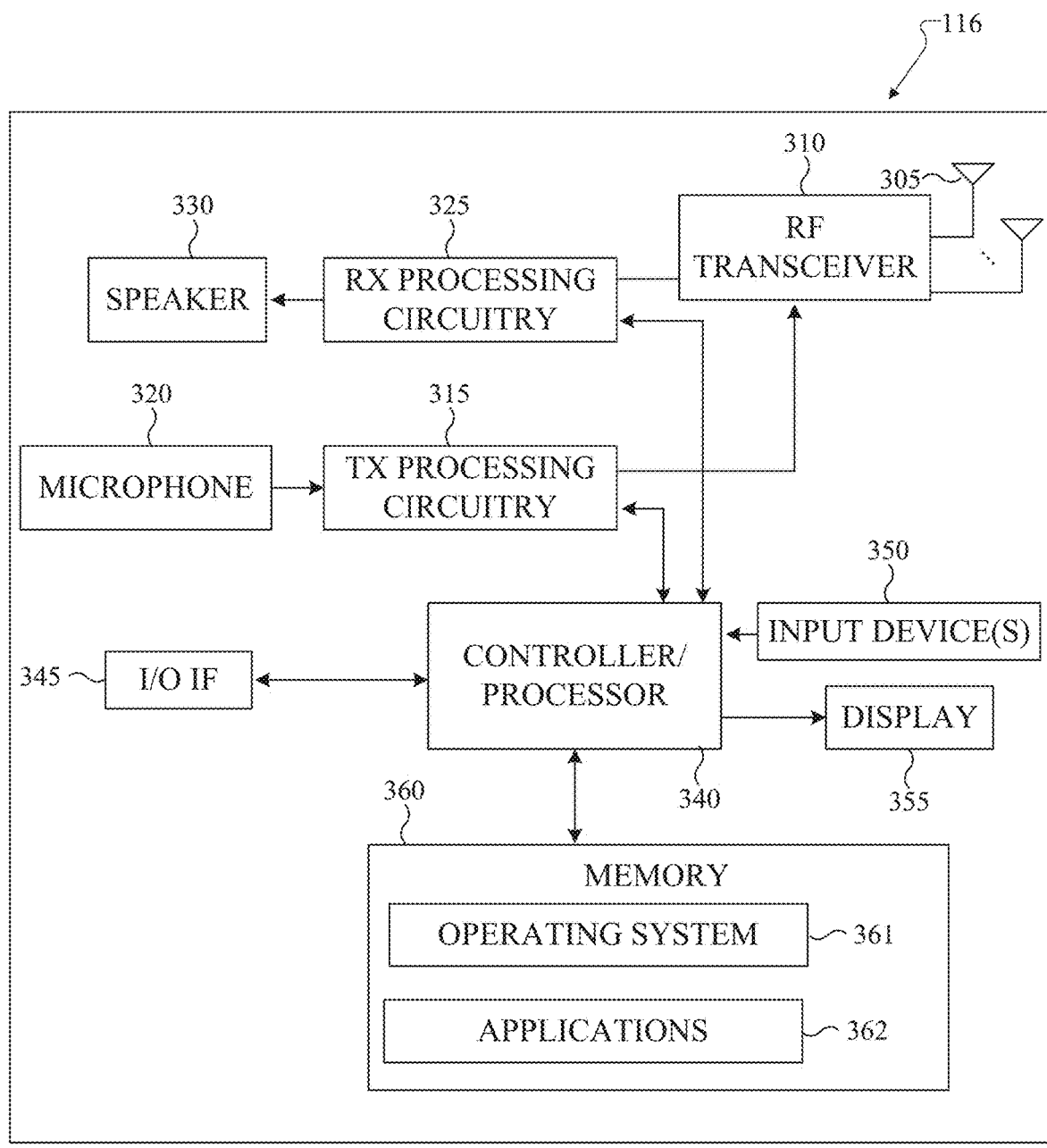
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In certain embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for acknowledgement information for multi-cell scheduling. In certain embodiments, and one or more of the BSs 101-103 includes circuitry, programing, or a combination thereof for acknowledgement information for multi-cell scheduling.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support acknowledgement information for multi-cell scheduling. Any of a wide variety of other functions could be supported in the BS 102 by the controller/processor 225. In certain embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In certain embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In certain embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
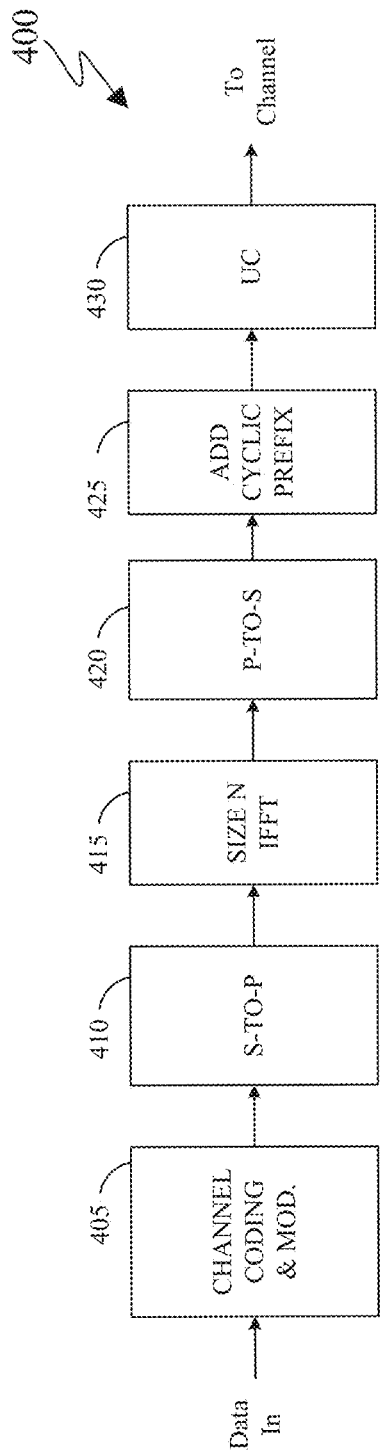
FIGS. 4 and 5 illustrate example wireless transmit and receive paths according to embodiments of the present disclosure.
Figure 5:
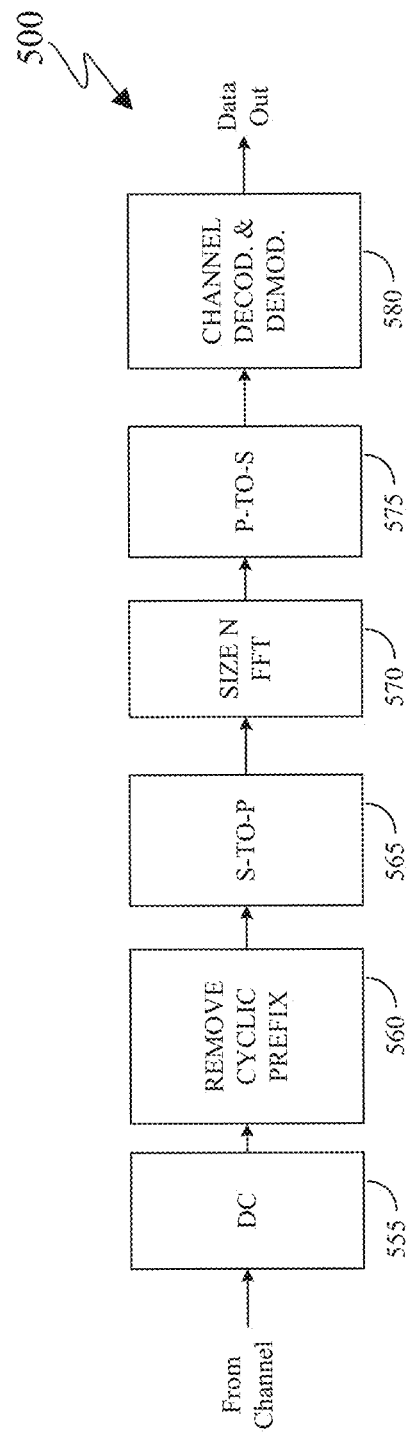

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In certain embodiments, the receive path 500 is configured to support acknowledgement information for multi-cell scheduling as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Various embodiments of the present disclosure relate to a pre-5th-Generation (5G) or 5G or beyond 5G communication system to be provided for supporting one or more of: higher data rates, lower latency, higher reliability, improved coverage, and massive connectivity, and so on. Various embodiments apply to UE's operating with other radio access technology (RAT) and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Various embodiments of the present disclosure consider enhancements for cross-carrier scheduling operation in a carrier aggregation (CA) framework to support joint scheduling of multiple cells.

In legacy 5G NR systems, a downlink or uplink data transmission can be scheduled only for a single serving cell. In other words, a downlink control information (DCI) format provides scheduling information parameters for a physical downlink shared channel (PDSCH) or a physical uplink shared channel (PUSCH) on a single serving cell. If the serving cell is a scheduled cell, the UE receives a DCI format for the PDSCH/PUSCH in a physical downlink control channel (PDCCH) that the UE receives on a corresponding scheduling cell. Based on a carrier indication field (CIF) in the DCI format, the UE can determine a serving cell on which the UE can receive the PDSCH or transmit the PUSCH.

Embodiments of the present disclosure take into consideration that legacy NR system does not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs on one of the serving cells. Such operation achieves the intended outcome, but with possibly high signaling overhead. In various scenarios, it is possible that several scheduling parameters or corresponding UE operations are shared among the multiple PDSCHs or PUSCHs on the jointly scheduled cells, referred to as co-scheduled cells.

For example, the UE may use a same physical uplink control channel (PUCCH) resource to transmit hybrid automatic repeat request (HARQ)—acknowledgement (ACK) feedback corresponding to the multiple PDSCHs. Therefore, an indication for the same PUCCH resource (and corresponding operations for PUCCH transmission) may be unnecessarily repeated multiple times. In addition, in some scenarios, such as intra-band CA, it is likely that physical channel conditions are correlated, so various scheduling parameters pertaining link adaptation, MIMO/beamforming operation, and even possibly resource allocation can be common and repeated among the co-scheduled cells. Such unnecessary overhead in control signaling can be significant, especially when the number of co-scheduled cells are large, such as 4-8 cells. Last but not least, cyclic redundancy check (CRC) field needs to be repeated multiple times, which incurs significant signaling overhead, especially for large number of co-scheduled cells.

Design of HARQ-ACK codebooks in Rel-15/16 5G NR systems is based on consideration that a PDSCH reception on a serving cell is individually scheduled by a corresponding DCI format, herein referred to as DCI formats for single-cell scheduling (or SC-DCI format). For example, HARQ-ACK information corresponding to each DCI (in case of TB-based PDSCH reception) is 1 or 2 bits, depending on whether a corresponding PDSCH includes 1 or 2 transport blocks (TBs). For a Type-1 or "semi-static" HARQ-ACK codebook (CB), the UE considers a single time domain resource allocation (TDRA) table, a single set of PDSCH-to-HARQ_feedback timing (K1) values, and a single sub-carrier spacing (SCS) configuration, for each serving cell.

When the UE receives a DCI format for joint scheduling of multiple PDSCHs on a set of co-scheduled cells, the DCI format triggers multiple HARQ-ACK information bits, no less than a number of co-scheduled PDSCHs/cells (and with a factor of 2 or based on a number of configured TBs, if any of the co-scheduled cells is configured with 2-TB per PDSCH). In addition, the UE may have separate TDRA table or K1 configuration for multi-cell scheduling compared to single-cell scheduling.

In addition, timing aspects and SCS configurations can be different across different co-scheduled cells, which can impact Type-1 CB generation. For example, a DCI format for multi-cell scheduling indicates a K1 value relative to a last PDSCH from the multiple co-scheduled PDSCHs. Then, the UE needs to "back-trace" the timing relationships to determine candidate occasions for other co-scheduled PDSCHs, and the impact of multiple different SCS configurations needs to be accounted for in such determination. Such operations would involve new methods that are not necessary/available for the case of single-cell scheduling.

Therefore, embodiments of the present disclosure take into consideration that there is a need for multi-cell scheduling, wherein multiple cells can be jointly scheduled using reduced signaling overhead, such as by using only a single DCI format.

Embodiments of the present disclosure also take into consideration that there is a need to enhance Type-1 HARQ-ACK codebook to accommodate co-scheduled PDSCHs, including various K0/K1 timing relationships, different TDRA table configurations, and different SCS configurations.

Additionally, embodiments of the present disclosure take into consideration that there is a need to develop such enhancements by taking into account various mechanisms for multi-cell scheduling, such as a one-stage DCI format (potentially with multi-cell mapping) or two-stage DCI formats with a $1^{st}$-stage DCI carried by a PDCCH and a $2^{nd}$-stage DCI carried by a PDSCH/PDCCH.

Accordingly, Embodiments of the present disclosure provides methods and apparatus for multi-cell scheduling with reduced signaling overhead such as a single DCI format or a two-stage DCI format.

Enhancements for Type-1 HARQ-ACK codebooks are disclosed wherein a UE with multi-cell scheduling configuration generates a Type-1 CB based on TDRA tables and sets of K1 values corresponding to single-cell scheduling and/or multi-cell scheduling. For example, for configured K1 values that are shared among all co-scheduled cells (for single-cell scheduling or multi-cell scheduling), the UE takes a union of TDRA tables corresponding to single-cell scheduling and those for multi-cell scheduling to determine candidate PDSCH receptions corresponding to all DCI formats. In addition, since a K1 value in a DCI format for multi-cell scheduling only indicates a reference PDSCH such as a last PDSCH, the UE determines candidate PDSCH occasions not only based on configured K1 values, but also based on extensions of K1 values by considering relative scheduling timeline of the co-scheduled cells. Such relative timing involves configured K0 value, for example, relative K0 (denoted by ΔK0), among co-scheduled cells. In addition, when co-scheduled cells have different configurations for SCS or K0 or K1 values, the UE determines the relative scheduling timeline by application of suitable scaling factors to the configured K0 values. Generation of same or separate Type-1 CBs for single-cell scheduling versus multi-cell scheduling are considered, and new definition of UL DAI (that is, a DAI value $V_{T-DAI}^{UL}$ in an uplink DCI format that schedules a PUSCH transmission, when the UE would multiplex HARQ-ACK information in the PUSCH transmission) for Type-1 CB is accordingly considered.

The designs for Type-1 CB in presence of multi-cell scheduling also consider impact of two-stage DCI, such as relative timing and SCS configuration of the $1^{st}$-stage DCI and the $2^{nd}$-stage DCI.

The methods considered in the present disclosure enable reduced downlink signaling for scheduling multiple PDSCHs on multiple cells, by providing common values, rather than separate values, related to HARQ-ACK information generation and corresponding PUCCH transmission. The methods in the present disclosure also enable reduced uplink signaling by multiplexing HARQ-ACK information corresponding to the multiple PDSCHs on multiple cells into a single HARQ-ACK codebook and using a single, common PUCCH transmission to provide the HARQ-ACK codebook.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively.

In general, the embodiments apply to any deployments, verticals, or scenarios including inter-band CA with potentially fragmented spectrum in frequency domain, with eMBB, ultra-reliable and low latency communication (URLLC) and industrial internet of things (IIoT) and extended reality (XR), mMTC and IoT, with sidelink/Vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the disclosure for enhancing HARQ-ACK codebook design in presence of multi-cell scheduling configuration with reduced signaling overhead such as a single DCI format are summarized in the following and are fully elaborated further below. Combinations of the embodiments are also applicable, but they are not described in detail for brevity.

For example, an embodiment, described in greater detail below, describes a multi-cell scheduling operation. For example, a UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described herein. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format.

For another example, an embodiment, described in greater detail below, describes various mechanisms for multi-cell scheduling. For example, the UE can distinguish a single-cell scheduling DCI format from a multi-cell scheduling DCI format via various methods, such as a DCI format size, or an radio network temporary identifier (RNTI) used for scrambling a CRC of a DCI format for multi-cell scheduling, or by an explicit indication by a field in the DCI format, or by a dedicated COntrol REsource SET (CORESET) and associated search space sets.

For another example, an embodiment, described in greater detail below, describes PDCCH monitoring for multi-cell scheduling. For example, the UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format. There can be two cases for monitoring a DCI format for multi-cell scheduling: a first case based on search space set(s) dedicated to multi-cell scheduling, and a second case based on search space set(s) shared by both single-cell scheduling and multi-cells scheduling.

For another example, an embodiment, described in greater detail below, describes general considerations for HARQ-ACK codebook for multi-cell scheduling. For example, a UE configured with multi-cell scheduling for a set of co-scheduled cells expects that all cells in the set of co-scheduled cells belong to a same PUCCH group, and also that the UE is provided configuration for a HARQ-ACK codebook, such as Type-1 codebook. HARQ codebook generation for multi-cell scheduling can depend on configuration of a TDRA table, a set of K0 values, and/or a set of K1 values provided for multi-cells scheduling. The UE can be provided a dedicated TDRA/K0/K1 configuration for multi-cell scheduling for a set of co-scheduled cells or for cells with multi-cell scheduling configuration, or the UE can implicitly determine a TDRA/K0/K1 configuration for multi-cell scheduling based on intersection (or union) of corresponding configurations for single-cell scheduling among the set of co-scheduled cells. A value of K0 can be with respect to (w.r.t.) an SCS configuration of a corresponding serving cell or w.r.t. a reference SCS configuration such as a largest SCS configuration among the set of co-scheduled cells. A value of K1 can be w.r.t. an SCS configuration of a corresponding cell with PUCCH configuration (such as the PCell).

For another example, an embodiment, described in greater detail below, describe, enhancements to Type-1 (semi-static) HARQ-ACK codebook for multi-cell scheduling. For example, when a UE is configured to generate a Type-1 HARQ-ACK CB, also referred to as a semi-static CB, and the UE is also configured with multi-cell scheduling, the UE can generate a same Type-1 CB for both single-cell scheduling and multi-cell scheduling, or the UE can generate two separate Type-1 CBs for single-cell scheduling and multi-cell scheduling. The specifications for system operation can support only one of the two options, or the UE can determine same or separate CB(s) per higher layer configuration or per indication by a DCI format.

For another example, an embodiment, described in greater detail below, describe, generating a same/common Type-1 HARQ-ACK codebook for both single-cell scheduling and multi-cell scheduling. For example, for a UE with multi-cell scheduling configuration, when the UE generates a same Type-1 CB for both single-cell scheduling and multi-cell scheduling, the UE determines candidate PDSCH occasions for the Type-1 CB based on TDRA table(s) corresponding to single-cell scheduling when a K1 value is configured only for single-cell scheduling, and based on union of TDRA table(s) corresponding to single-cell scheduling and TDRA table(s) corresponding to multi-cell scheduling when a K1 value is configured for both single-cell scheduling and multi-cell scheduling. When the UE receives co-scheduled PDSCHs with different K0 values but transmit the corresponding HARQ-ACK information in a same PUCCH/PUSCH in a same slot, the UE determines candidate PDSCH occasions not only based on configured K1 values, but also based on relative K0 values among K0 values configured for different co-scheduled cells. When different co-scheduled cells have different SCS configuration, the UE determines the relative K0 values based on suitable scaling factors, which are in turn based on corresponding SCS configurations for the co-scheduled cells and a corresponding cell with PUCCH configuration (such as the PCell).

For another example, an embodiment, described in greater detail below, describes, generating separate Type-1 HARQ-ACK codebooks for single-cell scheduling and multi-cell scheduling. For example, for a UE configured with multi-cell scheduling, when the UE generates separate Type-1 HARQ-ACK codebooks for single-cell scheduling and multi-cell scheduling, the UE generates a first Type-1 CB for single-cell scheduling and a second Type-1 CB for multi-cell scheduling, wherein each Type-1 CB is based on corresponding configuration(s) for TDRA/K0/K1. The UE can transmit the first and second CBs in separate PUCCH resources or can append the first and second CBs (in which case, can be also referred to as, first and second sub-CBs) and transmit in a single/same PUCCH resource. Alternatively, the UE can transmit the first and/or the second Type-1 CB on a PUSCH, based on an UL DAI field (with 2 bits, instead of 1 bit in TS 38.213 v.16.5.0) in a DCI format that schedules the PUSCH.

For another example, an embodiment, described in greater detail below, describes, Type-1 HARQ-ACK codebook for multi-cell scheduling with two-stage DCI. For example, when a UE is configured a two-stage DCI format for multi-cell scheduling of a set of co-scheduled cells, wherein the UE receives a corresponding $2^{nd}$-stage DCI in a first PDSCH, the UE can transmit a HARQ-ACK information corresponding to the first PDSCH in a same or different PUCCH/PUSCH compared to a PUCCH/PUSCH in which the UE transmits HARQ-ACK information corresponding to (other) co-scheduled PDSCHs on the set of co-scheduled cells.

For another example, an embodiment, described in greater detail below, describes, other aspects of HARQ-ACK codebook generation in presence of multi-cell scheduling.

For another example, an embodiment, described in greater detail below, describes, Type-3 HARQ codebook in presence of multi-cell scheduling. For example, for a UE that is configured a number of sets of co-scheduled cells, when a DCI format for multi-cell scheduling includes a flag, such as a One-shot HARQ-ACK request field, that triggers generation of a Type-3 HARQ codebook (also referred to as, a "One-shot" CB), the UE can consider the DCI format for multi-cell scheduling as an implicit triggering state for the Type-3 HARQ codebook.

For another example, an embodiment, described in greater detail below, describes, HARQ timeline in presence of two-stage multi-cell scheduling. For example, for a UE that is configured a two-stage DCI format for multi-cell scheduling, the UE determines a minimum PDCCH-to-HARQ (N3) timeline relative to a $2^{nd}$-stage DCI. In addition, when the UE receives a $2^{nd}$-stage DCI in a PDSCH, such as a first PDSCH that is scheduled by a corresponding $1^{st}$-stage DCI, the UE considers an SCS configuration of the (first) PDSCH when determining an SCS configuration for the N3 timeline. An N3/N2 timeline relative to a $2^{nd}$-stage DCI can also be used when the UE determines a minimum time until DL bandwidth part (BWP) switching.

For another example, an embodiment, described in greater detail below, describes, multiplexing HARQ-ACK feedback on co-scheduled PUSCHs. For example, for a UE configured with multi-cell scheduling for PUSCHs, the specifications for system operation may not allow HARQ-ACK multiplexing on co-scheduled PUSCHs, for example, to reduce DCI format size. When multiplexing HARQ-ACK feedback on co-scheduled PUSCHs is supported, an UL DAI field can be a cell-common parameter that applies to all co-scheduled PUSCHs or can be a cell-specific parameter that applies to a reference cell from the co-scheduled cells, or a reference PDSCH such as a first or a last PUSCH. When a DCI format for multi-cell scheduling of PUSCHs is configured to be a two-stage DCI, the UE can receive the UL DAI in the $2^{nd}$-stage DCI.

For another example, an embodiment, described in greater detail below, denoted as E-3-4 describe out-of-order (OoO) scheduling in presence of multi-cell scheduling. For example, for a UE configured with multi-cell scheduling, and when the UE does not support OoO scheduling, the UE expects that a DCI format for multi-cell scheduling satisfies the "in-order" scheduling property in a same way as a DCI format for single-cell scheduling. To achieve this property, the OoO property can be defined across all serving cells or across pairs of sets/groups of serving cells, rather than pairs of individual serving cells. In a simplified variation, the OoO property is defined with respect to only a first/earliest PDSCH or PUSCH indicated by a DCI format for multi-cell scheduling (rather than all co-scheduled PDSCHs or PUSCHs).

Throughout the present disclosure, the term "configuration" or "higher layer configuration" and variations thereof (such as "configured" and so on) are used to refer to one or more of: a system information signaling such as by a master information block (MIB) or a system information block (SIB) (such as SIB1), a common or cell-specific higher layer/RRC signaling, or a dedicated or UE-specific or BWP-specific higher layer/RRC signaling.

Throughout the present disclosure, the term signal quality is used to refer to e.g. reference signal received power (RSRP), reference signal received quality (RSRQ), received Signal Strength Indicator (RSSI), signal to noise ratio (SNR), or signal to interference and noise ratio (SINR), with or without filtering such as L1 or L3 filtering, of a channel or a signal such as a reference signal (RS) including synchronized signal (SS)/physical broadcast channel (PBCH) block (SSB), channel state information RS (CSI-RS), or sounding reference signal (SRS).

An antenna port is defined such that the channel over which a symbol on the antenna port is conveyed can be inferred from the channel over which another symbol on the same antenna port is conveyed.

For demodulation RS (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DM-RS ports associated with a PDSCH are quasi co-located (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values: 'QCL-TypeA', 'QCL-TypeB', 'QCL-TypeC', and 'QCL-TypeD'. For example, a quasi co-location type of 'QCL-TypeA' can correspond to {Doppler shift, Doppler spread, average delay, delay spread}. For another example, a quasi co-location type of 'QCL-TypeB' can correspond to {Doppler shift, Doppler spread}. For another example, a quasi co-location type of 'QCL-TypeC' can correspond to {Doppler shift, average delay}. For yet another example, a quasi co-location type of 'QCL-TypeD' can correspond to 'QCL-TypeD': {Spatial Rx parameter}.

The UE receives a MAC-coverage enhancement (CE) activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', then the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If a UE is configured with enableDefaultTCIStatePerCoresetPoolIndex and the UE is configured by higher layer parameter PDCCH-Config that contains two different values of coresetPoolIndex in different ControlResourceSets, then the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers). If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). In these above cases, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

In certain embodiments, if the PDCCH carrying the scheduling DCI is received on one component carrier, and the PDSCH scheduled by that DCI is on another component carrier, then the timeDurationForQCL is determined based on the subcarrier spacing of the scheduled PDSCH. If $\mu_{PDCCH} < \mu_{PDSCH}$ an additional timing delay $$d \frac{2^{\mu_{PDSCH}}}{2^{\mu_{PDCCH}}}$$

is added to the timeDurationForQCL, where d is defined in 5.2.1.5.1a-1, otherwise d is zero. For both the cases, when the UE is configured with enableDefaultBeamForCCS, and when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-ForPUSCH0-0 is set 'enabled', the UE is not configured with PUCCH resources on the active UL BWP and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-ForPUSCH0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell in case CORESET(s) are configured on the cell.

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

In CA, two or more Component Carriers (CCs) are aggregated. A UE may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one TAG). For another example, a UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell. For yet another example, a non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated, or an offset in multiples of slots between the PCell/PSCell and an SCell is configured to the UE. The maximum number of configured CCs for a UE is 16 for DL and 16 for UL.

When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore always consists of one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signaling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signaling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells SCells added to the set are initially activated or deactivated; while SCells which remain in the set (either unchanged or reconfigured) do not change their activation status (activated or deactivated).

At handover or connection resume from RRC_INACTIVE: SCells are activated or deactivated.

To enable reasonable UE battery consumption when bandwidth adaptation (BA) is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random-access channel (PRACH) and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCell(s) or one or more SCell group(s).

The dormant BWP is one of the UE's dedicated BWPs configured by network via dedicated RRC signaling. The SpCell and PUCCH SCell cannot be configured with a dormant BWP.

Cross-carrier scheduling with the Carrier Indicator Field (CIF) allows the PDCCH of a serving cell to schedule resources on another serving cell but with the following restrictions: (i) cross-carrier scheduling does not apply to PCell i.e. PCell is always scheduled via its PDCCH; (ii) when an SCell is configured with a PDCCH, that cell's PDSCH and PUSCH are always scheduled by the PDCCH on this SCell; (iii) when an SCell is not configured with a PDCCH, that SCell's PDSCH and PUSCH are always scheduled by a PDCCH on another serving cell; (iv) the scheduling PDCCH and the scheduled PDSCH/PUSCH can use the same or different numerologies.

Some of the restrictions above may be relaxed. For example, dynamic spectrum sharing (DSS) allows LTE and NR to share the same carrier. As the number of NR devices in a network increases, it is important that sufficient scheduling capacity for NR UEs on the shared carriers is ensured. In the case of DSS operation, PDCCH enhancements for cross-carrier scheduling including can be considered such that PDCCH of an SCell, referred to as a special/scheduling SCell (sSCell), can schedule PDSCH or PUSCH on the P(S)Cell.

The PDCCH can be used to schedule DL transmissions on PDSCH and UL transmissions on PUSCH, where the DCI on PDCCH includes: (i) downlink assignments containing at least modulation and coding format, resource allocation, and HARQ information related to DL-SCH; and (ii) uplink scheduling grants containing at least modulation and coding format, resource allocation, and HARQ information related to UL-SCH.

In addition to scheduling, PDCCH can be used to for: (i) activation and deactivation of configured PUSCH transmission with configured grant; (ii) activation and deactivation of PDSCH semi-persistent transmission; (iii) notifying one or more UEs of the slot format; (iv) notifying one or more UEs of the PRB(s) and OFDM symbol(s) where the UE may assume no transmission is intended for the UE; (v) transmission of TPC commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the discontinuous reception (DRX) on-duration; (x) in IAB context, indicating the availability for soft symbols of an IAB-DU; and (xi) triggering one shot HARQ-ACK codebook feedback. Additionally, PDCCH can be used for operation with shared spectrum channel access including: (i) triggering search space set group switching; (ii) indicating one or more UEs about the available RB sets and channel occupancy time duration; and (iii) indicating downlink feedback information for configured grant PUSCH (configured grant downlink feedback information (CG-DFI)).

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting of a set of REGs. Control channels are formed by aggregation of CCE. Different code rates for the control channels are realized by aggregating different number of CCE. Interleaved and non-interleaved CCE-to-REG mapping are supported in a CORESET.

Polar coding and QPSK modulation are used for PDCCH. Each resource element group carrying PDCCH carries its own DM-RS.

A UE (such as the UE 116) monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

In the downlink, the gNB can dynamically allocate resources to UEs via the cell-RNTI (C-RNTI) on PDCCH(s). A UE always monitors the PDCCH(s) in order to find possible assignments when its downlink reception is enabled (activity governed by discontinuous reception (DRX) when configured). When CA is configured, the same C-RNTI applies to all serving cells.

The gNB (such as the BS 102) may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB can allocate downlink resources for the initial HARQ transmissions to UEs: RRC defines the periodicity of the configured downlink assignments while PDCCH addressed to Configured scheduling RNTI (CS-RNTI) can either signal and activate the configured downlink assignment, or deactivate it; i.e. a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell, if they overlap in time. Otherwise, a downlink reception according to the configured downlink assignment is assumed, if activated.

The UE may be configured with up to 8 active configured downlink assignments for a given BWP of a serving cell. When more than one is configured: the network decides which of these configured downlink assignments are active at a time (including all of them); and each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported: the first PUSCH is triggered with a DCI, with subsequent PUSCH transmissions following the RRC configuration and scheduling received on the DCI, or the PUSCH is triggered by data arrival to the UE's transmit buffer and the PUSCH transmissions follow the RRC configuration.

In the uplink, the gNB can dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

The gNB may cancel a PUSCH transmission, or a repetition of a PUSCH transmission, or an SRS transmission of a UE for another UE with a latency-critical transmission. The gNB can configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB can allocate uplink resources for the initial HARQ transmissions and HARQ retransmissions to UEs. Two types of configured uplink grants are defined. A first type, denoted as Type 1, RRC directly provides the configured uplink grant (including the periodicity). A second type, denoted as Type 2, RRC defines the periodicity of the configured uplink grant while PDCCH addressed to CS-RNTI can either signal and activate the configured uplink grant, or deactivate it; i.e., a PDCCH addressed to CS-RNTI indicates that the uplink grant can be implicitly reused according to the periodicity defined by RRC, until deactivated.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

For downlink, Asynchronous Incremental Redundancy Hybrid ARQ is supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group-based transmissions where retransmissions may be scheduled to carry a sub-set of all the code blocks of a TB.

For uplink, Asynchronous Incremental Redundancy HARQ is supported. The gNB schedules each uplink transmission and retransmission using the uplink grant on DCI. For operation with shared spectrum channel access, UE can also retransmit on configured grants. The UE may be configured to transmit code block group-based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

PUCCH carries the Uplink Control Information (UCI) from the UE to the gNB. UCI includes at least HARQ-ACK information, scheduling request (SR), and CSI.

UCI can be transmitted on a PUCCH or multiplexed in a PUSCH. UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; (ii) in all other cases UCI is multiplexed by rate matching PUSCH.

For configured grants operation with shared spectrum channel access, a CG-UCI (Configured Grant Uplink Control Information) is transmitted in PUSCH scheduled by configured uplink grant. For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

PUCCH carries the UCI from the UE (such as the UE 116) to the gNB (such as the BS 102). Five formats of PUCCH exist, depending on the duration of PUCCH and the UCI payload size. A first format denoted as "Format #0" indicates short PUCCH of 1 or 2 symbols with small UCI payloads of up to two bits with UE multiplexing capacity of up to 6 UEs with 1-bit payload in the same PRB. A second format denoted as "Format #1" indicates long PUCCH of 4-14 symbols with small UCI payloads of up to two bits with UE multiplexing capacity of up to 84 UEs without frequency hopping and 36 UEs with frequency hopping in the same PRB. A third format denoted as "Format #2" short PUCCH of 1 or 2 symbols with large UCI payloads of more than two bits with no UE multiplexing capability in the same PRBs. A fourth format denoted as "Format #3" indicates long PUCCH of 4-14 symbols with large UCI payloads with no UE multiplexing capability in the same PRBs. A firth format denoted as "Format #4" indicates long PUCCH of 4-14 symbols with moderate UCI payloads with multiplexing capacity of up to 4 UEs in the same PRBs.

The short PUCCH format of up to two UCI bits is based on sequence selection, while the short PUCCH format of more than two UCI bits frequency multiplexes UCI and DM-RS. The long PUCCH formats time-multiplex the UCI and DM-RS. Frequency hopping is supported for long PUCCH formats and for short PUCCH formats of duration of 2 symbols. Long PUCCH formats can be repeated over multiple slots.

For operation with shared spectrum channel access, PUCCH Format #0, #1, #2, #3 are extended to use resource in one PRB interlace (up to two interlaces for Format #2 and Format #3) in one RB Set. PUCCH Format #2 and #3 are enhanced to support multiplexing capacity of up to 4 UEs in the same PRB interlace when one interlace is used.

UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; (ii) in all other cases UCI is multiplexed by rate matching PUSCH.

UCI can include: (i) CSI; (ii) ACK/negative acknowledgment (NACK); or (iii) scheduling request.

For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

QPSK and $\pi/2$ BPSK modulation can be used for long PUCCH with more than 2 bits of information, QPSK is used for short PUCCH with more than 2 bits of information and BPSK and QPSK modulation can be used for long PUCCH with up to 2 information bits.

Transform precoding is applied to PUCCH Format #3 and Format #4.

Channel coding used for uplink control information is described in Table (1), below.

TABLE 1

| Uplink Control Information size including CRC, if present | Channel code |
| --- | --- |
| 1 | Repetition code |
| 2 | Simplex code |
| 3-11 | Reed Muller code |
| >11 | Polar code |

PUSCH and PUCCH can be associated with a priority (high/low) by RRC or L1 signaling. If a PUCCH transmission overlaps in time with a transmission of a PUSCH or another PUCCH, only the PUCCH or PUSCH associated with a high priority can be transmitted.

In case of Supplementary Uplink (SUL), the UE is configured with 2 ULs for one DL of the same cell, and uplink transmissions on those two ULs are controlled by the network to avoid overlapping PUSCH/PUCCH transmissions in time. Overlapping transmissions on PUSCH are avoided through scheduling while overlapping transmissions on PUCCH are avoided through configuration (PUCCH can only be configured for only one of the 2 ULs of the cell). In addition, initial access is supported in each of the uplink.

If a UE (such as the UE 116) is provided pdsch-HARQ-ACK-CodebookList, the UE can be indicated by pdsch-HARQ-ACK-CodebookList to generate one or two HARQ-ACK codebooks. If the UE is indicated to generate one HARQ-ACK codebook, the HARQ-ACK codebook is associated with a PUCCH of priority index 0. If a UE is provided pdsch-HARQ-ACK-CodebookList, the UE multiplexes in a same HARQ-ACK codebook only HARQ-ACK information associated with a same priority index. If the UE is indicated to generate two HARQ-ACK codebooks, a first HARQ-ACK codebook is associated with a PUCCH of priority index 0 and a second HARQ-ACK codebook is associated with a PUCCH of priority index 1. The UE is provided first and second for each of {PUCCH-Config, UCI-OnPUSCH, PDSCH-codeBlockGroupTransmission} by {PUCCH-ConfigurationList, UCI-OnPUSCH-ListDCI-0-1, PDSCH-CodeBlockGroupTransmissionList} or {PUCCH-ConfigurationList, UCI-OnPUSCH-ListDCI-0-2, PDSCH-CodeBlockGroupTransmissionList}, respectively, for use with the first and second HARQ-ACK codebooks, respectively.

If a UE receives a PDSCH without receiving a corresponding PDCCH, or if the UE receives a PDCCH indicating a SPS PDSCH release, the UE generates one corresponding HARQ-ACK information bit. If the UE generates two HARQ-ACK codebooks, the UE is indicated by harq-CodebookID, per SPS PDSCH configuration, a HARQ-ACK codebook index for multiplexing the corresponding HARQ-ACK information bit.

If aUE is provided pdsch-HARQ-ACK-OneShotFeedback and the UE detects a DCI format in any PDCCH monitoring occasion that includes a One-shot HARQ-ACK request field with value 1 then (i) the UE includes the HARQ-ACK information in a Type-3 HARQ-ACK codebook, and (ii) the UE does not expect that the PDSCH-to-HARQ_feedback timing indicator field of the DCI format provides an inapplicable value from dl-DataToUL-ACK-r16.

In the remaining of this clause, reference is to one HARQ-ACK codebook and to DCI formats that schedule PDSCH reception, or indicate SPS PDSCH release, or indicate SCell dormancy without scheduling a PDSCH reception and are associated with the HARQ-ACK codebook.

If a UE (such as the UE 116) is configured to receive SPS PDSCHs in a slot for SPS configurations that are indicated to be released by a DCI format, and if the UE receives the PDCCH providing the DCI format in the slot where the end of a last symbol of the PDCCH reception is not after the end of a last symbol of any of the SPS PDSCH receptions, and if HARQ-ACK information for the SPS PDSCH release and the SPS PDSCH receptions would be multiplexed in a same PUCCH, the UE does not expect to receive the SPS PDSCHs, does not generate HARQ-ACK information for the SPS PDSCH receptions, and generates a HARQ-ACK information bit for the SPS PDSCH release.

If a UE detects a DCI format 1_1 indicating (i) SCell dormancy without scheduling a PDSCH reception, as described in clause 10.3, and (ii) is provided pdsch-HARQ-ACK-Codebook=dynamic or pdsch-HARQ-ACK-Codebook-r16, then the UE generates a HARQ-ACK information bit as described in clause 9.1.3 for a DCI format 1_1 indicating SCell dormancy and the HARQ-ACK information bit value is ACK.

If a UE is not provided PDSCH-CodeBlockGroupTransmission, the UE generates one HARQ-ACK information bit per transport block.

For a HARQ-ACK information bit, a UE generates a positive acknowledgement (ACK) if the UE detects a DCI format that provides a SPS PDSCH release or correctly decodes a transport block and generates a NACK if the UE does not correctly decode the transport block. A HARQ-ACK information bit value of 0 represents a NACK while a HARQ-ACK information bit value of 1 represents an ACK.

In the following, the CRC for a DCI format is scrambled with a C-RNTI, a modulation and coding scheme-C-RNTI (MCS-C-RNTI), or a CS-RNTI.

If a UE is provided PDSCH-CodeBlockGroupTransmission for a serving cell, the UE receives a PDSCH scheduled by DCI format 1_1, that includes code block groups (CBGs) of a transport block. The UE is also provided maxCodeBlockGroupsPerTransportBlock indicating a maximum number $NH_{HARQ-ACK}^{CBG/TB,max}$ of CBGs for generating respective HARQ-ACK information bits for a transport block reception for the serving cell.

For a number of C code blocks (CBs) in a transport block, the UE determines a number of CBGs M according to [REF4] and determines a number of HARQ-ACK bits for the transport block as $N_{HARQ-ACK}^{CBG/TB}=M$.

The UE (such as the UE 116) generates an ACK for the HARQ-ACK information bit of a CBG if the UE correctly received all code blocks of the CBG and generates a NACK for the HARQ-ACK information bit of a CBG if the UE incorrectly received at least one code block of the CBG. If the UE receives two transport blocks, the UE concatenates the HARQ-ACK information bits for CBGs of the second transport block after the HARQ-ACK information bits for CBGs of the first transport block.

The HARQ-ACK codebook includes the $N_{HARQ-ACK}^{CBG/TB,max}$ HARQ-ACK information bits and, if $N_{HARQ-ACK}^{CBG/TB} < N_{HARQ-ACK}^{CBG/TB,max}$ for a transport block, the UE generates a NACK value for the last $N_{HARQ-ACK}^{CBG/TB,max} - N_{HARQ-ACK}^{CBG/TB}$ HARQ-ACK information bits for the transport block in the HARQ-ACK codebook.

If the UE generates a HARQ-ACK codebook in response to a retransmission of a transport block, corresponding to a same HARQ process as a previous transmission of the transport block, the UE generates an ACK for each CBG that the UE correctly decoded in a previous transmission of the transport block.

If a UE correctly detects each of the $N_{HARQ-ACK}^{CBG/TB}$ CBGs and does not correctly detect the transport block for the $N_{HARQ-ACK}^{CBG/TB}$ CBGs, the UE generates a NACK value for each of the $N_{HARQ-ACK}^{CBG/TB}$ CBGs.

This clause applies if the UE is configured with pdsch-HARQ-ACK-Codebook=semi-static.

A UE (such as the UE 116) does not expect to be configured with pdsch-HARQ-ACK-Codebook=semi-static for a codebook if a UE is provided subslotLength-For-PUCCH for the codebook.

A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format.

If a UE is not provided pdsch-HARQ-ACK-OneShot-Feedback, the UE does not expect to receive a PDSCH scheduled by a DCI format that the UE detects in any PDCCH monitoring occasion and includes a PDSCH-to-HARQ_feedback timing indicator field providing an inapplicable value from dl-DataToUL-ACK-r16.

If the UE is provided pdsch-AggregationFactor-r16 in SPS-Config or pdsch-AggregationFactor in PDSCH-Config and no entry in pdsch-TimeDomainAllocationList and pdsch-TimeDomainAllocationListDCI-1-2 includes repetitionNumber in PDSCH-TimeDomainResourceAllocationr16, $N_{PDSCH}^{repeat,max}$ is a maximum value of pdsch-AggregationFactor-r16 in SPS-Config or pdsch-AggregationFactor in PDSCH-Config; otherwise $N_{PDSCH}^{repeat,max}=1$. The UE reports HARQ-ACK information for a PDSCH reception (i) from DL slot $n_D-N_{PDSCH}^{repeat}+1$ to DL slot $n_D$, if $N_{PDSCH}^{repeat}$ is provided by pdsch-AggregationFactor or pdsch-AggregationFactor-r16 [6, REF4], or (ii) from DL slot $n_D$–repetitionNumber+1 to DL slot $n_D$, if the time domain resource assignment field in the DCI format scheduling the PDSCH reception indicates an entry containing repetitionNumber, or (iii) in DL slot $n_D$, otherwise only in a HARQ-ACK codebook that the UE includes in a PUCCH or PUSCH transmission in slot n+k, where n is a UL slot overlapping with the end of the PDSCH reception in DL slot $n_D$ and k is a number of slots indicated by the PDSCH-to-HARQ_feedback timing indicator field in a corresponding DCI format or provided by dl-DataToUL-ACK if the PDSCH-to-HARQ_feedback timing indicator field is not present in the DCI format. If the UE reports HARQ-ACK information for the PDSCH reception in a slot other than slot n+k, the UE sets a value for each corresponding HARQ-ACK information bit to NACK.

If a UE reports HARQ-ACK information in a PUCCH only for (i) a SPS PDSCH release indicated by DCI format 1_0 with counter DAI field value of 1, or (ii) a PDSCH reception scheduled by DCI format 1_0 with counter DAI field value of 1 on the PCell, or (iii) SPS PDSCH reception(s), then the $M_{A,c}$ occasions for candidate PDSCH receptions as determined (for a Type-1 CB) in clause 9.1.2.1, the UE determines a HARQ-ACK codebook only for the SPS PDSCH release or only for the PDSCH reception or only for one SPS PDSCH reception according to corresponding $M_{A,c}$ occasion(s) on respective serving cell(s), where the value of counter DAI in DCI format 1_0 is according to Table (2) and HARQ-ACK information bits in response to more than one SPS PDSCH receptions that the UE is configured to receive are ordered according to the following pseudo-code, denoted as Syntax (1); otherwise, the procedures for a HARQ-ACK codebook determination apply.

```
Syntax                                                           (1)
Set N_cells^DL to the number of serving cells configured to the UE
Set N_c^SPS to the number of SPS PDSCH configuration configured to the UE for serving cell c
Set N_c^DL to the number of DL slots for SPS PDSCH reception on serving cell c with HARQ-
   ACK information multiplexed on the PUCCH
Set j = 0 – HARQ-ACK information bit index
Set c = 0 – serving cell index: lower indexes correspond to lower RRC indexes of
corresponding cell
   while c < N_cells^DL
      Set s = 0 – SPS PDSCH configuration index: lower indexes correspond to lower RRC
         indexes of corresponding SPS configurations
         while s < N_c^SPS
            Set n_D = 0 – slot index
               while n_D < N_c^DL
                  if {
                     a UE is configured to receive SPS PDSCHs from slot n_D – N_PDSCH^repeat + 1
                     to slot n_D for SPS PDSCH configuration s on serving cell c, excluding
                     SPS PDSCHs that are not required to be received in any slot among
                     overlapping SPS PDSCHs, if any according to [6, REF4], or based on a
                     UE capability for a number of PDSCH receptions in a slot according to
                     [6, REF4], or due to overlapping with a set of symbols indicated as uplink
                     by tdd-UL-DL-ConfigurationCommon or by tdd-UL-DL-
                     ConfigurationDedicated where N_PDSCH^repeat provided by pdsch-
                     AggregationFactor-r16 in sps-Config or, if pdsch-AggregationFactor-
                     r16 is not included in sps-Config, by pdsch-AggregationFactor in pdsch-
                     config, and
                     HARQ-ACK information for the SPS PDSCH is associated with the
                     PUCCH
                  }
                  õ_j^ACK = HARQ-ACK information bit for this SPS PDSCH reception
                  j = j + 1;
               end if
               n_D = n_D + 1;
            end while
            s = s + 1;
         end while
         c = c + 1;
      end while
```

Table (2), below, describes a value of counter DAI (C-DAI) for $N_{C-DAI}^{DL}=2$ and of total DAI.

TABLE 2

| DAI MSB, LSB | $V_{C-DAI}^{DL}$ or $V_{T-DAI}^{DL}$ | Number of {serving cell, PDCCH monitoring occasion}-pair(s) in which PDSCH transmission(s) associated with PDCCH or PDCCH indicating SPS PDSCH release or DCI format 1_1 indicating SCell dormancy is present, denoted as Y and Y ≥ 1 |
|---|---|---|
| 0, 0 | 1 | (Y – 1) mod $T_D$ + 1 = 1 |
| 0, 1 | 2 | (Y – 1) mod $T_D$ + 1 = 2 |
| 1, 0 | 3 | (Y – 1) mod $T_D$ + 1 = 3 |
| 1, 1 | 4 | (Y – 1) mod $T_D$ + 1 = 4 |

In certain embodiments, Type-1 HARQ-ACK codebook in physical uplink control channel is constructed as follows.

For a serving cell c, an active DL BWP (of the serving cell c), and an active UL BWP (of the primary cell), the UE determines a set of $M_{A,c}$ occasions for candidate PDSCH receptions for which the UE can transmit corresponding HARQ-ACK information in a PUCCH in slot $n_U$. If serving cell c is deactivated, the UE uses as the active DL BWP for determining the set of $M_{A,c}$ occasions for candidate PDSCH receptions a DL BWP provided by firstActiveDownlinkBWP-Id. The determination is based on 5 parameters. For the first parameter, the determination is based on a set of slot timing values $K_1$ associated with the active UL BWP. Here, If the UE is configured to monitor PDCCH for DCI format 1_0 and is not configured to monitor PDCCH for either DCI format 1_1 or DCI format 1_2 on serving cell c, $K_1$ is provided by the slot timing values {1, 2, 3, 4, 5, 6, 7, 8}. Similarly, If the UE is configured to monitor PDCCH for DCI format 1_1 and is not configured to monitor PDCCH for DCI format 1_2 for serving cell c, $K_1$ is provided by dl-DataToUL-ACK. Additionally, If the UE is configured to monitor PDCCH for DCI format 1_2 and is not configured to monitor PDCCH for DCI format 1_1 for serving cell c, $K_1$ is provided by dl-DataToUL-ACK-ForDCIFormat1_2. Moreover, If the UE is configured to monitor PDCCH for DCI format 1_1 and DCI format 1_2 for serving cell c, $K_1$ is provided by the union of dl-DataToUL-ACK and dl-DataToUL-ACK-ForDCIFormat1_2.

For the second parameter, the determination is based on a set of row indexes R of a table that is associated with the active DL BWP and defining respective sets of slot offsets $K_0$, start and length indicators SLIV, and PDSCH mapping types for PDSCH reception as described in [REF4], where the row indexes R of the table are provided by the union of row indexes of time domain resource allocation tables for DCI formats the UE is configured to monitor PDCCH for serving cell c. If the UE is provided referenceOfSLIVDCI-1-2, for each row index with slot offset $K_0=0$ and PDSCH mapping Type B in a set of row indexes of a table for DCI format 1_2 [REF4], for any PDCCH monitoring occasion in any slot where the UE monitors PDCCH for DCI format 1_2 and with starting symbol $S_0>0$, if $S+S_0+L \leq 14$ for normal cyclic prefix and $S+S_0+L \leq 12$ for extended cyclic prefix, add a new row index in the set of row indexes of the table by replacing the starting symbol S of the row index by $S+S_0$.

For the third parameter, the determination is based on the ratio $2^{\mu_{DL}-\mu_{UL}}$ between the downlink SCS configuration $\mu_{DL}$ and the uplink SCS configuration $\mu_{UL}$ provided by subcarrierSpacing in BWP-Downlink and BWP-Uplink for the active DL BWP and the active UL BWP, respectively.

For the fourth parameter, the determination is based if provided, on tdd-UL-DL-ConfigurationCommon and tdd-UL-DL-ConfigurationDedicated.

For the fifth parameter, the determination is based if ca-SlotOffset is provided, on $N_{slot,offset,c}^{DL}$ and $\mu_{offset,DL,c}$ provided by ca-SlotOffset for serving cell c, or on $N_{slot,offset}^{UL}$ and $\mu_{offset,UL}$ provided by ca-SlotOffset for the primary cell.

In certain embodiments, UE (such as the UE 116) generates a Type-1 HARQ-ACK codebook for the set $S_0$ and the set $S_1$ of serving cells separately by setting $N_{cells}^{DL}=N_{cells}^{DL,0}$ and $N_{cells}^{DL}=N_{cells}^{DL,1}$ in the following pseudo-code, denoted as Syntax (2), if the following conditions apply. It is noted that the UE concatenates the HARQ-ACK codebook generated for the set $S_0$ followed by the HARQ-ACK codebook generated for the set $S_1$ to obtain a total number of $O_{ACK}$ HARQ-ACK information bits. The conditions include that the UE (i) is not provided coresetPoolIndex or is provided coresetPoolIndex with a value of 0 for first CORESETs on active DL BWPs of serving cells; (ii) is provided coresetPoolIndex with a value of 1 for second CORESETs on active DL BWPs of the serving cells, and (iii) is provided ackNackFeedbackMode=joint. In these conditions, (i) a serving cell is placed in a first set $S_0$ of $N_{cells}^{DL,0}$ serving cells if the serving cell includes a first CORESET, (ii) a serving cell is placed in a second set $S_1$ of $N_{cells}^{DL,1}$ serving cells if the serving cell includes a second CORESET, and (iii) serving cells are placed in a set according to an ascending order of a serving cell index.

For the set of slot timing values $\kappa_i$, the UE determines a set of $M_{A,c}$ occasions for candidate PDSCH receptions or SPS PDSCH releases according to the following pseudo-code, denoted as Syntax (2). A location in the Type-1 HARQ-ACK codebook for HARQ-ACK information corresponding to a single SPS PDSCH release is same as for a corresponding SPS PDSCH reception. A location in the Type-1 HARQ-ACK codebook for HARQ-ACK information corresponding to multiple SPS PDSCH releases by a single DCI format is same as for a corresponding SPS PDSCH reception with the lowest SPS configuration index among the multiple SPS PDSCH releases.

```
Syntax                                                                          (2)
Set j=0 – index of occasion for candidate PDSCH reception or SPS PDSCH release
Set B = ∅
Set M_{A,c} = ∅
Set 𝒞(K_1) to the cardinality of set K_1
Set k =0 – index of slot timing values K_{1,k}, in descending order of the slot timing values,
in set K_1 for serving cell c
If a UE is not provided ca-SlotOffset for any serving cell of PDSCH receptions and for
the serving cell of corresponding PUCCH transmission with HARQ-ACK information
    while k < 𝒞 (K_1)
        if mod (n_U – K_{1,k} + 1, max(2^{μUL-μDL} ,1))= 0
            Set n_D = 0 – index of a DL slot within an UL slot
            while n_D < max(2^{μUL-μDL},1)
                Set R to the set of rows
                Set 𝒞(R) to the cardinality of R
                Set r=0 – index of row in set R
                if slot n_U starts at a same time as or after a slot for an active DL BWP change on
                serving cell c or an active UL BWP change on the PCell and slot
                ⌊(n_U – K_{1,k}) · 2^{μDL-μUL}⌋ + n_D is before the slot for the active DL BWP change on
                serving cell c or the active UL BWP change on the PCell
                    n_D = n_D + 1;
                else
                    while r < 𝒞(R)
                        if the UE is provided tdd-UL-DL-ConfigurationCommon, or tdd-UL-DL-
                        ConfigurationDedicated and, for each slot from slot ⌊(n_U – K_{1,k}) ·
                        2^{μDL-μUL}⌋ + n_D – N_{PDSCH}^{repeat,max} + 1 to slot ⌊(n_U – K_{1,k}) · 2^{μDL-μUL}⌋ + n_D,
```

-continued

```
        at least one symbol of the PDSCH time resource derived by row r is
        configured as UL where K₁ₖ is the k-th slot timing value in set K₁,
            R=R\r;
        else
            r = r + 1;
        end if
    end while
    if the UE does not indicate a capability to receive more than one unicast
        PDSCH per slot and R ≠ Ø,
        M_{A,c} = M_{A,c}∪j;
        j = j+1;
    else
        Set 𝒞(R) to the cardinality of R
        Set m to the smallest last OFDM symbol index, as determined by the
            SLIV, among all rows of R
        while R≠Ø
            Set r=0
            while r < 𝒞(R)
                if S ≤ m for start OFDM symbol index S for row r
                    b_{r,k,n_D} = j ; - index of occasion for candidate PDSCH reception or
                        SPS PDSCH release associated with row r
                        R = R\r ;
                        B = B∪b_{r,k,n_D};
                    else
                        r = r + 1;
                    end if
                end while
                M_{A,c} = M_{A,c}∪j;
                j = j+1;
                Set m to the smallest last OFDM symbol index among all rows of R ;
            end while
        end if
        n_D = n_D + 1;
        end if
    end while
end if
k = k+1;
end while
else
    while k < 𝒞(K₁)
```

$$\text{if } \mathrm{mod}\left(n_U - K_{1,k} + \left\lfloor\left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}}\right\rfloor + 1, \max(2^{\mu_{UL}-\mu_{DL}}, 1)\right) = 0$$

```
        Set n_D = 0 - index of a DL slot within an UL slot
        while n_D < max(2^{μDL-μUL},1)
            Set R to the set of rows
            Set 𝒞(R) to the cardinality of R
            Set r=0 - index of row in set R
if slot n_U starts at a same time as or after a slot for an active DL BWP change on
serving cell c or an active UL BWP change on the PCell and slot
```

$$\left\lfloor (n_U - K_{1,k}) \cdot 2^{\mu_{DL}-\mu_{UL}} \right\rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$$

```
        is before the slot for the active DL BWP change on serving cell c or the active
        UL BWP change on the PCell
            n_D = n_D + 1;
        else
            while r < 𝒞(R)
                if the UE is provided tdd-UL-DL-ConfigurationCommon, or tdd-UL-DL-
                    ConfigurationDedicated and, for each slot from slot ⌊(n_U − K_{1,k}) · 2^{μDL−μUL}⌋ +
```

$$\left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D - N^{repeat,max}_{PDSCH} + 1 \text{ to}$$

$$\text{slot}\lfloor n_U - K_{1,k}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D, \text{ at}$$

```
                least one symbol of the PDSCH time resource derived by row r is
                configured as UL where K_{lk} is the k-th slot timing value in set K₁ ,
                    R = R\r;
                else
                    r = r + 1;
                end if
            end while
            if the UE does not indicate a capability to receive more than one unicast
                PDSCH per slot and R ≠ Ø,
                M_{A,c} = M_{A,c}∪j;
                j = j+i;
```

```
    else
        Set 𝒞(R) the cardinality of R
        Set m to the smallest last OFDM symbol index, as determined by the
            SLIV, among all rows of R
        while R≠∅
            Set r=0
            while r < 𝒞(R)
                if S ≤ m for start OFDM symbol index S for row r
                    b_{r,k,n_D} = j ; - index of occasion for candidate PDSCH reception or
                        SPS PDSCH release associated with row r
                    R=R\r;
                    B = B∪b_{r,k,n_D};
                else
                    r = r + 1;
                end if
            end while
            M_{A,c} =M_{A,c}∪j;
            j = j + i;
            Set m to the smallest last OFDM symbol index among all rows of R ;
        end while
    end if
    n_D = n_D + 1;
  end if
 end while
 end if
 k = k + 1;
end while
end if
```

In certain embodiments if a UE (such as the UE 116) indicates a capability to receive more than one PDSCH per slot, for occasions of candidate PDSCH receptions corresponding to rows of R associated with a same value of $B_{r,k,n_d}$, where $B_{r,k,n_d} \in B$, the UE does not expect to receive more than one PDSCH in a same DL slot.

If a UE receives a SPS PDSCH, or a SPS PDSCH release, or a PDSCH that is scheduled by a DCI format that does not support CBG-based PDSCH receptions and if (i) the UE is configured with one serving cell, (ii) $C(M_{A,c})=1$, and (iii) PDSCH-CodeBlockGroupTransmission is provided to the UE, then the UE generates HARQ-ACK information only for the transport block in the PDSCH or only for the SPS PDSCH release.

If a UE receives a SPS PDSCH, or a SPS PDSCH release, or a PDSCH that is scheduled by a DCI format that does not support CBG-based PDSCH receptions and if (i) the UE is configured with more than one serving cells, or (ii) $C(M_{A,c})>1$, and (iii) PDSCH-CodeBlockGroupTransmission is provided to the UE, them the UE repeats $N_{HARQ-ACK}^{CGB/TB,max}$ times the HARQ-ACK information for the transport block in the PDSCH or for the SPS PDSCH release.

In certain embodiments, A UE does not expect to detect a DCI format switching a DL BWP within $N_3$ symbols prior to a first symbol of a PUCCH transmission where the UE multiplexes HARQ-ACK information. Herein, if processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=20$ for $\mu=3$.

If a UE is provided dl-DataToUL-ACK or dl-DataToUL-ACK-ForDCIFormat1_2, the UE does not expect to be indicated by DCI format 1_0 a slot timing value for transmission of HARQ-ACK information that does not belong to the intersection of the set of slot timing values {1, 2, 3, 4, 5, 6, 7, 8} and the set of slot timing values provided by $K_1$ for the active DL BWP of a corresponding serving cell.

If maxNrofCodeWordsScheduledByDCI indicates reception of two transport blocks, when the UE receives a PDSCH with one transport block or a SPS PDSCH release, the HARQ-ACK information is associated with the first transport block and the UE generates a NACK for the second transport block if harq-ACK-SpatialBundlingPUCCH is not provided and generates HARQ-ACK information with value of ACK for the second transport block if harq-ACK-SpatialBundlingPUCCH is provided.

A UE determines $\tilde{o}_0^{ACK}, \tilde{o}_1^{ACK}, \ldots, \tilde{o}_{O_{ACK}-1}^{ACK}$ HARQ-ACK information bits, for a total number of $O_{ACK}$ HARQ-ACK information bits, of a HARQ-ACK codebook for transmission in a PUCCH according to the following pseudo-code, denoted as Syntax (3). In Syntax (3), if the UE does not receive a transport block or a CBG, due to the UE not detecting a corresponding DCI format, the UE generates a NACK value for the transport block or the CBG. The cardinality of the set $M_{A,C}$ defines a total number $M_C$ of occasions for PDSCH reception or SPS PDSCH release for serving cell C corresponding to the HARQ-ACK information bits.

Syntax (3)
```
Set c=0 – serving cell index: lower indexes correspond to lower RRC indexes of
    corresponding cells including, when applicable, cells in the set S_0 and the set S_1
Set j=0 – HARQ-ACK information bit index
Set N_cells^DL to the number of serving cells configured by higher layers for the UE
    while c < N_cells^DL
        Set m=0 – index of occasion for candidate PDSCH reception or SPS PDSCH
            release
```

```
while m < M_c
    if harq-ACK-SpatialBundlingPUCCH is not provided, PDSCH-
        CodeBlockGroupTransmission is not provided, and the UE is configured by
        maxNrofCodeWordsScheduledByDCI with reception of two transport blocks
        for the active DL BWP of serving cell c,
        õ_j^ACK = HARQ-ACK information bit corresponding to a first transport block of
            this cell;
        j = j +1 ;
        õ_j^ACK = HARQ-ACK information bit corresponding to a second transport block
            of this cell;
        j = j +1 ;
    elseif harq-ACK-SpatialBundlingPUCCH is provided, and the UE is configured
        by maxNrofCodeWordsScheduledByDCI with reception of two transport
        blocks for the active DL BWP of serving cell c,
        õ_j^ACK = binary AND operation of the HARQ-ACK information bits
            corresponding to first and second transport blocks of this cell - if the UE
            receives one transport block, the UE assumes ACK for the second
            transport block;
        j = j +1 ;
    elseif PDSCH-CodeBlockGroupTransmission is provided, and N_HARQ-ACK, c^CBG/TB, max CBGs
        are indicated by maxCodeBlockGroupsPerTransportBlock for serving cell c,
        Set n_CBG = 0 - CBG index
        while n_CBG < N_HARQ-ACK, c^CBG/TB, max
            õ_{j+n_CBG}^ACK = HARQ-ACK information bit corresponding to CBG n_CBG of the
                first transport block;
            if the UE is configured by maxNrofCodeWordsScheduledByDCI with
                reception of two transport blocks for the active DL BWP of serving cell
                c
                o_{j+n_CBG+N_HARQ-ACK,c}^BG/TB, maxACK = HARQ-ACK information bit corresponding to CBG n_CBG
                    of the second transport block;
            end if
            n_CBG = n_CBG +1 ;
        end while
        j = j + N_{TB,c}^DL · N_{HARQ-ACK,c}^CBG/TB,max , where N_{TB,c}^DL is the value of
            maxNrofCodeWordsScheduledByDCI for the active DL BWP of serving
            cell c;
    else
        õ_j^ACK = HARQ-ACK information bit of serving cell c;
        j = j +1 ;
    end if
    m = m+1 ;
end while
c = c+1 ;
end while
```

If $O_{ACK}+O_{SR}+O_{CSI} \leq 11$, the UE determines a number of HARQ-ACK information bits $n_{HARQ-ACK}$ for obtaining a transmission power for a PUCCH as $$n_{HARQ-ACK} = \sum_{C=0}^{N_{cells}^{DL}-1} \sum_{m=0}^{M_c-1} N_{m,c}^{received} + \sum_{C=0}^{N_{cells}^{DL}-1} \sum_{m=0}^{M_c-1} N_{m,c}^{received,CBG}.$$

Here, $N_{m,c}^{received}$ is the number of transport blocks the UE receives in PDSCH reception occasion m for serving cell c if harq-ACK-SpatialBundlingPUCCH and PDSCH-CodeBlockGroupTransmission are not provided, or the number of transport blocks the UE receives in PDSCH reception occasion m for serving cell c if PDSCH-CodeBlockGroupTransmission is provided and the PDSCH reception is scheduled by a DCI format that does not support CBG-based PDSCH receptions, or the number of PDSCH receptions if harq-ACK-SpatialBundlingPUCCH is provided or SPS PDSCH release in PDSCH reception occasion m for serving cell c and the UE reports corresponding HARQ-ACK information in the PUCCH. $N_{m,c}^{received,CBG}$ is the number of CBGs the UE receives in a PDSCH reception occasion m for serving cell c if PDSCH-CodeBlockGroupTransmission is provided and the PDSCH reception is scheduled by a DCI format that supports CBG-based PDSCH receptions and the UE reports corresponding HARQ-ACK information in the PUCCH.

Type-1 HARQ-ACK codebook in physical uplink shared channel is constructed as follows.

If a UE would multiplex HARQ-ACK information in a PUSCH transmission that is not scheduled by a DCI format or is scheduled by a DCI format that does not include a DAI field, then (i) if the UE has not received any PDSCH or SPS PDSCH release that the UE transmits corresponding HARQ-ACK information in the PUSCH, based on a value of a respective PDSCH-to-HARQ_feedback timing indicator field in a DCI format scheduling the PDSCH reception or the SPS PDSCH release or on the value of dl-DataToUL-ACK if the PDSCH-to-HARQ_feedback timing indicator field is not present in DCI format 1_1 or on the value of dl-DataToUL-ACK-ForDCI-Format1-2 if the PDSCH-to-HARQ_feedback timing indicator field is not present in DCI format 1_2, in any of the Me occasions for candidate PDSCH receptions by a DCI format or SPS PDSCH on any serving cell c, the UE does not multiplex HARQ-ACK information in the PUSCH transmission; (ii) else the UE generates the HARQ-ACK codebook as described for a Type-1 HARQ-ACK codebook in physical uplink control channel, except that harq-ACK-SpatialBundlingPUCCH is replaced by harq-ACK-SpatialBundlingPUSCH, unless the UE receives only a SPS PDSCH release, or only SPS PDSCH reception, or only a PDSCH that is scheduled by DCI format 1_0 with a counter DAI field value of 1 on the PCell in the Me occasions for candidate PDSCH receptions in which case the UE generates HARQ-ACK information only for the SPS PDSCH release or only for the PDSCH reception.

A UE sets to NACK value in the HARQ-ACK codebook any HARQ-ACK information corresponding to PDSCH reception or SPS PDSCH release that the UE detects in a PDCCH monitoring occasion that starts after a PDCCH monitoring occasion where the UE detects a DCI format scheduling the PUSCH transmission.

A UE does not expect to detect a DCI format switching a DL BWP within $N_2$ symbols prior to a first symbol of a PUSCH transmission where the UE multiplexes HARQ-ACK information, where $N_2$ is defined in [REF4].

If a UE multiplexes HARQ-ACK information in a PUSCH transmission that is scheduled by DCI format that includes a DAI field, the UE generates the HARQ-ACK codebook as described for a Type-1 HARQ-ACK codebook in physical uplink control channel when a value of the DAI field is $V_{T-DAI}^{UL}=1$ except that harq-ACK-SpatialBundling-PUCCH is replaced by harq-ACK-SpatialBundlingPUSCH. The UE does not generate a HARQ-ACK codebook for multiplexing in the PUSCH transmission when $V_{T-DAI}^{UL}=0$ unless the UE receives only a SPS PDSCH release, or only SPS PDSCH(s), or only a PDSCH that is scheduled by DCI format 1_0 with a counter DAI field value of 1 on the PCell in the $M_c$ occasions for candidate PDSCH receptions in which case the UE generates HARQ-ACK information only for the SPS PDSCH release or only for the PDSCH reception. $V_{T-DAI}^{UL}=0$ if the PUSCH is scheduled by a DCI format that includes a DAI field and the DAI field is set to '0'; otherwise, $V_{T-DAI}^{UL}=1$.

This clause applies if the UE is configured with pdsch-HARQ-ACK-Codebook=dynamic or with pdsch-HARQ-ACK-Codebook-r16. Unless stated otherwise, a PDSCH-to-HARQ_feedback timing indicator field provides an applicable value.

A UE does not expect to multiplex in a Type-2 HARQ-ACK codebook HARQ-ACK information that is in response to a detection of a DCI format that does not include a counter DAI field.

If a UE receives a first DCI format that the UE detects in a first PDCCH monitoring occasion and includes a PDSCH-to-HARQ_feedback timing indicator field providing an inapplicable value from dl-DataToUL-ACK-r16, if the UE detects a second DCI format, the UE multiplexes the corresponding HARQ-ACK information in a PUCCH or PUSCH transmission in a slot that is indicated by a value of a PDSCH-to-HARQ_feedback timing indicator field in the second DCI format, otherwise, the UE does not multiplex the corresponding HARQ-ACK information in a PUCCH or PUSCH transmission. Here, if the UE is not provided pdsch-HARQ-ACK-Codebook-r16, the UE detects the second DCI format in any PDCCH monitoring occasion after the first one, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format. If the UE is provided pdsch-HARQ-ACK-Codebook-r16, the UE detects the second DCI format in any PDCCH monitoring occasion after the first one, and the second DCI format indicates a HARQ-ACK information report for a same PDSCH group index as indicated by the first DCI format as described in clause 9.1.3.3, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format. If the UE is provided pdsch-HARQ-ACK-Codebook-r16, the UE receives the second DCI format later than the slot for HARQ-ACK information in response to a SPS PDSCH reception received after the PDSCH scheduled by the first DCI format, and the second DCI format indicates a HARQ-ACK information report for a same PDSCH group index as indicated by the first DCI format as described in clause 9.1.3.3. If the UE is provided pdsch-HARQ-ACK-OneShotFeedback, the first DCI format does not indicate SPS PDSCH release or SCell dormancy, the UE detects the second DCI format in any PDCCH monitoring occasion after the first one, and the second DCI format includes a One-shot HARQ-ACK request field with value 1, the UE includes the HARQ-ACK information in a Type-3 HARQ-ACK codebook, as described in clause 9.1.4, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format. If the UE is provided pdsch-HARQ-ACK-OneShotFeedback-r16, the first DCI format does not indicate SPS PDSCH release or SCell dormancy, and the UE receives the second DCI format later than the slot for HARQ-ACK information in response to a SPS PDSCH reception received after the PDSCH scheduled by the first DCI format, and the second DCI format includes a One-shot HARQ-ACK request field with value 1, the UE includes the HARQ-ACK information in a Type-3 HARQ-ACK codebook, as described in clause 9.1.4.

A UE generates a Type-3 HARQ-ACK codebook determination as follows.

If a UE is provided pdsch-HARQ-ACK-OneShotFeedback, the UE determines $\tilde{o}_0^{ACK}, \tilde{o}_1^{ACK}, \ldots, \tilde{o}_{O_{ACK}-1}^{ACK}$ HARQ-ACK information bits, for a total number of $O_{ACK}$ HARQ-ACK information bits, of a Type-3 HARQ-ACK codebook according to the following procedure, denoted as Syntax (5).

Syntax (5)

Set $N_{cells}^{DL}$ to the number of configured serving cells
Set $N_{HARQ,c}^{DL}$ the value of nrofHARQ-ProcessesForPDSCH for serving cell c, if provided; else, set $N_{HARQ,c}^{DL} = 8$
Set $N_{TB,c}^{DL}$ to the value of maxNrofCodeWordsScheduledByDCI for serving cell c if harq-ACK-SpatialBundlingPUCCH is provided and $NDI_{HARQ} = 0$, or if harq-ACK-SpatialBundlingPUCCH is not provided, or if maxCodeBlockGroupsPerTransportBlock is provided for serving cell c; else, set $N_{TB,c}^{DL} = 1$
Set $N_{HARQ-ACK,c}^{CBG/TB,max}$ to the number of HARQ-ACK information bits per TB for PDSCH receptions on serving cell c as described in clause 9.1.1 if maxCodeBlockGroupsPerTransportBlock is provided for serving cell c and pdsch-HARQ-ACK-OneShotFeedbackCBG is provided; else, set $N_{HARQ-ACK,c}^{CBG/TB,max} = 0$
Set $NDI_{HARQ} = 0$ if pdsch-HARQ-ACK-OneShotFeedbackNDI is provided; else set $NDI_{HARQ} = 1$

```
Set c = 0 - serving cell index
Set h = 0 - HARQ process number
Set t = 0 - TB index
Set g = 0 - CBG index
Set j = 0
  while c < $N_{cells}^{DL}$
    while h < $N_{HARQ,c}^{DL}$
      if $NDI_{HARQ}$ = 0
        if $N_{HARQ-ACK,c}^{CBG/TB,max}$ > 0
          while t < $N_{TB,c}^{DL}$
            while g < $N_{HARQ-ACK,c}^{CBG/TB,max}$
              $õ_j^{ACK}$ = HARQ-ACK information bit for CBG g of TB t for HARQ
                process number h of serving cell c, if any; else, $õ_j^{ACK}$ = 0
                       j = j + 1
                       g = g + 1
            end while
            $õ_j^{ACK}$ = NDI value indicated in the DCI format corresponding to the HARQ-
              ACK information bit(s) for TB t for HARQ process number h on serving
              cell c, if any; else, $õ_j^{ACK}$ = 0
                       g = 0
                       j = j + 1
                       t = t + 1
          end while
        else
          while t < $N_{TB,c}^{DL}$
            $õ_j^{ACK}$ = HARQ-ACK information bit for TB t for HARQ process h of
              serving cell c, if any; else, $õ_j^{ACK}$ = 0
                       j = j + 1
            $õ_j^{ACK}$ = NDI value indicated in the DCI format corresponding to the HARQ-
              ACK information bit(s) for TB t for HARQ process number h on serving
              cell c, if any; else, $õ_j^{ACK}$ = 0
                       j = j + 1
                       t = t + 1
          end while
        end if
                       t = 0
      else
        if $N_{HARQ-ACK,c}^{CBG/TB,max}$ > 0
          while t < $N_{TB,c}^{DL}$
            if UE has obtained HARQ-ACK information for TB t for HARQ process
              number h on serving cell c corresponding to a PDSCH reception and has
              not reported the HARQ-ACK information corresponding to the PDSCH
              reception
              while g < $N_{HARQ-ACK,c}^{CBG/TB,max}$
                $õ_j^{ACK}$ = HARQ-ACK information bit for CBG g of TB t for HARQ
                  process number h of serving cell c
                       j = j + 1
                       g = g + 1
              end while
            else
              while g < $N_{HARQ-ACK,c}^{CBG/TB,max}$
                $õ_j^{ACK}$ = NACK
                       j = j + 1
                       g = g + 1
              end while
            end if
                       g = 0
                       t = t + 1
          end while
        else
          while t < $N_{TB,c}^{DL}$
            if UE has obtained HARQ-ACK information for TB t for HARQ process
              number h on serving cell c corresponding to a PDSCH reception and has
              not reported the HARQ-ACK information corresponding to the PDSCH
              reception
              if harq-ACK-SpatialBundlingPUCCH is not provided
                $õ_j^{ACK}$ = HARQ-ACK information bit for TB t for HARQ process h of
                  serving cell c
              else
                $õ_j^{ACK}$ = binary AND operation of the HARQ-ACK information bits
                  corresponding to first and second transport blocks for HARQ process
                  h of serving cell c. If the UE receives one transport block, the UE
                  assumes ACK for the second transport block
              end if
                       j = j + 1
                       t = t + 1
            else
              $õ_j^{ACK}$ = NACK
                       j = j + 1
```

```
               t = t + 1
        end if
      end while
    end if
               t = 0
  end if
               h = h + 1
  end while
               h = 0
               c = c + 1
end while
```

If $N_{TB,c}^{DL} > 1$, when a UE receives a PDSCH with one transport block, the HARQ-ACK information is associated with the first transport block.

If a UE receives a SPS PDSCH, or a PDSCH that is scheduled by a DCI format that does not support CBG-based PDSCH receptions for a serving cell c and if maxCodeBlockGroupsPerTransportBlock is provided for serving cell c, and pdsch-HARQ-ACK-OneShotFeedbackCBG is provided, the UE repeats $N_{HARQ-ACK,c}^{CBG/TB,max}$ times the HARQ-ACK information for the transport block in the PDSCH.

If a UE detects a DCI format that includes a One-shot HARQ-ACK request field with value 1, the UE determines a PUCCH or a PUSCH to multiplex a Type-3 HARQ-ACK codebook for transmission in a slot. The UE multiplexes only the Type-3 HARQ-ACK codebook in the PUCCH or the PUSCH for transmission in the slot.

If (i) a UE detects a DCI format that includes a One-shot HARQ-ACK request field with value 1, and (ii) he CRC of the DCI is scrambled by a C-RNTI or an MCS-C-RNTI, and (iii) resourceAllocation=resourceAllocationType0 and all bits of the frequency domain resource assignment field in the DCI format are equal to 0, or (iv) resourceAllocation=resourceAllocationType1 and all bits of the frequency domain resource assignment field in the DCI format are equal to 1, or (v) resourceAllocation=dynamicSwitch and all bits of the frequency domain resource assignment field in the DCI format are equal to 0 or 1, then the DCI format provides a request for a Type-3 HARQ-ACK codebook report and does not schedule a PDSCH reception. The UE is expected to provide HARQ-ACK information in response to the request for the Type-3 HARQ-ACK codebook after N symbols from the last symbol of a PDCCH providing the DCI format, where the value of N for µ=0,1,2 is provided in clause 10.2 by replacing "SPS PDSCH release" with "DCI format".

If a UE multiplexes HARQ-ACK information in a PUSCH transmission, the UE generates the HARQ-ACK codebook as described in this clause except that harq-ACK-SpatialBundlingPUCCH is replaced by harq-ACK-SpatialBundlingPUSCH.

UCI types reported in a PUCCH include HARQ-ACK information, SR, link recovery request (LRR), and CSI. UCI bits include HARQ-ACK information bits, if any, SR information bits, if any, LRR information bit, if any, and CSI bits, if any. The HARQ-ACK information bits correspond to a HARQ-ACK codebook. For the remaining of this clause, any reference to SR is applicable for SR and/or for LRR.

A UE may transmit one or two PUCCHs on a serving cell in different symbols within a slot. When the UE transmits two PUCCHs in a slot and the UE is not provided ackNackFeedbackMode=separate, at least one of the two PUCCHs uses PUCCH format 0 or PUCCH format 2.

If a UE is provided ackNackFeedbackMode=separate, the UE may transmit up to two PUCCHs with HARQ-ACK information in different symbols within a slot.

A UE assumes 11 CRC bits if a number of respective UCI bits is larger than or equal to 360; otherwise, the UE determines a number of CRC bits based on the number of respective UCI bits as described in [REF2].

If a UE does not have dedicated PUCCH resource configuration, provided by PUCCH-ResourceSet in PUCCH-Config, a PUCCH resource set is provided by pucch-ResourceCommon through an index to a row of [Table 9.2.1-1, REF3] for transmission of HARQ-ACK information on PUCCH in an initial UL BWP of $N_{BWP}^{size}$ PRBs.

The PUCCH resource set includes sixteen resources, each corresponding to a PUCCH format, a first symbol, a duration, a PRB offset $RB_{BWP}^{offset}$, and a cyclic shift index set for a PUCCH transmission.

The UE transmits a PUCCH using frequency hopping if not provided useInterlacePUCCH-PUSCH in BWP-UplinkCommon; otherwise, the UE transmits a PUCCH without frequency hopping.

An orthogonal cover code with index 0 is used for a PUCCH resource with PUCCH format 1 in [Table 9.2.1-1, REF3].

The UE transmits the PUCCH using the same spatial domain transmission filter as for a PUSCH transmission scheduled by a random-access response (RAR) UL grant.

If a UE is not provided any of pdsch-HARQ-ACK-Codebook, pdsch-HARQ-ACK-Codebook-r16, or pdsch-HARQ-ACK-OneShotFeedback, the UE generates at most one HARQ-ACK information bit.

If the UE provides HARQ-ACK information in a PUCCH transmission in response to detecting a DCI format scheduling a PDSCH reception or a SPS PDSCH release, the UE determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a CORESET of a PDCCH reception with the DCI format, $n_{CCE,0}$ is the index of a first CCE for the PDCCH reception, and APRI is a value of the PUCCH resource indicator field in the DCI format.

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon then (i) the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes, and (ii) the UE determines the initial cyclic shift index in the set of initial cyclic shift indexes as $r_{PUCCH}$ mod $N_{CS}$.

If $\lfloor r_{PUCCH}/8 \rfloor = 1$ and a UE is provided a PUCCH resource by pucch-ResourceCommon and is not provided useInterlacePUCCH-PUSCH in BWP-UplinkCommon (i) the UE determines the PRB index of the PUCCH transmission in the first hop as $N_{BWP}^{size} - 1 - RB_{BWP}^{offset} - \lfloor (r_{PUCCH} - 8)/N_{CS} \rfloor$ and the PRB index of the PUCCH transmission in the second hop as $RB_{BWP}^{offset} + \lfloor (r_{PUCCH} - 8)/N_{CS} \rfloor$, and (ii) the UE determines the initial cyclic shift index in the set of initial cyclic shift indexes as $(r_{PUCCH} - 8) \bmod N_{CS}$ If a UE is provided a PUCCH resource by pucch-ResourceCommon and is provided useInterlacePUCCH-PUSCH in BWP-UplinkCommon then the following occurs. First, the UE determines for the PUCCH resource an interlace index m as $m = (m_0 + \lfloor r_{PUCCH}/N_{CS} \rfloor) \bmod M$ where M is a number of interlaces [REF1] and $m_0 = RB_{BWP}^{offset}$ is an interlace index offset and $RB_{BWP}^{offset}$ is as given in [Table 9.2.1-1, REF3]. Second, the UE determines an initial cyclic shift index in a set of initial cyclic shift indexes as $r_{PUCCH}$ mod $N_{CS}$, where $N_{CS}$ is the total number of initial cyclic shifts indexes in the set of initial cyclic shift indexes in [Table 9.2.1-1, REF3]. Third, if pucch-ResourceCommon indicates, then (i) index 0: the first symbol is 9 for a PUCCH resource with PUCCH format 0 if $r_{PUCCH} \geq 10$, (ii) index 1 or 2: the first symbol is 9 for a PUCCH resource with PUCCH format 0 if $r_{PUCCH} = 15$, and (iii) index 3, 7, or 11: an orthogonal cover code with index 1 is used for a PUCCH resource with PUCCH format 1 if $r_{PUCCH} \geq 10$. Fourth, the UE does not expect pucch-ResourceCommon to indicate index 15.

A UE can be configured up to four sets of PUCCH resources in a PUCCH-Config. A PUCCH resource set is provided by PUCCH-ResourceSet and is associated with a PUCCH resource set index provided by pucch-ResourceSetId, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadSize. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32 and the maximum number of PUCCH resources in the other PUCCH resource sets is 8.

If the UE transmits $O_{UCI}$ UCI information bits, that include HARQ-ACK information bits, the UE determines a PUCCH resource set to be one of the following. A first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously. A second set of PUCCH resources with pucch-ResourceSetId=1, if provided by higher layers, if $2 < O_{UCI} \leq N_2$ where $N_2$ is equal to maxPayloadSize if maxPayloadSize is provided for the PUCCH resource set with pucch-ResourceSetId=1; otherwise $N_2$ is equal to 1706. A third set of PUCCH resources with pucch-ResourceSetId=2, if provided by higher layers, if $N_2 < O_{UCI} \leq N_3$ where $N_3$ is equal to maxPayloadSize if maxPayloadSize is provided for the PUCCH resource set with pucch-ResourceSetId=2; otherwise $N_3$ is equal to 1706. A fourth set of PUCCH resources with pucch-ResourceSetId=3, if provided by higher layers, if $N_3 < O_{UCI} \leq 1706$.

If the UE is provided SPS-PUCCH-AN-List and transmits $O_{UCI}$ UCI information bits that include only HARQ-ACK information bits in response to one or more SPS PDSCH receptions and SR, if any, the UE determines a PUCCH resource to be one of the following four options. First, a PUCCH resource provided by sps-PUCCH-AN-ResourceID obtained from the first entry in sps-PUCCH-AN-List if $O_{UCI} \leq 2$ including 1 or 2 HARQ-ACK information bits and a positive or negative SR on one SR transmission occasion if transmission of HARQ-ACK information and SR occurs simultaneously. Second, a PUCCH resource provided by sps-PUCCH-AN-ResourceID obtained from the second entry in sps-PUCCH-AN-List, if provided, if $2 < O_{UCI} \leq N_{1,SPS}$ where $N_{1,SPS}$ is either provided by maxPayloadSize obtained from the second entry in sps-PUCCH-AN-List or is otherwise equal to 1706. Third a PUCCH resource provided by sps-PUCCH-AN-ResourceID obtained from the third entry in sps-PUCCH-AN-List, if provided, if $N_{1,SPS} < O_{UCI} \leq N_{2,SPS}$ where $N_{2,SPS}$ is either provided by maxPayloadSize obtained from the third entry in sps-PUCCH-AN-List or is otherwise equal to 1706. Fourth, a PUCCH resource provided by sps-PUCCH-AN-ResourceID obtained from the fourth entry in sps-PUCCH-AN-List, if provided, if $N_{2,SPS} < O_{UCI} \leq N_{3,SPS}$ where $N_{3,SPS}$ is equal to 1706.

UE procedure for reporting HARQ-ACK is as follows.

A UE does not expect to transmit more than one PUCCH with HARQ-ACK information in a slot per priority index, if the UE is not provided ackNackFeedbackMode=separate.

For DCI format 1_0, the PDSCH-to-HARQ_feedback timing indicator field values map to {1, 2, 3, 4, 5, 6, 7, 8}. For a DCI format, other than DCI format 1_0, scheduling a PDSCH reception or a SPS PDSCH release, the PDSCH-to-HARQ_feedback timing indicator field values, if present, map to values for a set of number of slots provided by dl-DataToUL-ACK, dl-DataToUL-ACK-r16, or dl-DataToUL-ACKForDCIFormat1_2, as defined in Table (3).

For a SPS PDSCH reception ending in slot n, the UE transmits the PUCCH in slot n+k where k is provided by the PDSCH-to-HARQ_feedback timing indicator field, if present, in a DCI format activating the SPS PDSCH reception.

If the UE detects a DCI format that does not include a PDSCH-to-HARQ_feedback timing indicator field and schedules a PDSCH reception or activates a SPS PDSCH reception ending in slot n, the UE provides corresponding HARQ-ACK information in a PUCCH transmission within slot n+k where k is provided by dl-DataToUL-ACK, or dl-DataToUL-ACK-r16, or di-DataToUL-ACKForDCIFormat1_2.

With reference to slots for PUCCH transmissions, if the UE detects a DCI format scheduling a PDSCH reception ending in slot n or if the UE detects a DCI format indicating a SPS PDSCH release or indicating SCell dormancy through a PDCCH reception ending in slot n, or if the UE detects a DCI format that requests Type-3 HARQ-ACK codebook report and does not schedule a PDSCH reception through a PDCCH reception ending in slot n, the UE provides corresponding HARQ-ACK information in a PUCCH transmission within slot n+k, where k is a number of slots and is indicated by the PDSCH-to-HARQ_feedback timing indicator field in the DCI format, if present, or provided by dl-DataToUL-ACK, dl-DataToUL-ACK-r16, or dl-DataToUL-ACKForDCIFormat1_2. k=0 corresponds to the last slot of the PUCCH transmission that overlaps with the PDSCH reception or with the PDCCH reception in case of SPS PDSCH release or in case of SCell dormancy indication or in case of the DCI format that requests Type-3 HARQ-ACK codebook report and does not schedule a PDSCH reception.

A PUCCH transmission with HARQ-ACK information is subject to the limitations for UE transmissions described in clause 11.1 and clause 11.1.1 of [REF3].

Table (3), below, describes mapping of PDSCH-to-HARQ_feedback timing indicator field values to numbers of slots

TABLE 3

| \multicolumn{3}{c}{PDSCH-to-HARQ_feedback timing indicator} | |
|---|---|---|---|
| 1 bit | 2 bits | 3 bits | Number of slots k |
| '0' | '00' | '000' | 1st value provided by dl-DataToUL-ACK, dl-DataToUL-ACK-r16, or dl-DataToUL-ACKForDCIFormat1_2 |
| '1' | '01' | '001' | 2nd value provided by dl-DataToUL-ACK, dl-DataToUL-ACK-r16, or dl-DataToUL-ACKForDCIFormat1_2 |
|  | '10' | '010' | 3rd value provided by dl-DataToUL-ACK, dl-DataToUL-ACK-r16, or dl-DataToUL-ACKForDCIFormat1_2 |
|  | '11' | '011' | 4th value provided by dl-DataToUL-ACK, dl-DataToUL-ACK-r16, or dl-DataToUL-ACKForDCIFormat1_2 |
|  |  | '100' | 5th value provided by dl-DataToUL-ACK, dl-DataToUL-ACK-r16, or dl-DataToUL-ACKForDCIFormat1_2 |
|  |  | '101' | 6th value provided by dl-DataToUL-ACK, dl-DataToUL-ACK-r16, or dl-DataToUL-ACKForDCIFormat1_2 |
|  |  | '110' | 7th value provided by dl-DataToUL-ACK, dl-DataToUL-ACK-r16, or dl-DataToUL-ACKForDCIFormat1_2 |
|  |  | '111' | 8th value provided by dl-DataToUL-ACK, dl-DataToUL-ACK-r16, or dl-DataToUL-ACKForDCIFormat1_2 |

For a PUCCH transmission with HARQ-ACK information, a UE determines a PUCCH resource after determining a set of PUCCH resources for $o_{UCI}$ HARQ-ACK information bits, as described in clause 9.2.1. The PUCCH resource determination is based on a PUCCH resource indicator field [5, REF2], if present, in a last DCI format, among the DCI formats that have a value of a PDSCH-to-HARQ_feedback timing indicator field, if present, or a value of dl-DataToUL-ACK, or dl-DataToUL-ACK-r16, or dl-DataToUL-ACKForDCIFormat1_2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided coresetPoolIndex or is provided coresetPoolIndex with value 0 for one or more first CORESETs and is provided coresetPoolIndex with value 1 for one or more second CORESETs on an active DL BWP of a serving cell, and with ackNackFeedbackMode=joint for the active UL BWP, detected DCI formats from PDCCH receptions in the first CORESETs are indexed prior to detected DCI formats from PDCCH receptions in the second CORESETs.

The PUCCH resource indicator field values map to values of a set of PUCCH resource indexes, as defined in Table (4) for a PUCCH resource indicator field of 3 bits, provided by resourceList for PUCCH resources from a set of PUCCH resources provided by PUCCH-ResourceSet with a maximum of eight PUCCH resources. If the PUCCH resource indicator field includes 1 bit or 2 bits, the values map to the first two values or the first four values, respectively, of Table (4). If the last DCI format does not include a PUCCH resource indicator field, the first value of Table (4) is used.

For the first set of PUCCH resources and when the size $R_{PUCCH}$ of resourceList is larger than eight, when a UE provides HARQ-ACK information in a PUCCH transmission in response to detecting a last DCI format in a PDCCH reception, among DCI formats with a value of the PDSCH-to-HARQ_feedback timing indicator field, if present, or a value of dl-DataToUL-ACK, or dl-DataToUL-ACK-r16, or dl-DataToUL-ACKForDCIFormat1_2, indicating a same slot for the PUCCH transmission, the UE determines a PUCCH resource with index $r_{PUCCH}$, $0 \leq r_{PUCCH} \leq R_{PUCCH} - 1$, as:

$$r_{PUCCH} = \begin{cases} \left\lfloor \frac{N_{CCE,p} \cdot \lceil R_{PUCCH}/8 \rceil}{N_{CCE,p}} \right\rfloor + \Delta_{PRI} \left\lceil \frac{R_{PUCCH}}{8} \right\rceil & \text{if } \Delta_{PRI} < R_{PUCCH} \bmod 8 \\ \left\lfloor \frac{N_{CCE,p} \cdot \lfloor R_{PUCCH}/8 \rfloor}{N_{CCE,p}} \right\rfloor + \Delta_{PRI} \left\lceil \frac{R_{PUCCH}}{8} \right\rceil + R_{PUCCH} \bmod 8 & \text{if } \Delta_{PRI} \geq R_{PUCCH} \bmod 8 \end{cases} \quad (3)$$

Here, $N_{CCE,p}$ is a number of CCEs in CORESET p of the PDCCH reception for the DCI format as described in clause 10.1, $N_{CCE,p}$ is the index of a first CCE for the PDCCH reception, and $\Delta_{PRI}$ is a value of the PUCCH resource indicator field in the DCI format. If the DCI format does not include a PUCCH resource indicator field, $\Delta_{PRI}=0$.

Table (4), below, describes mapping of PUCCH resource indication field values to a PUCCH resource in a PUCCH resource set with maximum 8 PUCCH resources.

TABLE 4

| PUCCH resource indicator | | | |
|---|---|---|---|
| 1 bit | 2 bits | 3 bits | PUCCH resource |
| '0' | '00' | '000' | 1st PUCCH resource provided by pucch-ResourceId obtained from the 1st value of resourceList |
| '1' | '01' | '001' | 2nd PUCCH resource provided by pucch-ResourceId obtained from the 2nd value of resourceList |
|  | '10' | '010' | 3rd PUCCH resource provided by pucch-ResourceId obtained from the 3rd value of resourceList |
|  | '11' | '011' | 4th PUCCH resource provided by pucch-ResourceId obtained from the 4th value of resourceList |
|  |  | '100' | 5th PUCCH resource provided by pucch-ResourceId obtained from the 5th value of resourceList |
|  |  | '101' | 6th PUCCH resource provided by pucch-ResourceId obtained from the 6th value of resourceList |
|  |  | '110' | 7th PUCCH resource provided by pucch-ResourceId obtained from the 7th value of resourceList |
|  |  | '111' | 8th PUCCH resource provided by pucch-ResourceId obtained from the 8th value of resourceList |

If a UE determines a first resource for a PUCCH transmission with HARQ-ACK information corresponding only to a PDSCH reception without a corresponding PDCCH or detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_c$ from the beginning of a first symbol of the first resource for PUCCH transmission in the slot where, $\kappa$ and $T_c$ are defined in clause 4.1 of [REF1] and $\mu$ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=20$ for $\mu=3$.

If a UE is not provided SPS-PUCCH-AN-List and transmits HARQ-ACK information corresponding only to a PDSCH reception without a corresponding PDCCH, a PUCCH resource for corresponding PUCCH transmission with HARQ-ACK information is provided by n1PUCCH-AN.

Throughout this present disclosure, embodiments are described in terms of multiple PDSCHs or multiple PUSCHs that are jointly scheduled on multiple serving cells, such as a subset/set of cells from among one or more sets of co-scheduled cells.

The embodiments are generic and can apply to various other scenarios such as when a UE is jointly scheduled to receive/transmit multiple PDSCHs/PUSCHs: (i) from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; (ii) in multiple time units, such as multiple slots or multiple transmission time intervals (TTIs); (iii) on multiple BWPs associated with one or more cells/carriers/TRPs, including multiple BWPs of a single serving cell/carrier for a UE with a capability of reception/transmission on multiple active BWPs; (iv) on one or more TRPs/cells, wherein the UE can receive/transmit more than one PDSCH/PUSCH on each co-scheduled TRP/cell; (v) for multiple transport blocks (TBs), or for multiple codewords (CWs) corresponding to single TB or multiple TBs; or (iv) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs", or "co-scheduled slots/TTIs", or "co-scheduled BWPs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling", and so on.

Various embodiments consider reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

Throughout the disclosure, the phrase "a UE configured with multi-cell scheduling" refers to a UE that is configured joint scheduling for at least one set of co-scheduled cells.

Throughout the disclosure, the phrase "scheduled PDSCH" refers to a PDSCH that is scheduled/indicated by a DCI format, regardless of whether the PDSCH is received or not yet, for example due to collision with UL symbols indicated by a DL/UL TDD configuration or by L1/L2 signaling such as by a DCI format 2_0. In some examples, scheduled PDSCH may also refer to a "received PDSCH" that is received by the UE.

The following embodiments of the present disclosure describe multi-cell scheduling operation. This is described in the following examples and embodiments.

A UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described herein. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format.

In one example, multi-cell scheduling can also include operations related to DL/UL transmissions such as reporting HARQ-ACK information, beam/CSI measurement or reporting, transmission or reception of UL/DL reference signals, and so on.

In one example, the UE can be configured by higher layers, such as by a UE-specific RRC configuration, a number of sets of co-scheduled cells. For example, the UE can be configured a first set of cells, such as {cell #0, cell #1, cell #4, cell #7} and a second set {cell #2, cell #3, cell #5, cell #6}. The multiple sets of co-scheduled cells can be scheduled from a same scheduling cell or from different scheduling cells.

In one example, a set of co-scheduled cells can include a primary cell (PCell/PSCell) and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per specifications of the system operation, a set of co-scheduled cells is defined as a set that includes all scheduled cells having a same scheduling cell, and additional higher layer configuration is not required for indication of the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE can receive a DCI format for scheduling multiple co-scheduled cells on a first scheduling cell in a first PDCCH monitoring occasion, or on a second scheduling cell in a second PDCCH monitoring occasion. The DCI format can be associated with any search space set or can be restricted to be associated with USS sets. For example, the DCI format can be associated with multicast scheduling and have CRC scrambled by a group-RNTI (G-RNTI) and PDCCH candidates monitored according to common search space (CSS) sets or can be associated with unicast scheduling and have CRC scrambled by a C-RNTI and PDCCH candidates monitored according to USS sets. Such PDCCH monitoring from two scheduling cells can be simultaneous, for example in a same span of symbols or in a same slot, or can be non-overlapping, such as in different slots (per higher layer configuration, or per indication in a PDCCH or via a MAC CE). The UE may or may not expect that both the first scheduling cell and the second scheduling cell can schedule, through PDCCH transmissions in a same time interval such as a span or a slot, transmissions or receptions on a same cell. The UE can also monitor PDCCH for detection of a DCI format providing scheduling only on one cell from the set of co-scheduled cells (single-cell scheduling DCI format).

A UE can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability to the gNB. In one example, that capability can depend on an operating frequency band or on a frequency range such as above or below 6 GHz.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

A UE (such as the UE 116) can also be configured a number of cells that do not belong to any of set of co-scheduled cells. For example, the UE can be configured a cell #8 that does not belong to either the first set or the second set of co-scheduled cells in the previous example.

In one example, restrictions can apply for co-scheduled cells and a UE can expect that co-scheduled cells in a corresponding set: (i) have a same numerology (SCS configuration and CP); or (ii) have a same numerology for respective active DL/UL BWPs; or (iii) have a same duplex configuration, for example, all cells have frequency division duplexing (FDD) configuration or all cells have time division duplexing (TDD) configuration and, in case of a TDD configuration, also have a same UL-DL configuration; or (iv) are within a same frequency band (intra-band CA).

When a first cell using paired spectrum operation (FDD) and a second cell using unpaired spectrum operation (TDD) are in a same set of co-scheduled cells and a DCI format schedules a first PDSCH reception on the first cell and a second PDSCH reception on the second cell and the second PDSCH reception includes symbols that are UL symbols on the second cell, the UE does not receive the second PDSCH over the UL symbols or does not receive the second PDSCH over any symbols on the second cell. Alternatively, the UE can apply rate matching for the second PDSCH around the UL symbols on the second cell, so that the UE receives the second PDSCH with an adjusted rate in other remaining symbols. Similar UE behaviors can apply when the first and second scheduled cells use unpaired spectrum operation with different UL-DL configurations, such as on different frequency bands.

A serving cell (such as BS 102) can belong only to a single set of co-scheduled cells so that the sets of co-scheduled cells do not include any common cell or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. Also, a serving cell can belong to both a first set of co-scheduled cells and to a second set of co-scheduled cells, when the serving cell has a first common feature with cells in the first set of co-scheduled cells and a second common feature with cells in the second set of co-scheduled cells, wherein the first common feature can be different from the second common feature.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

In a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

In a first option for the second approach, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods, such as those described herein, for multi-cell scheduling.

In a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells.

In a first example, a DCI format for multi-cell scheduling provides an index for a subset of cells that are co-scheduled such as a CIF value that corresponds to a subset of one or more cells from a set of co-scheduled cells. For example, UE-specific RRC signaling can indicate first/second/third/fourth indexes and corresponding first/second/third/fourth subsets that include one or more cells from a set of co-scheduled cells, wherein a subset can also include all cells from the set of co-scheduled cells. Then, a CIF field of 2 bits in a DCI format can provide a value that indicates the subset of scheduled cells.

In a second example, a DCI format can include a 1-bit flag field to indicate whether the DCI format is for single-cell scheduling or for multi-cell scheduling in order for a UE to accordingly interpret fields of the DCI format that may also include the CIF field. Then, for single-cell scheduling, the CIF field can be interpreted as in case of single-cell cross-carrier scheduling while for multi-cell scheduling the CIF field can be interpreted as indicating a subset from the set of co-scheduled cells.

In a third example, a DCI format for multi-cell scheduling provides a number of co-scheduled cells, and the indexes of the co-scheduled cells are provided by additional methods, such as by an additional DCI format (or an additional part/stage of a same DCI format) or by higher layer signaling as described herein.

In a fourth example, a CIF field in a DCI format for multi-cell scheduling can be a bitmap mapping to the individual cells or subsets of cells from the set of co-scheduled cells. When the DCI format is always applicable to all cells in the set of co-scheduled cells, the DCI format may not include a CIF.

In a third option for the second approach, a UE can implicitly determine indexes for co-scheduled cells without need for explicit gNB indication. For example, the UE can determine indexes for co-scheduled cells based on a PDCCH monitoring parameter, such as: (i) a CORESET index; or (ii) a search space set index, or a carrier indicator parameter n_CI corresponding to the search space set index; or (iii) a set of CCEs in the search space set or a first/last CCE in the search space set. It is noted that the UE received a PDCCH providing the DCI format for multi-cell scheduling.

According to the third option, the UE can be configured a mapping among values for PDCCH monitoring parameters, such as search space sets, and a number of co-scheduled cells or indexes of the co-scheduled cells. In one example, first and second values for parameter n_CI in a search space set can respectively indicate first and second subsets of co-scheduled cells. According to this example, the parameter n_CI can correspond to a single cell or can correspond to a group of cells, such as a subset/set of co-scheduled cells.

Receptions or transmissions on a respective subset of cells that are jointly scheduled by a single DCI format, or by using complementary methods such as those described herein, can refer to PDSCHs or PUSCHs that may or may not overlap in time. For example, the UE can be indicated to receive PDSCHs or to transmit PUSCHs on respective co-scheduled cells wherein all receptions/transmissions are in a same slot or at least one reception/transmission is in a different slot than the remaining ones.

A UE that is configured for multi-cell scheduling can be provided a first set of cell-common parameters whose values apply for scheduling on all co-scheduled cells, and a second set of cell-specific parameters whose values apply for scheduling on each corresponding co-scheduled cell. The UE can determine cell-common and cell-specific scheduling information parameters based on the specifications of the system operation or based on higher layer configuration. For some cell-specific scheduling information parameters, the UE can be provided differential values compared to a reference value wherein the reference value can correspond, for example, to a first scheduled cell from a set of scheduled cells.

For a UE that is configured a number of sets of co-scheduled cells, a DCI format for multi-cell scheduling can provide complete or partial information for cell-common or cell-specific scheduling parameters, for multiple PDSCH receptions or multiple PUSCH transmissions on respective multiple co-scheduled cells. When the DCI format for multi-cell scheduling provides partial information for a scheduling parameter, the UE can determine remaining information from UE-specific RRC signaling or by other complementary methods.

The following embodiments of the present disclosure describe various mechanisms for multi-cell scheduling. This is described in the following examples and embodiments.

The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets.

For a UE (such as the UE 116) that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary methods.

In a first approach, referred to as concatenated DCI format for multi-cell scheduling, a DCI format for multi-cell scheduling can provide separate values of fields for each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation, or for co-scheduling a PDSCH reception and a PUSCH transmission.

In a second approach, referred to as multi-cell scheduling via multi-cell mapping, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. For example, the field can be an MCS field wherein a value indicated in the DCI format can be for a PDSCH reception on a first cell and a value for a PDSCH reception on a second cell can be determined from the first value and a configured offset value. This approach can be beneficial, for example, for co-scheduling cells that have several similar physical channel characteristics or configurations, such as for intra-band CA operation.

In a third approach, referred to as single-cell DCI pointing to a PDSCH with multi-cell scheduling, a UE can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This approach can be beneficial, for example, for co-scheduling several (such as 4-8) cells that have different channel characteristics or configurations, such as for inter-band CA operation.

In a first option for the third approach, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

In a second option for the third approach, multi-cell scheduling information is multiplexed as M-DCI in a PDSCH. The UE receives a first PDSCH that is scheduled by a single-cell scheduling DCI format, and the UE receives additional scheduling information for one or more PDSCH(s)/PUSCH(s) on one or more respective co-scheduled cell(s). The UE allocates the coded modulation symbols for M-DCIs to time/frequency resources within the first PDSCH, for example in a frequency-first, time-second manner, except for reserved resources corresponding to reference signals or other cell-level broadcast transmissions. The UE can start receiving the M-DCIs in a first symbol of the first PDSCH, or in a first symbol after first symbols with DM-RS REs, in the first PDSCH. The M-DCIs can be jointly coded and include a single CRC.

In the second option, physical layer processing of M-DCI(s) that are included in the first PDSCH can be same as that for a DCI in a PDCCH, such as for the DCI scheduling the first PDSCH, or can be same as that for data information/transport block in the first PDSCH. Herein, physical layer processing refers to, for example, modulation, coding, scrambling, and so on. In addition, the UE can determine a number of coded modulation symbols corresponding to multi-scheduling information, such as M-DCIs, that are multiplexed in a first PDSCH scheduled by a single-cell scheduling DCI format, based on a scaling factor $\beta_{offset}^{PDSCH}=\beta_{offset}^{M-DCI}$ applied to a total (coded) payload size for the M-DCIs. Such scaling factor determines an effective channel coding rate of M-DCIs multiplexed on the first PDSCH, for flexible link adaptation and improved reliability of the M-DCIs according to physical channel conditions.

In a fourth approach, referred to as multi-stage PDCCHs/DCIs for multi-cell scheduling, a UE can be provided information for multi-cell scheduling of multiple PDSCHs/PDCCHs on multiple respective cells using a multi-stage DCI method, such as a 2-stage DCI wherein a first-stage DCI format includes a set of cell-common fields, and a second-stage DCI format includes cell-specific fields. The UE receives the first-stage DCI format in a first PDCCH and the second-stage DCI format in a second PDCCH. This approach can be beneficial, for example, for co-scheduling several cells that have several common physical characteristics, such as a time-domain resource allocation or a frequency-domain resource allocation, without incurring latency and without having a DCI format size that is too large (that would result if the first-stage and second-stage DCI formats were combined into a single DCI format) for receiving cell-specific parameters when the second PDCCH is received in a same slot as the first PDCCH. The first-stage DCI format can also indicate a location for a PDCCH providing the second-stage DCI format, such as a PDCCH candidate for a corresponding CCE aggregation level, so that the UE can interpret the contents of the second-stage DCI format or reduce a number of PDCCH receptions. A UE can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s), or based on PDCCH monitoring parameters, such as CORESET, search space, CCEs, or monitoring occasions in which the UE receives the first and the second linked PDCCHs.

The following embodiments of the present disclosure describe PDCCH monitoring for multi-cell scheduling. This is described in the following examples and embodiments.

The UE (such as the UE 116) can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets. There can be two cases for monitoring a DCI format for multi-cell scheduling: a first case based on search space set(s) dedicated to multi-cell scheduling, and a second case based on search space set(s) shared by both single-cell scheduling and multi-cells scheduling.

In a first case, a search space set for multi-cell scheduling is associated only with DCI format(s) for multi-cell scheduling on a set of co-scheduled cells. Such search space sets can correspond to a set-level n_CI value, which can be separate from n_CI values corresponding to search space sets for single-cell scheduling. By monitoring the search space set, the UE can detect a DCI format for scheduling on all scheduled cells or only a subset of scheduled cells from the set of co-scheduled cells. Accordingly, the detected DCI format can include a CIF value that is same as or different from an n_CI value corresponding to the search space set for multi-cell scheduling. The search space set can be commonly configured, thereby linked, on the scheduling cell and on all scheduled cells from the set of co-scheduled cells. The UE can monitor the search space set for multi-cell scheduling when linked search spaces sets on the scheduling cell and at least one scheduled cell from the set co-scheduled cells is configured on corresponding active DL BWPs of the scheduling cell and the at least one scheduled cell.

In a second case, a search space set for multi-cell scheduling is associated with DCI format(s) both for multi-cell scheduling on a set of co-scheduled cells and for single cell scheduling on a first scheduled cell from the set of co-scheduled cells. Such search space sets correspond to an existing cell-level n_CI value corresponding to the first scheduled cell. By monitoring the search space set, the UE can detect a DCI format for single-cell scheduling on the first scheduled cell with a CIF value that is same as the n_CI value corresponding to the first scheduled cell, or can detect a DCI format for multi-cell scheduling on all scheduled cells or only a subset of scheduled cells from the set of co-scheduled cells, with a set-level CIF value that is different from the n_CI value corresponding to the first scheduled cell. The search space set is commonly configured, thereby linked, on the scheduling cell and only the first scheduled cell, and the UE monitors the linked search space sets when both are configured on active DL BWPs of the scheduling cell and the first scheduled cell.

The following embodiments of the present disclosure describe General considerations for HARQ-ACK codebook for multi-cell scheduling. This is described in the following examples and embodiments.

A UE (such as the UE 116) configured with multi-cell scheduling for a set of co-scheduled cells expects that all cells in the set of co-scheduled cells belong to a same PUCCH group, and also that the UE is provided configuration for a HARQ-ACK codebook, such as Type-1 or Type-2 or Type-3 codebook. HARQ codebook generation for multi-cell scheduling can depend on configuration of a TDRA table, a set of K0 values, and/or a set of K1 values provided for each cell for multi-cell scheduling. The UE can be provided a dedicated TDRA/K0/K1 configuration for multi-cell scheduling for a set of co-scheduled cells, or the UE can implicitly determine a TDRA/K0/K1 configuration for multi-cell scheduling based on intersection (or union) of corresponding configurations for single cell scheduling among the set of co-scheduled cells. A value of K0 can be w.r.t. an SCS configuration of a corresponding serving cell or w.r.t. a reference SCS configuration such as a largest or smallest SCS configuration among the set of co-scheduled cells. A value of K1 can be w.r.t. an SCS configuration of a corresponding cell with PUCCH configuration (such as the PCell).

When a UE (such as the UE 116) is configured two or multiple PUCCH groups, and the UE is also configured with a set of co-scheduled cells, the UE expects that all serving cells in the set of co-scheduled cells belong to a same PUCCH group. For example, if a UE is configured a PUCCH-SCell, and a corresponding secondary PUCCH group, the UE expects that all serving cells in a configured set of co-scheduled cells belong to either the primary PUCCH group or the secondary PUCCH group, and not both. In another example, if a UE is configured a master cell group (MCG) and a secondary cell group (SCG), the UE expects that all serving cells in a configured set of co-scheduled cells belong to either the MCG or the SCG (that is, only one cell group), and not both.

A UE (such as the UE 116) configured with multi-cell scheduling expects to be configured a HARQ-ACK codebook, for example using a parameter 'pdsch-HARQ-ACK-Codebook'. The HARQ-ACK CB can be, for example, one of Type-1 CB, also referred to as semi-static CB, or Type-2 CB, also referred to as dynamic CB, or enhanced Type-2 CB, also referred to as enhanced dynamic CB, or a Type-3 CB, and so on, as described in TS 38.213 v16.5.0. Accordingly, the UE does not expect to provide/report separate HARQ-ACK feedback for each PDSCH from a number of co-scheduled PDSCHs on a set/subset of co-scheduled cells. The UE multiplexes HARQ-ACK feedback information corresponding to the number of co-scheduled PDSCH receptions on a set/subset of co-scheduled cells, based on a HARQ-ACK codebook configuration, and transmits a PUCCH with the HARQ-ACK CB in a same PUCCH resource, or multiplexes the HARQ-ACK CB in a same PUSCH transmission.

In one realization, a UE can generate different HARQ-ACK CBs for MC-DCI and SC-DCI formats. For example, the UE can generate a Type-2 HARQ-ACK CB for MC-DCI formats (for example, DAI is set by single scheduler), and generate a Type-1 HARQ-ACK CB for SC-DCI formats (for example, for self-scheduling). For example, the UE can be provided two separate RRC parameters or two values for an RRC parameter, such as 'pdsch-HARQ-ACK-Codebook', with a first parameter/value corresponding to HARQ-ACK codebook Type for SC-DCI formats and with a second parameter/value corresponding to HARQ-ACK codebook Type for MC-DCI formats. In one example, if the UE does not receive any S-DCI, or if it receives one S-DCI and the fallback conditions for single A/N bit hold, the UE provides HARQ-ACK based on Type-2. In another example, if the UE receives more than one S-DCI (or the fallback conditions do not hold), it provides HARQ-ACK based on Type-1.

In one example, a UE configured with multi-cell scheduling can provide HARQ-ACK information for a first number of co-scheduled cells in a first PUCCH using a first PUCCH resource and provide HARQ-ACK information feedback for a second number of co-scheduled cells in a second PUCCH using a second PUCCH resource, wherein the first and second numbers of co-scheduled cells are indicated/scheduled by a same DCI format. This can be beneficial, for example, for reducing latency of HARQ retransmission for co-scheduled cells.

In one example, a UE does not expect to be configured priority levels for HARQ-ACK information corresponding to sets of co-scheduled cells. In another example, a UE expect to be configured a same priority level for HARQ-ACK information corresponding to different sets of co-scheduled cells. In yet another example, a UE can be configured a first priority level for HARQ-ACK information corresponding to a first set of co-scheduled cells, and a second priority level for HARQ-ACK information corresponding to a second set of co-scheduled cells. For example, the UE does not expect to be configured different priority levels for HARQ-ACK information corresponding to different cells in a same set of co-scheduled cells.

In one realization, a UE can be configured: (i) a first group/number of serving cell that are configured with single-cell scheduling only, and (ii) a second group/number of serving cells that are configured with multi-cell scheduling only, and (iii) a third group/number of serving cells that are configured with both single-cell scheduling and multi-cell scheduling.

At least one of the first and second and third groups/numbers of serving cells is non-empty. In one example, the second group of serving cells can be empty, so that any serving cell can be configured with single-cell scheduling, while some other serving cells (from the third group) can be additionally configured with multi-cell scheduling.

In one example, the UE expects that a serving cell with multi-cell scheduling is included in only one configured set of co-scheduled cells. Therefore, the UE does not expect to be configured multiple overlapping sets of co-scheduled cells. Accordingly, the UE determines only one TDRA/K0/K1 configuration (for HARQ-ACK codebook generation) for a serving cell with multi-cell scheduling configuration, as described next. In another example, a serving cell with multi-cell scheduling can be included in multiple configured sets of co-scheduled cells.

In one example, a UE can receive a first DCI format for multi-cell scheduling in a first PDCCH monitoring occasion that indicates joint scheduling for a first subset from the configured set of co-scheduled cells, and receive a second DCI format for multi-cell scheduling in a second PDCCH monitoring occasion that indicates joint scheduling for a second subset from the (same) configured set of co-scheduled cells, wherein the first subset and the second subset can be separate, but potentially with non-empty overlap. In another example, a UE can receive a first DCI format for multi-cell scheduling in a first PDCCH monitoring occasion that indicates joint scheduling for a first configured set of co-scheduled cells, and receive a second DCI format for multi-cell scheduling in a second PDCCH monitoring occasion that indicates joint scheduling for a second configured set of co-scheduled cells, wherein the first and second sets of co-scheduled cells can be separate.

In one example, a DCI format for multi-cell scheduling can indicate scheduling on only a single serving cell. In one example, single-cell scheduling can be considered as a fallback operation for any serving cell that is configured with multi-cell scheduling, without any explicit configuration for single-cell scheduling.

HARQ-ACK codebook generation for multi-cell scheduling can depend on configuration of a TDRA table, a set of K0 values, and/or a set of K1 values provided for multi-cell scheduling. Various methods for configuration of TDRA/K0/K1 for multi-cell scheduling is provided below, and potential relationships with corresponding configurations for single-cell scheduling is also considered.

In one example, a serving cell that belongs to a set of co-scheduled cells, can be configured a first TDRA table (including a first set of K0 values) or a first set of K1 values for single-cell scheduling, and a second TDRA table (including a second set of K0 values) or a second set of K1 values for multi-cell scheduling, wherein the first TDRA/K0/K1 configuration can be separate from the second TDRA/K0/K1 configuration. In one example, a set of PDSCH or HARQ time (K1) values is independent of a scheduling DCI, such as a DCI format for single-cell scheduling or a DCI format for multi-cell scheduling. For example, the UE is configured a set of K1 values (for example, as part of PUCCH configuration) that are applicable to any downlink DCI format scheduling one or more PDSCHs on one or more cells.

For example, the UE expects that first TDRA tables or a set of K1 values for multi-cell scheduling are same as corresponding ones for multi-cell scheduling. For example, the UE expects that the first TDRA tables or the set of K1 values for multi-cell scheduling on a set of co-scheduled cells are subsets of corresponding ones for single-cell scheduling on each cell from the set of co-scheduled cells. For example, a subset of a first TDRA table can refer to a number of rows/entries of the first TDRA table. For example, the UE can determine the second TDRA table to include rows/entries that are common/same among first TDRA tables.

In one example, a set of K1 values are specific to a DCI format. For example, the UE receives a first set of K1 values for a first DCI format and a second set of K1 values for a second DCI formats. For example, the UE can be provided first sets of K1 values for single-cell scheduling DCI (SC-DCI) formats and a second set of K1 values for multi-cell scheduling DCI (MC-DCI) formats. In one example, the second set of K1 values for multi-cell scheduling can be same as the first sets of K1 values for single-cell scheduling, such as a union of the first sets of K1 values among different SC-DCI formats configured for cells from the set of co-scheduled cells. For example, the second set of K1 values for multi-cell scheduling can be a subset of the first sets of K1 values for single-cell scheduling, such as a subset of a union of the first sets of K1 values among different SC-DCI formats configured for cells from the set of co-scheduled cells In another example, when a UE is configured a first set and a second set of co-scheduled cells, and a serving cell belongs to both the first set and the second set, the serving cell can be associated with a first TDRA table/K0 set/K1 set corresponding to the first set of co-scheduled cells, and a second TDRA table/K0 set/K1 set corresponding to the second set of co-scheduled cells. Such configurations are beneficial, for example, in order to improve scheduling flexibility. In one example, a set of K1 values can be common to the first and second sets of co-scheduled cells, and different TDRA tables or K0 values can be configured for a same cell when configured to be scheduled with different (for example, first and second) multi-cell scheduling DCI formats corresponding to different (for example, first and second) sets of co-scheduled cells.

In another example, the TDRA/K0/K1 configuration can be simplified, for example, in order to reduce UE complexity. In one realization, a UE can be configured a same TDRA table/K0 set/K1 set for a serving cell, regardless of whether the UE belongs to a single set or multiple sets of co-scheduled cells. For example, the UE uses a same TDRA table/K0 set/K1 set for multi-cell scheduling DCI formats that the UE uses for single-cell scheduling DCI formats. In another realization, all cells within a same set of co-scheduled cells can be configured a same TDRA table/K0 set/K1 set. For example, the UE expects that co-scheduled PDSCHs start in a same slot, with respect to slots/SCS for a corresponding cell with PUCCH configuration. For example, the UE expects that co-scheduled cells have a same SCS and a same CP. For example, the UE expects that co-scheduled PDSCHs have a same K0 value. For example, the UE can be provided separate TDRA table/K0 set/K1 set for single-cell scheduling of cells in a set of co-scheduled cells and provided a different TDRA table/K0 set/K1 set for multi-cell scheduling on the set of co-scheduled cells that is commonly applied to cells within the set of co-scheduled cells. For example, the UE expects to be provided a same/identical TDRA table/K0 set/K1 set that is applicable to both single-cell scheduling and multi-cell scheduling for all cells within a same set of co-scheduled cells. In a further realization, all cells with multi-cell scheduling configuration, regardless of whether they belong to a same set or different sets of co-scheduled cells, are configured a same TDRA table/K0 set/K1 set.

In yet another example, the UE is not provided any dedicated configuration for TDRA table/K0 set/K1 set for the case of multi-cell scheduling. Instead, the UE determines an applicable configuration for TDRA table/K0 set/K1 set for multi-cell scheduling based on the corresponding configuration for single-cell scheduling. For example, the UE determines a TDRA table/K0 set/K1 set for multi-cell scheduling on a set of co-scheduled cells based on intersection or union of all TDRA tables/K0 sets/K1 sets for single-cell scheduling corresponding to all serving cells that belong to the set of co-scheduled cells. According to these examples, and when the intersection operation is used, the UE determines that entries of TDRA tables or K0 values or K1 values, configured for a cell from a set of co-scheduled cells, that do not belong to the intersection of TDRA tables/K0 sets/K1 sets, are used only for single-cell scheduling for the corresponding cell. For example, the UE determines an applicable set of K0 values for multi-cell scheduling for a set of co-scheduled cells as the intersection of sets of K0 values corresponding to cells in the set of co-scheduled cells. For example, the UE determines applicable TDRA configuration for multi-cell scheduling for the set of co-scheduled cells to include entries from TDRA tables corresponding to single-cell scheduling, wherein the entries are shared for cells in a set of co-scheduled cells (that is, same K0, SLIV, and PDSCH mapping type values), in same or different rows index in corresponding TDRA tables. For example, the UE determines applicable TDRA configuration for multi-cell scheduling for the set of co-scheduled cells to include entries from TDRA tables corresponding to single-cell scheduling, wherein a K0 value for the entry is included the applicable set of K0 values for multi-cell scheduling (that is, the K0 value is shared by TDRA tables for single-cell scheduling for cells in the set of co-scheduled cells, and the SLIV or PDSCH mapping type can be same/shared or different for the cells). For example, when an entry of a TDRA table for single-cell scheduling for a cell in the set of co-scheduled cells does not belong to such intersection, the UE applies such entry only for single-cell scheduling and does not expect to receive indication of such entry in a multi-cell scheduling DCI format. For example, the UE can receive separate TDRA fields for co-scheduled cells. For example, a second TDRA table for multi-cell scheduling/MC-DCI formats on a set of co-scheduled cells can be an intersection of first TDRA tables for single-cell scheduling/SC-DCI formats among cells from the set of co-scheduled cells.

For example, if K1={0, 1, 2, 3} for a first cell and K1={1, 2, 3, 4} for a second cell, then the UE considers: (i) K1=0 is used only for single-cell scheduling of the first cell; and (ii) K1=4 is only for single-cell scheduling of the second cell; and (iii) K1={1,2,3} can be used for both single-cell scheduling and multi-cell scheduling on the first cell and the second cell. Similar example can be considered for K0 values.

In one example, a TDRA field in a DCI format for multi-cell scheduling can be a cell-common field that commonly applies to all co-scheduled cells by the DCI format. Such TDRA field will point to an entry in a TDRA table, wherein the entry includes a K0 value, an SLIV, and an indication for a PDSCH mapping type, which applies commonly to all co-scheduled PDSCHs on the set/subset of co-scheduled cells. Herein, the TDRA table is a TDRA table for multi-cell scheduling that the UE determines based on one of the methods described above.

In one example, when all co-scheduled cells have a common/same SCS, the K0 value determined from the TDRA field of the DCI format for multi-cell scheduling applies commonly to all co-scheduled PDSCHSs based on the common SCS value.

In another example, when the co-scheduled cells have different SCSs, the UE applies the K0 value for each PDSCH on each serving cell from the set of co-scheduled cells based on: (i) an SCS configuration of an active DL/UL BWP of corresponding serving cell, or (ii) a largest (or smallest) SCS configuration among (corresponding active DL/UL BWPs of) the set/subset of co-scheduled cells, or (iii) an SCS configuration of an active DL/UL BWP of a corresponding scheduling cell, or (iv) an SCS configuration provided by higher layers, such as one provided with the TDRA table, or (v) a predetermined SCS configuration, such as 30 kHz for FR1, and 120 kHz for FR2.

For example, assuming the method in the first bullet point above is used, if a DCI format jointly schedules PDSCHs on a first cell with SCS=15 kHz and a second cell with SCS=30 kHz, and the DCI format indicates K0=1, the UE determines a slot for a first PDSCH on the first cell with an offset equal to 1 slot w.r.t. SCS=15 kHz, and a slot for a second PDSCH on the second cell with an offset equal to 1 slot w.r.t. SCS=30 kHz, wherein the offsets are w.r.t. a slot where the multi-cell scheduling DCI format ends.

In one example, a TDRA field in a DCI format for multi-cell scheduling can be based on a "multi-cell mapping" to provide cell-specific TDRA for each of the co-scheduled cells. For example, a TDRA table for multi-cell scheduling on a set of M serving cells can include a number of entries, wherein each entry includes a number of up to M sets of K0/SLIV/mapping types corresponding to the set of M serving cells. For each PDSCH from the co-scheduled PDSCHs on a serving cell from the set of co-scheduled cells, the UE applies the set of K0/SLIV/mapping type corresponding to the serving cell, from the number of sets of K0/SLIV/mapping types that is included in the TDRA entry which is indicated by the DCI format for multi-cell scheduling. According to this example, each K0 value provided for each serving cell from the set of co-scheduled cells is w.r.t. an SCS configuration of the corresponding serving cell. For example, a joint multi-cell TDRA table can include TDRA configuration for all cells with multi-cell scheduling configuration (associated with a same scheduling cell), that is, any cell that is included in at least one configured set of co-scheduled cells. For example, each entry of a joint multi-cell TDRA table can include a number of up to M_co,max sets of K0/SLIV/mapping types, wherein each set of K0/SLIV/mapping type corresponds to a cell with multi-cell scheduling configuration. When a multi-cell scheduling DCI (MC-DCI) format indicates/schedules a set of co-scheduled cells including M serving cells, and a TDRA field in the MC-DCI format indicates an index of a row in the joint multi-cell TDRA table, the UE applies M sets of K0/SLIV/mapping types, from the M_co,max sets of K0/SLIV/mapping types provided in the TDRA table, that correspond to the M serving cells.

When a DCI format for multi-cell scheduling is a two-stage DCI format with a $2^{nd}$-stage DCI provided by a PDSCH or PDCCH, as described herein, the UE determines K0 relative to a $2^{nd}$-stage DCI, at least for any PDSCHs whose scheduling information is at least partially provided by the $2^{nd}$-stage DCI. Accordingly, the UE determines a slot for a PDSCH from co-scheduled PDSCHs to be a slot that is K0 slots from/after a last slot that includes the $2^{nd}$-stage DCI format, wherein the UE determines the K0 value and an SCS configuration for determination of K0 slots based on one of the various methods described in the previous examples. In one example, if scheduling information for a first PDSCH from a set of co-scheduled PDSCHs is fully provided in a $1^{st}$-stage DCI, the UE determines a slot for the first PDSCH to be a slot that is K0 slots from/after a last slot that includes the $1^{st}$-stage DCI format, wherein the UE determines the K0 value and an SCS configuration for determination of K0 slots based on one of the various methods described in the previous examples. For example, the first PDSCH can be a PDSCH in which the $2^{nd}$-stage DCI is multiplexed.

In one realization, when a UE is configured with multi-cell scheduling, the UE expects to be provided a single PUCCH resource for transmitting a PUCCH with HARQ-ACK information corresponding to co-scheduled PDSCHs on a set of co-scheduled cells.

In one example, a PDSCH-to-HARQ_feedback timing indicator field (K1) in a DCI format for multi-cell scheduling is with respect to a corresponding cell with PUCCH configuration (such as the PCell). For example, the UE determines K1 based on an SCS configuration of the corresponding cell with PUCCH configuration (such as the PCell). According to this example, a K1 timing for transmitting a PUCCH with HARQ-ACK information is relative to a last DL slot of a last PDSCH from co-scheduled PDSCHs on a set/subset of co-scheduled cells, w.r.t. a slot/SCS for the cell with PUCCH configuration (such as the PCell). Herein, the last PDSCH can refer to a PDSCH that: (i) starts or ends in a latest slot/symbol, among the co-scheduled PDSCHs, w.r.t. the SCS for the PUCCH cell (such as the PCell), or (ii) corresponds to a cell, among the co-scheduled cells, with a largest cell index or largest CIF (or a smallest cell index or CIF), or (iii) corresponds to a cell, among the co-scheduled cells, with a largest (or smallest) SCS, or (iv) corresponds to a cell, among the co-scheduled cells, that is indicated last in the DCI format for multi-cell scheduling, if the DCI format includes an ordered indication for the set of co-scheduled cells.

Supporting K1 relative to a last scheduled or received PDSCH can be beneficial, for example, when the co-scheduled PDSCHs can start in different slots (for example, due to different K0 values) or when the co-scheduled cells have different SCSs. For example, K1 can be relative to a last received PDSCH from co-scheduled cells, therefore, when the UE does not receive a last scheduled PDSCH from the co-scheduled cells (for example, due to collision with UL symbols or slots) and the UE receives a second last scheduled PDSCH from the co-scheduled PDSCHs, the UE determines the K1 value relative to the second last scheduled PDSCH (which is the last received PDSCH). In another example, the UE determines the K1 value relative a last scheduled PDSCHs from co-scheduled PDSCHs, even if the UE does not receive the last scheduled PDSCH (for example, due to collision with UL symbols or slots). Similar methods and example can be considered for other options to determine the reference PDSCH for PUCCH timing determination. For example, when K1 timing is relative a PDSCH with largest index cell, the UE can determine such PDSCH only among the received PDSCHs (so maybe discard a scheduled PDSCH on a cell with largest cell index that is not received, and consider a PDSCH on another cell with second largest cell index that is received), or the UE can determine such PDSCH among co-scheduled cell, regardless of whether the UE received the PDSCH on the cell with largest cell index or not.

In another example, a K1 field in a DCI format for multi-cell scheduling can provide a cell-common value that applies commonly to all co-scheduled cells. Therefore, the UE applies a same K1 value to each PDSCH from the co-scheduled PDSCHs, wherein the K1 value is w.r.t. the SCS of the cell with PUCCH configuration (such as the PCell). Such operation can be beneficial, for example, when all co-scheduled PDSCHs start in a same slot (for example, due to same K0 value), and all co-scheduled cells have a same SCS.

In one example, K1 can start from the last DL slot (of a corresponding PDSCH) that overlaps with a PUCCH slot (that corresponds to K1=0). For Type-2 HARQ-ACK CB, K1 is always w.r.t. PCell (cell of PUCCH). If there is a second stage DCI in a PDSCH, the K1 values of those DCIs can be w.r.t. the overlapping slot of the PCell for the PDSCH reception.

In one realization, a UE with multi-cell scheduling configuration can be provided with a single value for each of TDRA, K1, and PRI parameters, but the UE interprets the fields separately for each cell from the set of co-scheduled cells, that is, a cell-specific interpretation. For example, based on a single/same indication for TDRA/K0/K1/PRI, the UE determines a first TDRA/K0 value for a first PDSCH with a corresponding HARQ-ACK feedback to be provided using a first PUCCH in a first PUCCH resource and with a slot timing based on a first K1, while the UE determines a second TDRA/K0 value for a second PDSCH with a corresponding HARQ-ACK feedback to be provided using a second PUCCH in a second PUCCH resource and with a slot timing based on a second K1. Herein, the first and second values for each of the corresponding TDRA/K0/K1/PRI parameters can be different. Such UE behavior can be realized, for example, based on corresponding configurations for single-cell scheduling, that is, without need for any dedicated configuration(s) for multi-cell scheduling. Construction of Type-1 HARQ-ACK codebooks for such a scenario can follow procedure applied to each PDSCH from co-scheduled PDSCHs on the set of co-scheduled cells as described in TS 38.213 v16.5.0.

In various realizations, the following options can be considered for determination of a TDRA table for multi-cell scheduling on a number of sets of co-scheduled cells: in a first option, the UE is provided first TDRA tables only for single-cell scheduling, and the UE determines second TDRA table(s) for multi-cell scheduling to be same as the first TDRA tables. For example, all TDRA tables from the first TDRA tables can be identical/same, or different TDRA tables from the first TDRA tables can be different. For example, a TDRA field in an MC-DCI format can include a single value that is commonly applicable to all co-scheduled cells. In a second option, the UE is provided first TDRA tables only for single-cell scheduling, and the UE determines second TDRA table(s) for multi-cell scheduling based on the first TDRA tables. For example, second TDRA table(s) can be union or intersection of the first TDRA tables. For example, second TDRA table(s) can include rows/entries from the first TDRA tables that have a same K0 value among cells from the set of co-scheduled cells. For example, a TDRA field in an MC-DCI format can include a single value that is commonly applicable to all co-scheduled cells or can include multiple values that are applied separately for the co-scheduled cells. In a third option, the UE can be provided first TDRA tables for single-cell scheduling for each cell from a set of co-scheduled cells, and the UE can be also provided a single second TDRA table for multi-cell scheduling that is commonly applicable to all cells from the set of co-scheduled cells, and can be separate from the first TDRA tables. For example, a TDRA field in an MC-DCI format can include a single value that is commonly applicable to all co-scheduled cells. For example, different TDRA tables can be provided for different sets of co-scheduled cells, wherein each of the different TDRA tables applies commonly to all cells a corresponding set of co-scheduled cells. In a fourth option, the UE can be provided first TDRA tables for single-cell scheduling and also separately provided multiple TDRA tables for multi-cell scheduling for cells from a set of co-scheduled cells. For example, the UE can be provided, for a given cell from the set of co-scheduled cells, two TDRA tables including a TDRA tables from the first TDRA tables for single-cell scheduling using SC-DCI formats, and another TDRA table from the second TDRA tables for multi-cell scheduling using MC-DCI formats. For example, an MC-DCI format can include multiple TDRA fields/values that are applied separately for the co-scheduled cells. In a fifth option, the UE can be provided first TDRA tables for single-cell scheduling for cells from a set of co-scheduled cells, and can be also provided multiple second TDRA tables corresponding to cells from the set of co-scheduled cells, wherein the UE operates, for multi-cell scheduling with a same row index from the second TDRA tables. For example, an MC-DCI format can include a single TDRA field/value that is commonly applied for cells from the co-scheduled cells, wherein the TDRA value points, for each cell from the set of co-scheduled cells, to a same row from each of the multiple second TDRA tables. For example, the multiple second TDRA tables can be provided separately. For example, the multiple second TDRA tables can be provided jointly, such as by a joint multi-cell TDRA table that include, for each row, multiple columns/entries corresponding to multiple cells from the set of co-scheduled cells. For example, the UE can be provided a single reference TDRA table for multi-cell scheduling, along with multiple K0 values (or K0 offset value) for the multiple co-scheduled cells. Accordingly, the UE can determine multiple second TDRA tables for multi-cell scheduling on the multiple co-scheduled cells by applying the corresponding K0 values (or K0 offset value) to the single reference TDRA table. When a cell belongs to multiple sets of co-scheduled cells, the UE can apply (or expects) a same TDRA for multi-cell scheduling for the cell, regardless of the different sets of co-scheduled cells, or the UE can be provided different TDRA tables for multi-cell scheduling for the cell, corresponding to the different sets of co-scheduled cells.

The following embodiments of the present disclosure, describe Enhancements to Type-1 (semi-static) HARQ-ACK codebook for multi-cell scheduling. This is described in the following examples and embodiments.

When a UE (such as the UE 116) is configured to generate a Type-1 HARQ-ACK codebook (CB), also known as a semi-static CB, and the UE is also configured with multi-cell scheduling, the UE can generate a same Type-1 CB for both single-cell scheduling and multi-cell scheduling, or the UE can generate two separate Type-1 CBs for single-cell scheduling and multi-cell scheduling. The specifications for system operation can support only one of the two options, or the UE can determine same or separate CB(s) per higher layer configuration or per indication by a DCI format.

In one realization, the UE can be provided triggers or conditions to determine whether to generate a single Type-1 HARQ-ACK codebook for both single-cell scheduling and multi-cell scheduling, or to generate two separate Type-1 HARQ-ACK sub-codebooks. The triggers/conditions can be provided by higher layers or can be predetermined in the specifications for system operation. For example, the UE generates a single Type-1 HARQ-ACK CB when a TDRA table and a set of K1 values for multi-cell scheduling/MC-DCI formats are same as or corresponding one for single-cell scheduling/SC-DCI formats. For example, the UE generates two separate Type-1 HARQ-ACK CBs when a second TDRA table for multi-cell scheduling/MC-DCI formats is not a subset of (or is different from) a first TDRA table for single-cell scheduling/SC-DCI formats, or when a second set of K1 values for multi-cell scheduling/MC-DCI formats is not a subset of (or is different from) a first set of K1 values for single-cell scheduling/SC-DCI formats, or when some cells from a set of co-scheduled cells are configured only one of SC-DCI formats and MC-DCI formats (and corresponding TDRA/K1 configurations). For example, when a second set of K1 values for MC-DCI formats is not a subset of (or is different from) a first set of K1 values for SC-DCI formats, and a second TDRA table for multi-cell scheduling is subset of (or is same as) a first TDRA table for single-cell scheduling, a second Type-2 sub-CB for multi-cell scheduling can be based on a subset of the second set of K1 values that excludes the elements common with the first set of K1 values (that is, excluding the intersection of the first and second sets of K1 values).

In a first approach, the UE generates a same Type-1 CB for both single-cell scheduling and multi-cell scheduling. The CB generation follows procedures explained herein.

In a second approach, the UE generates a first Type-1 CB for single-cell scheduling and a second Type-1 CB for multi-cell scheduling, separate from the first CB. The CB generation follows procedures explained herein.

The UE determines whether to generate a same Type-1 CB or separate Type-1 CBs for single-cell and multi-cell scheduling based on at least one of: (i) specifications of system operations, or (ii) higher layer configuration, or (iii) a MAC CE command, or (iv) a scheduling DCI format, for example, a single-cell scheduling DCI (SC-DCI) format triggers construction of a separate Type-1 CB corresponding to SC-DCI formats, and a multi-cell scheduling DCI (MC-DCI) for triggers construction of a same/joint Type-1 CB for both single-cell scheduling and multi-cell scheduling, or (v) a field in a DCI format for single-cell scheduling or multi-cell scheduling that schedules corresponding PDSCH(s) whose HARQ-ACK feedback information is generated in the Type-1 CB, or (vi) implicit determination, such as when two separate PUCCH resources are indicated for transmission of HARQ-ACK feedback information corresponding to single-cell scheduling and multi-cell scheduling, respectively.

The following embodiments of the present disclosure, describe generating a same/common Type-1 HARQ-ACK codebook for both single-cell scheduling and multi-cell scheduling. This is described in the following examples and embodiments, such as those of FIGS. 6-10.

Figure 6:
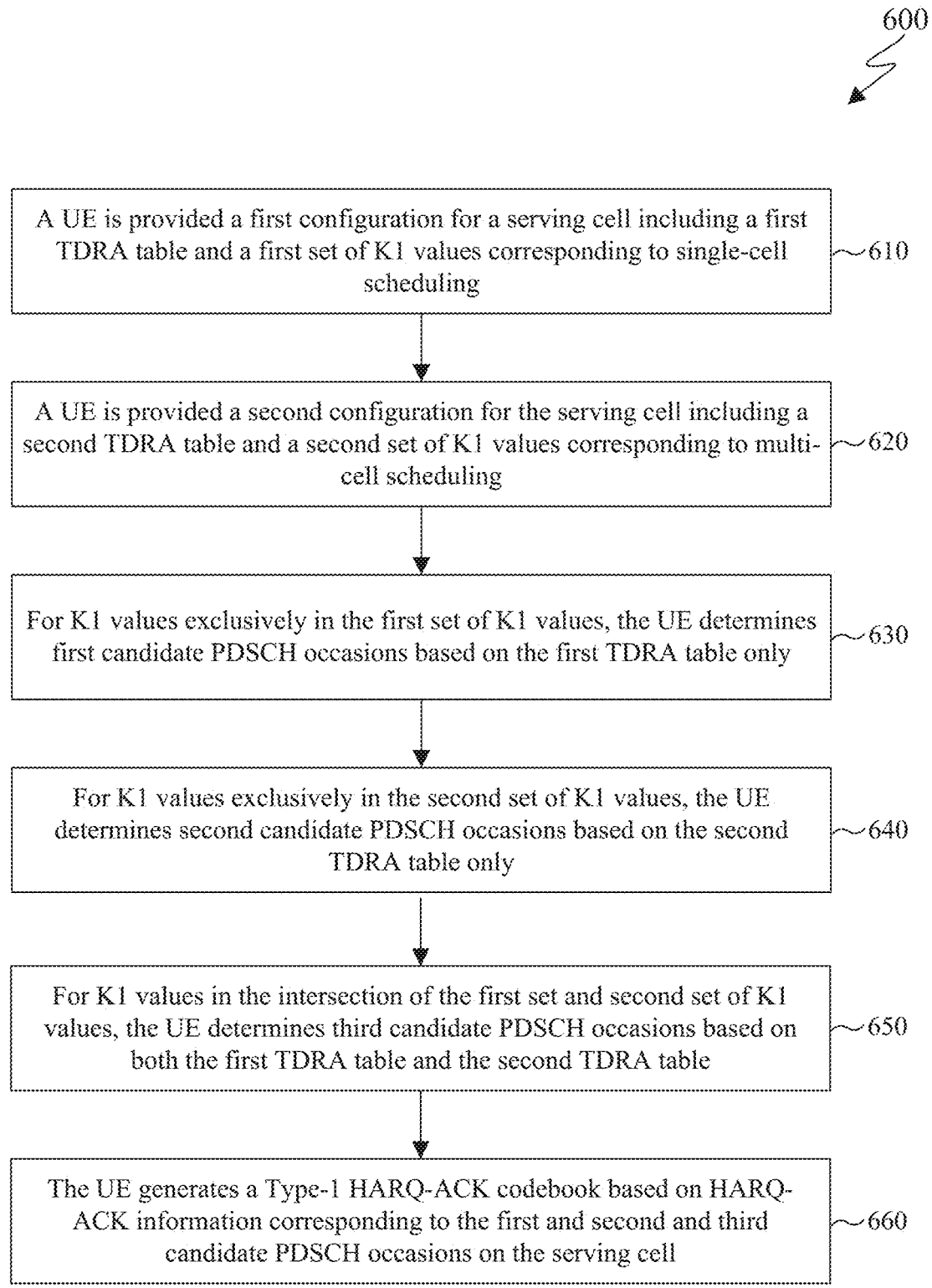
FIG. 6 illustrates an example method for generating Type-1 codebook (CB) in presence of multi-cell scheduling according to embodiments of the present disclosure.
Figure 7:
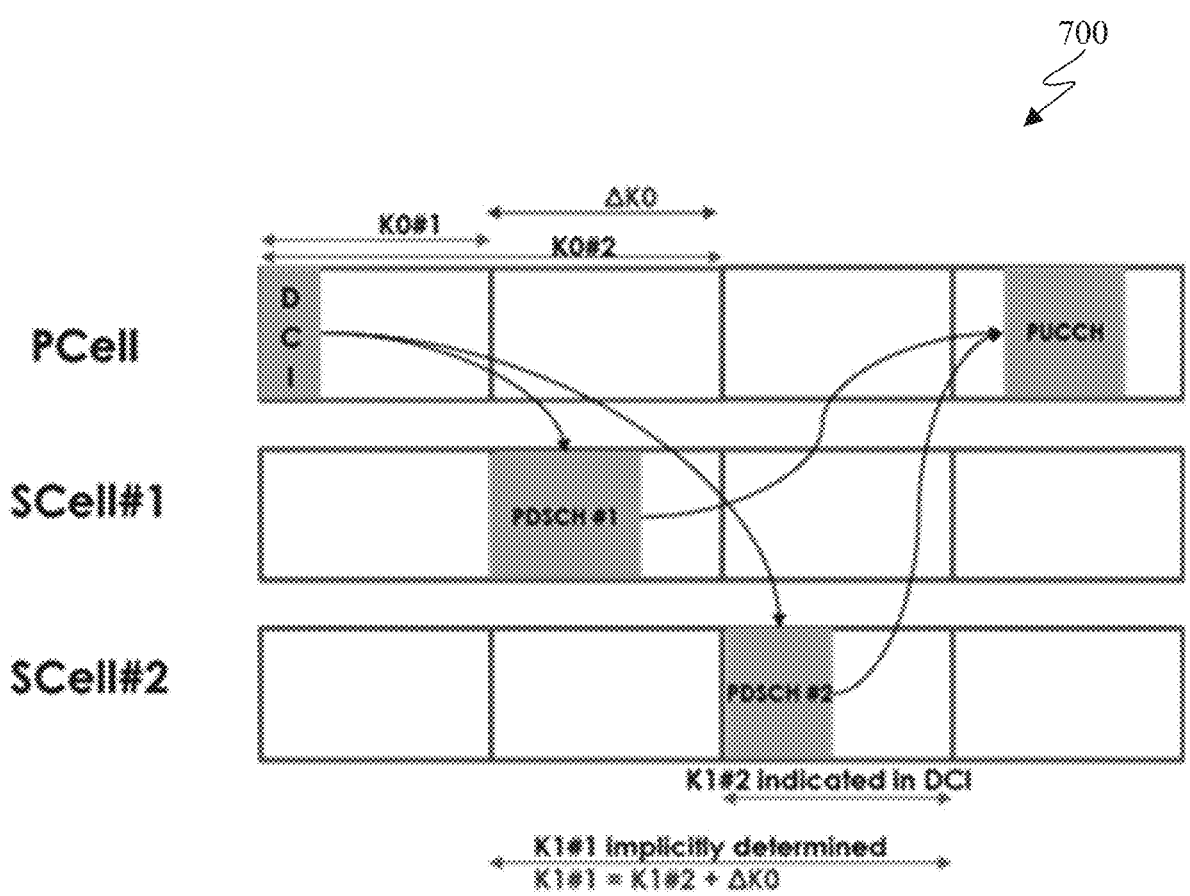
FIG. 7 illustrates an example diagram for determining effective K1 values and corresponding candidate physical downlink shared channel (PDSCH) occasions for co-scheduled cells with different K0 values according to embodiments of the present disclosure.
Figure 8:
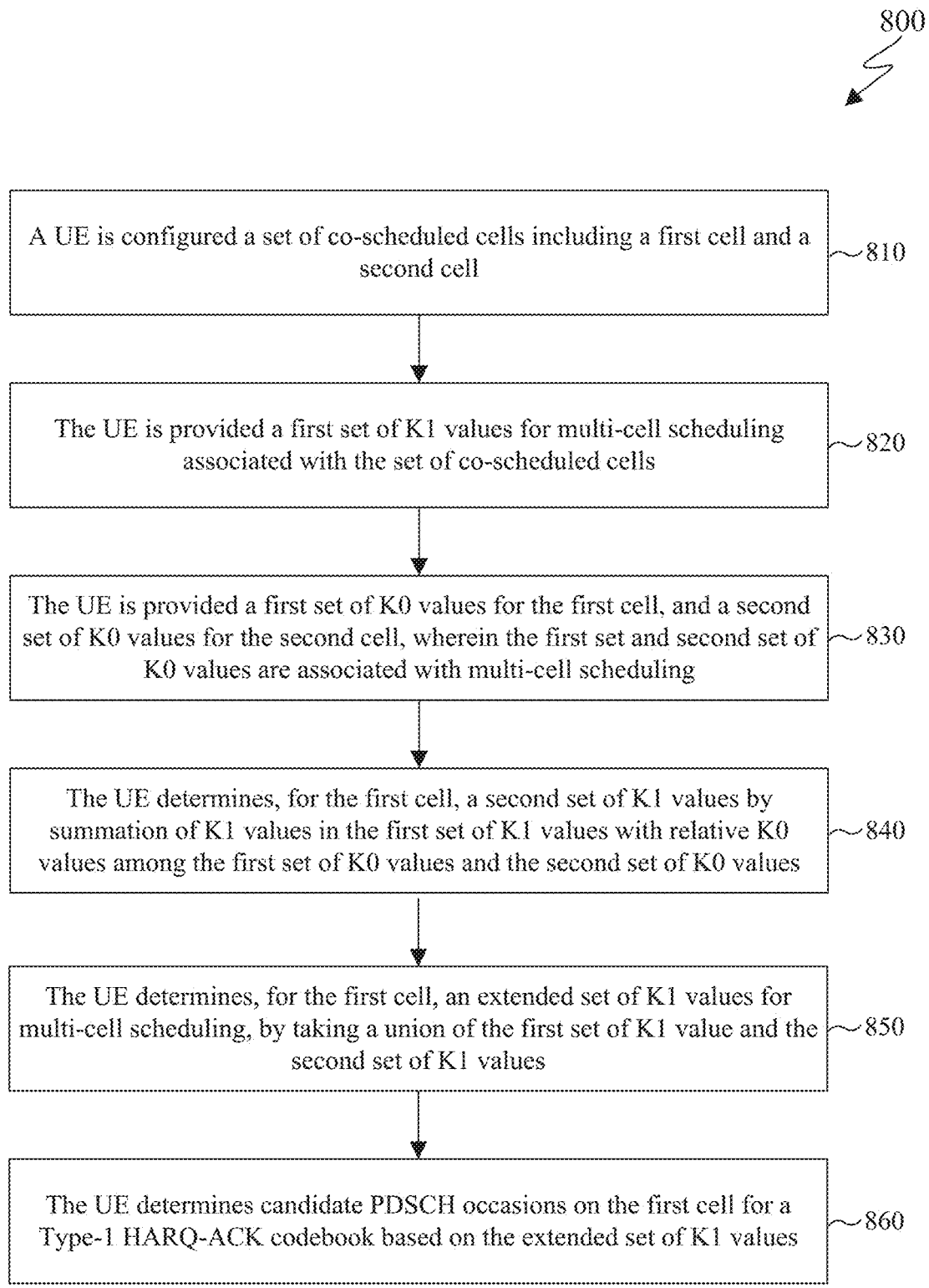
FIGS. 8-10 illustrate example methods for generating Type-1 CB in presence of multi-cell scheduling according to embodiments of the present disclosure.
Figure 9:
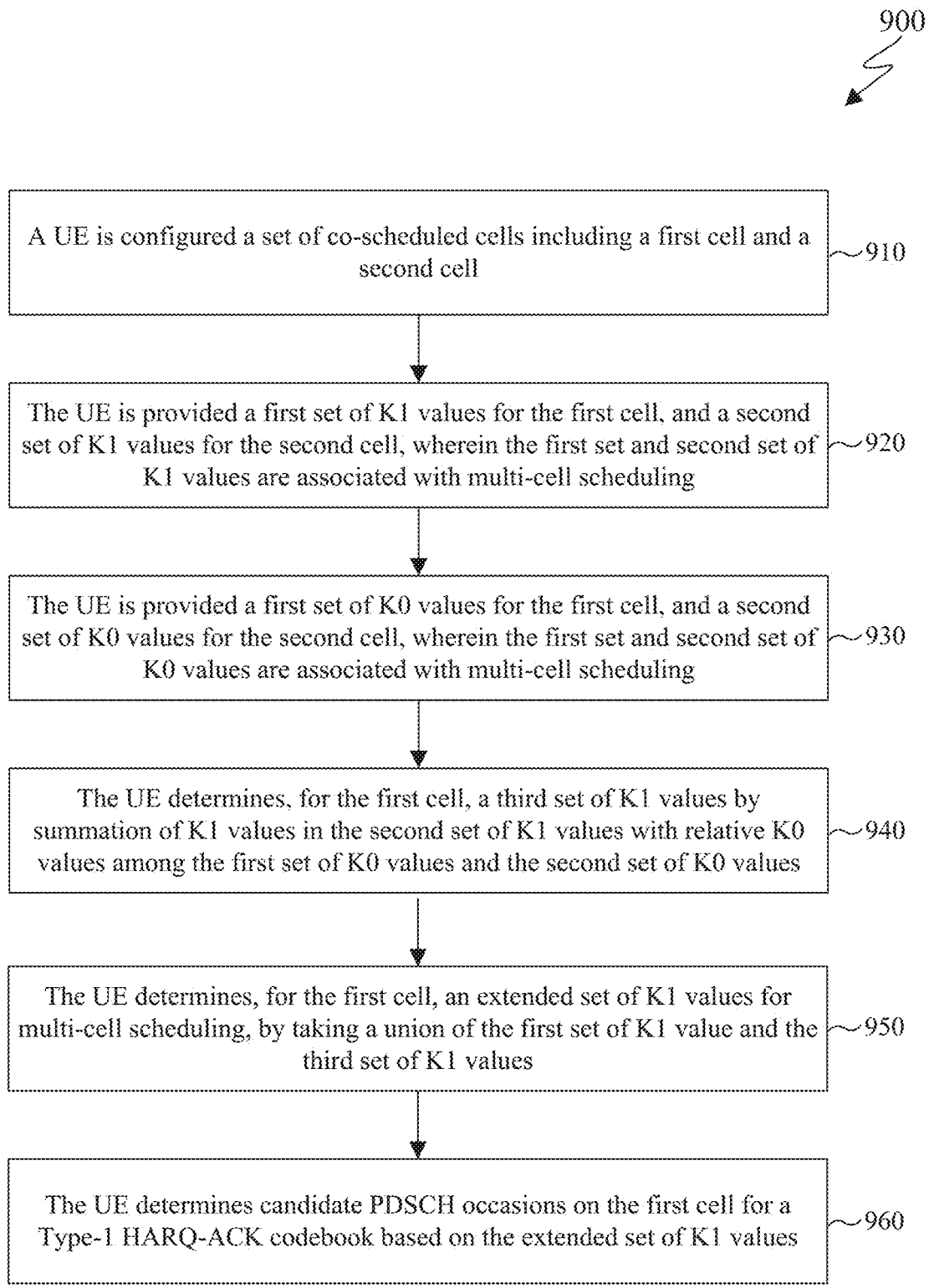
Figure 10:
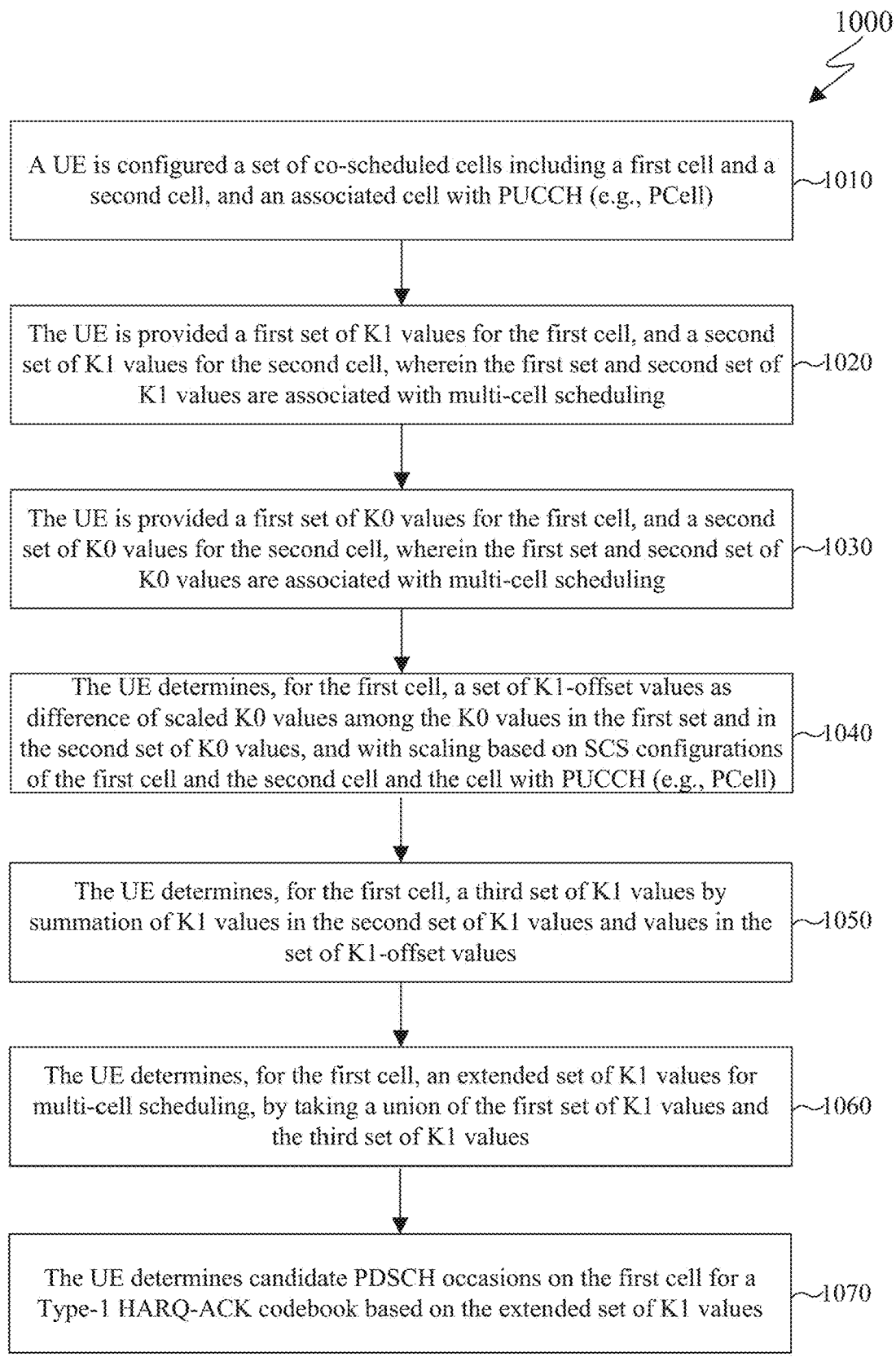

FIG. 6 illustrates an example diagram for generating Type-1 CB in presence of multi-cell scheduling according to embodiments of the present disclosure. FIG. 7 illustrates an example diagram 700 for determining effective K1 values and corresponding candidate PDSCH occasions for co-scheduled cells with different K0 values according to embodiments of the present disclosure. FIGS. 8-10 illustrate example methods 800, 900, and 1000, respectively, for generating Type-1 CB in presence of multi-cell scheduling according to embodiments of the present disclosure.

The steps of the method 600 of FIG. 6, the diagram 700 of FIG. 7, the method 800 of FIG. 8, the method 900 of FIG. 9, and the method 1000 of FIG. 10 can be performed by any of the UEs 111-116 of FIG. 1, such as the UE 116 of FIG. 3. The methods 600 and 800-1000 and the diagram 700 are for illustration only and other embodiments can be used without departing from the scope of the present disclosure.

In certain embodiments, For a UE (such as the UE 116) with multi-cell scheduling configuration, when the UE generates a same Type-1 CB for both single-cell scheduling and multi-cell scheduling, the UE determines candidate PDSCH occasions for the Type-1 CB based on TDRA table(s) corresponding to single-cell scheduling when a K1 value is configured only for single-cell scheduling, and based on union of TDRA table(s) corresponding to single-cell scheduling and TDRA table(s) corresponding to multi-cell scheduling when a K1 value is configured for both single-cell scheduling and multi-cell scheduling. When the UE receives co-scheduled PDSCHs with different K0 values and transmit the corresponding HARQ-ACK information in a same PUCCH/PUSCH in a same slot, the UE determines candidate PDSCH occasions not only based on configured K1 values, but also based on relative K0 values among K0 values configured for different co-scheduled cells. When different co-scheduled cells have different SCS configuration, the UE determines the relative K0 values based on suitable scaling factors, which are in turn based on corresponding SCS configurations for the co-scheduled cells and a corresponding cell with PUCCH configuration (such as the PCell).

Case #1 describes same SCS, same K1, and same K0 for all co-scheduled cells. This is described below.

When a UE (such as the UE 116) generates a same/common Type-1 HARQ-ACK codebook for both single-cell scheduling and multi-cell scheduling, wherein the multi-cell scheduling configuration is such that: (i) all serving cells in a set of co-scheduled cells have a same SCS, and (ii) the serving cells in the set of co-scheduled cells have a same configuration for both K0 and K1 parameter associated with multi-cell scheduling. Then the UE can determine candidate PDSCH occasions for a Type-1 HARQ-ACK codebook based on TDRA configuration for single-cell scheduling and/or TDRA configuration for multi-cell scheduling, depending on whether K1 values for single-cell scheduling and multi-cell scheduling are same or different. It is also possible that, for any serving cell, the UE is provided a K0/K1 configuration for single-cell scheduling that can be different from the corresponding configuration for multi-cell scheduling. It is also possible that, any serving cell with multi-cell scheduling configuration belongs to only one set of co-scheduled cells or belongs to multiple sets of co-scheduled cells.

In one realization, a UE with same K0 configuration for multi-cell scheduling of a set of co-scheduled cells can be realized by a TDRA table for multi-cell scheduling such that: (i) each entry in the TDRA table configured for multi-cell scheduling includes only one set of information for K0, SLIV, and PDSCH mapping type, that is commonly applicable to all co-scheduled cells, or (ii) each entry in the TDRA table configured for multi-cell scheduling includes multiple sets of information for K0, SLIV, and PDSCH mapping type, that corresponds to different cells from the set of co-scheduled cells, and the multiple sets of information within each entry provide a same K0 value for all co-scheduled cells.

For a UE (such as the UE 116) satisfying conditions of Case #1, the UE receives all co-scheduled PDSCHs in a same slot and transmits the HARQ-ACK feedback in a same PUCCH in a same slot determined based on a K1 value indicated in the DCI format for multi-cell scheduling.

For a given serving cell, let $\mathcal{K}_{1,sc}$ be the configured set of K1 values for single-cell scheduling, and $\mathcal{K}_{1,mc}$ be the configured set of K1 values for multi-cell scheduling.

Therefore, for Case #1, the UE can determine candidate PDSCH occasions corresponding to multi-cell scheduling on a serving cell with multi-cell scheduling configuration for a Type-1 CB based on: (i) only the TDRA table for single-cell scheduling, when the candidate PDSCH occasion corresponds to a K1 value that is configured only for single-cell scheduling, that is, for a $K_1 \in (\mathcal{K}_{1,sc} - \mathcal{K}_{1,mc})$, and (ii) only the TDRA table for multi-cell scheduling, when the candidate PDSCH occasion corresponds to a K1 value that is configured only for multi-cell scheduling, that is, for a $K_1 \in (\mathcal{K}_{1,mc} - \mathcal{K}_{1,sc})$, and (iii) union of the TDRA table for single-cell scheduling and the TDRA table for multi-cell scheduling, when the candidate PDSCH occasion corresponds to a K1 value that is configured for both single-cell scheduling and multi-cell scheduling, that is, for a $K_1 \in (\mathcal{K}_{1,sc} \cap \mathcal{K}_{1,mc})$.

For example, if K1=10, 1, 2, 31 for a first cell and K1=11, 2, 3, 41 for a second cell, then the UE considers: (i) only a TDRA table corresponding to the first cell when K1=0; and (ii) only a TDRA table corresponding to the second cell when K1=4; and (iii) the union of TDRA tables corresponding to the first cell and the second cell when K1={1,2,3}.

For example, when the UE is provided a same set of K1 values, regardless of single-cell scheduling or multi-cell scheduling, only the third category above applies. When the UE is provided a same TDRA table for both single-cell and multi-cell scheduling (that is, no dedicated TDRA tables for multi-cell scheduling), the UE determines candidate PDSCH receptions based on the same TDRA table. For example, when a UE operates with a serving cell that is included in first and second configured sets of co-scheduled cells, and when the UE is provided first and second TDRA tables for the first and second sets of co-scheduled cells, respectively, the UE determines candidate PDSCH receptions for the serving cells based on both (for example, union of) the first and second TDRA tables.

Accordingly, in the pseudo-code for determination of candidate PDSCH occasion, the UE determines a first set $R_{sc,only}$, a second set $R_{mc,only}$, and a third set $R_{union}$, corresponding to the three categories above for the configured K1 values.

Furthermore, the UE performs the TDRA pruning procedure (to exclude invalid/inapplicable candidate PDSCH occasions due to a configured TDD DL/UL configuration for the serving cell or due to overlap with other candidate PDSCH occasions) within the applicable TDRA table, that is, within the first set $R_{sc,only}$, or the second set $R_{mc,only}$, or the third set $R_{union}$, corresponding to the three categories above for the configured K1 values. In particular, for K1 values that are commonly configured for both single-cell scheduling and multi-cell scheduling, the TRDA pruning in the third set $R_{union}$ considers overlapped PDSCH occasions between single-cell scheduling and multi-cell scheduling.

The method 600, as shown in FIG. 6, describes an example procedure for Type-1 CB generation in presence of multi-cell scheduling based on potentially different TDRA/K0/K1 configurations associated with single-cell scheduling and multi-cell scheduling for a given serving cell.

In step 610, a UE (such as the UE 116) is provided a first configuration for a serving cell including a first TDRA table and/or a first set of K1 values corresponding to single-cell scheduling. In step 620, the UE is provided a second configuration for the serving cell including a second TDRA table and/or a second set of K1 values corresponding to multi-cell scheduling. For K1 values exclusively in the first set of K1 values, the UE determines first candidate PDSCH occasions based on the first TDRA table only (step 630). For K1 values exclusively in the second set of K1 values, the UE determines second candidate PDSCH occasions based on the second TDRA table only (step 640). For K1 values in the intersection of the first set and second set of K1 values, the UE determines third candidate PDSCH occasions based on both the first TDRA table and the second TDRA table (step 650). In step 660 the UE generates a Type-1 HARQ-ACK codebook based on HARQ-ACK information corresponding to the first and second and third candidate PDSCH occasions on the serving cell.

In one example, when the configured set of K1 values for multi-cell scheduling is a subset of the configured set of K1 values for single-cell scheduling ($\mathcal{K}_{1,mc} \subseteq \mathcal{K}_{1,sc}$), such as when the UE determines the set of K1 values for multi-cell scheduling as the intersection of configured K1 values for single-cell scheduling among serving cells from a set of co-scheduled cells, then the above procedure can be slightly simplified. Accordingly, a configured K1 value for a serving cell is: (i) either for single-cell scheduling only, in which case the UE applies only the TDRA table for single-cell scheduling ($R_{sc,only}$), (ii) or for both single-cell scheduling and multi-cell scheduling, in which case the UE applies the union of TDRA tables for single-cell scheduling and multi-cell scheduling ($R_{union}$).

In one example, the UE may not be provided (for all serving cells) with dedicated configuration for K1 values corresponding to multi-cell scheduling, such as the second set of K1 values considered in step 420 of FIG. 4. In such cases, the UE can implicitly determine, for a serving cell, a set of K1 values corresponding to multi-cell scheduling based on an intersection (or union) of K1 values corresponding to single-cell scheduling among all serving cells in a set of co-scheduled cells that includes the serving cell, as described herein. In one example, a same set of K1 values applies to both single-cell scheduling and multi-cell scheduling.

In the procedures described above in the present embodiment, for the case that: each entry in a TDRA table configured for multi-cell scheduling includes multiple sets of information for K0, SLIV, and PDSCH mapping type, that corresponds to different cells from the set of co-scheduled cells, the UE determines candidate PDSCH occasions for a serving cell from the set of co-scheduled cells based on only a set of information for K0, SLIV, and PDSCH mapping type that corresponding to the serving cell. Therefore, the UE does not perform "cross-cell pruning" of the TDRA tables, regardless of corresponding K1 values (for example, even so for $K_1 \in (\mathcal{K}_{1,sc} \cap \mathcal{K}_{1,mc})$).

For a serving cell without multi-cell scheduling configuration, the UE determines candidate PDSCH occasions as described in TS 38.213 v16.5.0.

Once the UE has determined candidate PDSCH occasions for all serving cells (with or without multi-cells scheduling configuration), the UE generates the Type-1 HARQ-ACK codebook by appending all HARQ-ACK information, first corresponding to different candidate PDSCH occasions within each serving cell, and then corresponding to different serving cells.

In one example, the UE can be configured a same transmission mode for all co-scheduled cells, or all serving cells in a same set of co-scheduled cells, wherein a transmission mode refers to, for example, TB-based or CBG-based PDSCH reception, a same configured number of TBs per PDSCH reception, and so on. In another example, the UE can be configured to apply spatial bundling for HARQ information corresponding to all co-scheduled cells, or all serving cells in a same set of co-scheduled cells.

In one example, the UE can be configured different number of TBs for PDSCH reception for cells in a set of co-scheduled cells. For example, the set of cells can include first and second cells, wherein the first cell is configured with one TB and the second cell is configured with two TBs, and the UE is not configured spatial bundling for the second cell. In one example, the UE can generate the HARQ-ACK information based on the maximum configured number of TBs and apply that to all cells in the set of co-scheduled cells. For example, the UE can provide 2*2=4 bits of HARQ-ACK information for first and second PDSCHs on the set of co-scheduled cells. In another example, the UE can provide 1+2=3 bits of HARQ-ACK information for first and second PDSCHs on the set of co-scheduled cells. For example, the UE can determine the total configured number of TBs for each configured set of co-scheduled cells, and then determine a number of bits for the HARQ-ACK information by taking a maximum over all sets of co-scheduled cells.

In one example, when a PDSCH reception from a set/subset of co-scheduled cells becomes invalid, such as when the PDSCH overlaps with an UL symbol (per TDD DL/UL configuration or per a slot format indication by a DCI format 2_0) or with a RACH occasion (RO) or with a measurement gap and so on, the UE: (i) in one option, includes a NACK corresponding to the PDSCH in a Type-1/Type-2 CB, or (ii) in another option, does not include any HARQ-ACK information feedback corresponding to the PDSCH in a Type-1/Type-2 CB.

Case #2 describes, same SCS, same K1, but different K0 for co-scheduled cells. This is described below.

When a UE generates a same/common Type-1 HARQ-ACK codebook for both single-cell scheduling and multi-cell scheduling, (wherein the multi-cell scheduling configuration is such that: (i) all serving cells in a set of co-scheduled cells have a same SCS, and (ii) the serving cells in the set of co-scheduled cells have a same configuration for K1 parameter, and different configurations for K0 parameter, associated with multi-cell scheduling, the UE can determine candidate PDSCH occasions for a Type-1 HARQ-ACK codebook based on both TDRA/K0/K1 configuration for single-cell scheduling and TDRA/K0/K1 configuration for multi-cell scheduling, including relative K0/scheduling timeline (denoted by ΔK0) for the set of K0 values associated with multi-cell scheduling. It is also possible that, for any serving cell, the UE is provided a K0/K1 configuration for single-cell scheduling that can be different from a corresponding configuration for multi-cell scheduling. It is also possible that, any serving cell with multi-cell scheduling configuration belongs to only one set of co-scheduled cells or belongs to multiple sets of co-scheduled cells.

In one realization, a UE with different K0 configurations for multi-cell scheduling for different co-scheduled cells can be realized by a joint TDRA table for multi-cell scheduling such that: (i) each entry in the TDRA table configured for multi-cell scheduling can include multiple sets of information for K0, SLIV, and PDSCH mapping type, that corresponds to different cells from the set of co-scheduled cells, and (ii) the multiple sets of information within each entry can provide different K0 values corresponding to different cells from the set of co-scheduled cells.

In a further realization, a UE can be configured a single K0 offset for each cell in the set, wherein the offset is relative to K0 value of a reference cell, and the same offset applies to all TDRA entries of a reference TDRA table for multi-cell scheduling (or a TDRA table for single-cell scheduling corresponding to the serving cell).

In another realization, a UE may not be provided with a K0/TDRA configuration dedicated to multi-cell scheduling, such as by a joint multi-cell TDRA table. Instead, the UE can be provided TDRA/K0 configuration only for single-cell scheduling, separately for each cell from the set of co-scheduled cells. Once the UE receives a DCI format for multi-cell scheduling, the UE determines TDRA for each PDSCH from co-scheduled PDSCHs based on an (individual) entry from the TDRA table for single-cell scheduling that is indicated by a TDRA field in the DCI format. In such a case, the UE can be inherently provided with different K0 configurations for multi-cell scheduling for different co-scheduled cells.

For a UE satisfying conditions of Case #2, the UE can receive the co-scheduled PDSCHs in different slots and provide corresponding HARQ-ACK information in a same PUCCH/PUSCH in a same slot determined based on a K1 value indicated in the DCI format for multi-cell scheduling.

According to this realization, a K1 value indicated by a DCI format for multi-cell scheduling is relative to (only) a last PDSCH from co-scheduled PDSCHs on a set/subset of co-scheduled cells, wherein the last PDSCH is defined according to any of the options considered herein. For example, the last PDSCH can refer to a PDSCH that starts or ends in a latest slot/symbol, among the co-scheduled PDSCHs, w.r.t. the SCS for the PUCCH cell (such as the PCell).

Therefore, for the Case #2, for a PUCCH in slot n, and for a given K1 value associated with multi-cell scheduling, there may be only some of co-scheduled PDSCHs in slot (n-K1), with respect to SCS of the cell with PUCCH configuration (such as the PCell), while other co-scheduled PDSCHs can be in a slot different from slot (n-K1).

For example, for a UE with all cells having a same SCS, if an entry in the TDRA table for multi-cell scheduling indicates $K0_{c1}=0$ for a first serving cell and $K0_{c2}=1$ for a second serving cell, and a DCI format for multi-cell scheduling jointly schedules the first cell and the second cell, and indicates K1=4 for a PUCCH in slot n relative to a last co-scheduled PDSCH (namely, the second cell since $K0\_2 > K0\_1$), then the UE determines a first candidate PDSCH occasion in slot $(n-K1)=(n-4)$ on the second cell, and a second candidate PDSCH occasion in slot $(n-K1-(K0\_c2-K0\_c1))=(n-4-1)=(n-5)$ on the first cell. Herein, the term $\Delta K0_{c1,c2}=K0_{c2}-K0_{c1}$ is a relative scheduling timing (relative K0) among the two co-scheduled cells. Therefore, the UE needs to consider $K_1 + \Delta K0_{c1,c2}$ as another effective PDSCH-to-HARQ_feedback timing value.

When a DCI format for multi-cell scheduling can indicate joint scheduling for any (non-empty) subset of a set of co-scheduled cells, the UE needs to consider all possible combinations of relative K0/scheduling offset ($\Delta K0$) among all pairs of co-scheduled cells. In particular, to determine an applicable set of K1 values for a given serving cell due to multi-cell scheduling, the UE needs to consider, in addition to the originally configured set of K1 values, further offset values based on difference of K0 values for the serving cell relative to K0 values of all other serving cells from the set of co-scheduled cells whose K0 value is larger than corresponding K0 value of the serving cell (so that the serving cell is not a last PDSCH from among the co-scheduled PDSCHs).

Therefore, in a general setting for the Case #2, assuming a same SCS $\mu_{PDSCH}$ for all co-scheduled PDSCHs in a set of co-scheduled cells, and an SCS $\mu_{PUCCH}$ for a corresponding cell with PUCCH configuration (such as the PCell), the UE determines the set $\widetilde{\mathcal{K}1}_{mc,c}$ of "effective" K1 values for multi-cell scheduling as an extension of the configured set $\mathcal{K}1_{mc}$ of K1 values for multi-cell scheduling associated with the serving cell c:

$$\widetilde{\mathcal{K}1}_{mc,c} = \mathcal{K}1_{mc} \cup \widetilde{\mathcal{K}1}_c, \qquad (4)$$

and $$\widetilde{\mathcal{K}1}_c = \left\{ \begin{array}{c} K1 + \lfloor |K0_i - K0_c| \cdot 2^{\mu_{PUCCH}-\mu_{PDSCH}} \rfloor : K1 \in \mathcal{K}1_{mc}, K0_c \in \mathcal{K}0_{mc}, i \in \mathcal{S}_c, \\ K0_i \in \mathcal{K}0_{mc}, K0_i \geq K0_c, \text{ and } K0_c \text{ and } K0_i \text{ in a same } TDRA \text{ entry} \end{array} \right\}. \qquad (5)$$

Here, $\mathcal{S}_c$ denotes the (union of) sets of co-scheduled cells that include the serving cell c; $\mathcal{K}0_{mc}$ and $\mathcal{K}1_{mc}$ denote the (originally configured) set of K0 and K1 values for multi-cell scheduling associated with the serving cell c, respectively. For example, $\mathcal{K}1_{mc}$ can include K1 values dedicated to multi-cell scheduling configuration or can include K1 values that are applicable to both single-cell and multi-cell scheduling.

In one example, when a DCI format for multi-cell scheduling can indicate multiple separate TDRA fields for a set/subset of co-scheduled cells (that is, not via a joint multi-cell TDRA table), so that K0 values for different PDSCHs from the set/subset of co-scheduled cells can be selected independently, then extension of the set of K1 values can be described as follows:

$$\widetilde{\mathcal{K}1} = \left\{ \begin{array}{c} K1 + \lfloor |K0_i - K0_c| \cdot 2^{\mu_{PUCCH}-\mu_{PDSCH}} \rfloor : \\ K1 \in \mathcal{K}1_{mc}, K0_c \in \mathcal{K}0_{mc}, i \in \mathcal{S}_c, K0_i \in \mathcal{K}0_{mc}, K0_i \geq K0_c \end{array} \right\} \qquad (6)$$

In the examples above, the terms $2^{\mu_{PUCCH}-\mu_{PDSCH}}$ may be replaced by $2^{\mu_{PDSCH}-\mu_{PUCCH}}$, or the floor operation $\lfloor \cdot \rfloor$ may be replaced by ceiling operation $\lceil \cdot \rceil$.

For the Case #2, once the UE determines the "effective"/extended set of K1 values for multi-cell scheduling, the UE performs determination of candidate PDSCH occasions as described for Case #1, except that the set of K1 values is replaced with the effective/extended set $\widetilde{\mathcal{K}1}_{mc,c}$ of K1 values. For example, the UE determines the first set $R_{sc,only}$, the second set $R_{mc,only}$, and the third set $R_{union}$, from the TDRA tables for single-cell scheduling and/or multi-cell scheduling, corresponding to the three categories above for the configured K1 values, as described earlier in Case #1. The UE then generates the Type-1 CB by determining HARQ-ACK information for the determined candidate PDSCH occasions.

As shown in FIG. 7, the diagram 700 describes how to determine effective K1 values and corresponding candidate PDSCH occasions for co-scheduled cells with different K0 values, that are provided a single K1 value relative to a last PDSCH from co-scheduled PDSCHs, when corresponding cells have a same SCS.

A PDSCH candidate occasion, such as PDSCH #2 on SCell #2, can be determined solely based on a configured K1 offset from a PUCCH slot. But another PDSCH candidate occasion, such as PDSCH #2 on SCell #1, cannot be determined solely based on a configured K1 offset from a PUCCH slot. The UE needs to also consider relative K0 values in the TDRA table to determine such candidate PDSCH occasions for multi-cell scheduling. In one example, PCell can be one of the co-scheduled cells, and one of PDSCH #1 or PDSCH #2 or a different PDSCH #3 can be on the PCell.

The method 800, as illustrated in FIG. 8, describes an example procedure for Type-1 CB generation in presence of multi-cell scheduling based on relative K0 values, when a set of co-scheduled cells are provided different K0 values, but transmit the HARQ-ACK information in a same PUCCH.

In step 810, a UE (such as the UE 116) is configured a set of co-scheduled cells including a first cell and a second cell. In step 820, the UE is provided a first set of K1 values for multi-cell scheduling associated with the set of co-scheduled cells. In step 830, the UE is provided a first set of K0 values for the first cell, and a second set of K0 values for the second cell, wherein the first set and second set of K0 values are associated with multi-cell scheduling. In step 840, the UE determines, for the first cell, a second set of K1 values by summation of K1 values in the first set of K1 values with relative K0 values among the first set of K0 values and the second set of K0 values. In step 850, the UE determines, for the first cell, an extended set of K1 values for multi-cell scheduling, by taking a union of the first set of K1 value and the second set of K1 values. In step 860, the UE determines candidate PDSCH occasions on the first cell for a Type-1 HARQ-ACK codebook based on the extended set of K1 values.

Case #3 describes using same SCS, and different K0/K1 for co-scheduled cells. This is described below.

When a UE generates a same/common Type-1 HARQ-ACK codebook for both single-cell scheduling and multi-cell scheduling, (wherein the multi-cell scheduling configuration is such that: (i) all serving cells in a set of co-scheduled cells have a same SCS, and (ii) the serving cells in the set of co-scheduled cells can have different configurations for at least one of TDRA/K0/K1 parameters associated with multi-cell scheduling) the UE can determine candidate PDSCH occasions for a Type-1 HARQ-ACK codebook based on both TDRA/K0/K1 configuration for single-cell scheduling and TDRA/K0/K1 configuration for multi-cell scheduling, including relative K0/scheduling timeline (denoted by ΔK0) for the set of K0 values associated with multi-cell scheduling, along with an interaction among K1 configuration for different co-scheduled cells. It is also possible that, any serving cell with multi-cell scheduling configuration belongs to only one set of co-scheduled cells or belongs to multiple sets of co-scheduled cells.

In one example, any serving cell is provided a TDRA/K0/K1 configuration for single-cell scheduling, which is potentially different from the corresponding configuration for multi-cells scheduling.

In one example, a UE with different K0 configurations for different co-scheduled cells can be realized as described above in Case #2.

In one example, a UE with different K1 configurations for different co-scheduled cells can be realized by making no distinction among K1 values as to whether they are associated with single-cell scheduling or multi-cell scheduling. Accordingly, the UE can be configured a set of K1 values for each cell, including each cell from a set of co-scheduled cells. In another example, a UE with different K1 configurations for different co-scheduled cells can be realized when the UE is configured a first set of K1 values for a first set of co-scheduled cells and a second set of K1 values for a second set of co-scheduled cells, where the first and second sets of co-scheduled cells can have non-empty intersection (that is, there can be a cell that is included in both the first and second sets of co-scheduled cells).

In this case, a K1 value indicated in a DCI format for multi-cell scheduling for cells from the set of co-scheduled cells, refers to a K1 value from a set of K1 values configured for a cell from the set of co-scheduled cells on which the UE receives a last PDSCH from the co-scheduled PDSCHs. Herein, the last PDSCH is defined according to any of the options considered herein. For example, the last PDSCH can refer to a PDSCH that ends in a latest slot/symbol, among the co-scheduled PDSCHs, w.r.t. the SCS for the PUCCH cell (such as the PCell).

For a UE satisfying conditions of Case #3, the UE can receive the co-scheduled PDSCHs in different slots and provides the corresponding HARQ-ACK feedback in a same PUCCH in a same slot determined based on a K1 value indicated in the DCI format for multi-cell scheduling.

Accordingly, for the Case #3, in order to determine candidate PDSCH occasions for generation of Type-1 CB, the UE needs to determine an extension of the (originally) configured set, similar to the method considered for Case #2, and with the additional consideration that different co-scheduled cells can have different configurations for the K1 parameters. In particular, relative K0/scheduling timeline (denoted by ΔK0) should be considered w.r.t. K1 values of other cells in the set of co-scheduled cells.

For example, for the Case #3, assuming a same SCS $\mu_{PDSCH}$ for all co-scheduled PDSCHs in a set of co-scheduled cells, and an SCS $\mu_{PUCCH}$ for a corresponding cell with PUCCH configuration (such as the PCell), the UE determines the set $\widetilde{\mathcal{K}1}_{mc,c}$ of "effective" K1 values for multi-cell scheduling as an extension of the configured set $\mathcal{K}1_{mc,c}$ of K1 values for multi-cell scheduling associated with the serving cell c:

$$\widetilde{\mathcal{K}1}_{mc,c} = \mathcal{K}1_{mc} \cup \widetilde{\mathcal{K}1}_c, \tag{7}$$

and $$\widetilde{\mathcal{K}1}_c = \tag{8}$$

$$\left\{ \begin{array}{c} K1_i + \lfloor |K0_i - K0_c| \cdot 2^{\mu_{PUCCH} - \mu_{PDSCH}} \rfloor : i \in S_c, K1_i \in \mathcal{K}1_{mc,i}, \\ K0_i \in \mathcal{K}0_{mc,i}, K0_c \in \mathcal{K}0_{mc,c}, K0_i \geq K0_c, \text{ and } K0_c \text{ and } K0_i \text{ in a same } TDRA \text{ entry} \end{array} \right\}.$$

Here, $S_c$ denotes the (union of) sets of co-scheduled cells that include the serving cell c; $\mathcal{K}0_{mc,c}$ and $\mathcal{K}1_{mc,c}$ denote the (originally configured) set of K0 and K1 values for multi-cell scheduling associated with the serving cell c, respectively; and $\mathcal{K}0_{mc,i}$ and $\mathcal{K}1_{mc,i}$ denote the (originally configured) set of K0 and K1 values for multi-cell scheduling associated with a/any other serving cell i from the set of co-scheduled cells, respectively.

In one example, when a DCI format for multi-cell scheduling can indicate multiple separate TDRA fields for a set/subset of co-scheduled cells (that is, not via a joint multi-cell TDRA table), so that K0 values for different PDSCHs from the set/subset of co-scheduled cells can be selected independently, then extension of the set of K1 values can be simplified as follows:

$$\widetilde{\mathcal{K}1}_c = \tag{9}$$
$$\left\{ \begin{array}{c} K1_i + \lfloor |K0_i - K0_c| \cdot 2^{\mu_{PUCCH} - \mu_{PDSCH}} \rfloor : \\ i \in \mathcal{S}_c, K1_i \in \mathcal{K}1_{mc,i}, K0_i \in \mathcal{K}0_{mc,i}, K0_c \in \mathcal{K}0_{mc,c}, K0_i \geq K0_c \end{array} \right\}$$

In the examples above, the terms $2^{\mu_{PUCCH} - \mu_{PDSCH}}$ may be replaced by $2^{\mu_{PDSCH} - \mu_{PUCCH}}$, or the floor operation $\lfloor \cdot \rfloor$ may be replaced by ceiling operation $\lceil \cdot \rceil$.

For the Case #3, once the UE determines the "effective" set of K1 values for multi-cell scheduling, the UE performs determination of candidate PDSCH occasions and generates the Type-1 CB as described earlier for Case #1 and Case #2.

The method 900, as illustrated in FIG. 9, describes an example procedure for Type-1 CB generation in presence of multi-cell scheduling, when a set of co-scheduled cells are provided different K0 and K1 values, but transmit the HARQ-ACK information in a same PUCCH. Herein, the UE determines candidate PDSCH occasions of a serving cell based on relative K0 values among a set of co-scheduled cells and K1 values of other serving cells in the set of co-scheduled cells.

In step 910, a UE (such as the UE 116) is configured a set of co-scheduled cells including a first cell and a second cell. In step 920, the UE is provided a first set of K1 values for the first cell, and a second set of K1 values for the second cell, wherein the first set and second set of K1 values are associated with multi-cell scheduling. In step 930, the UE is provided a first set of K0 values for the first cell, and a second set of K0 values for the second cell, wherein the first set and second set of K0 values are associated with multi-cell scheduling. In step 940, the UE determines, for the first cell, a third set of K1 values by summation of K1 values in the second set of K1 values with relative K0 values among the first set of K0 values and the second set of K0 values. In step 950, the UE determines, for the first cell, an extended set of K1 values for multi-cell scheduling, by taking a union of the first set of K1 value and the third set of K1 values. In step 960, the UE determines candidate PDSCH occasions on the first cell for a Type-1 HARQ-ACK codebook based on the extended set of K1 values.

Case #4 describes the different SCS (with same or different K0/K1) for co-scheduled cells.

When a UE generates a same/common Type-1 HARQ-ACK codebook for both single-cell scheduling and multi-cell scheduling (wherein the multi-cell scheduling configuration is such that: (i) different serving cells in a set of co-scheduled cells can have different SCS configuration, and (iii) the serving cells in the set of co-scheduled cells can have same or different configurations for at least one of TDRA/K0/K1 parameters associated with multi-cell scheduling), the UE can determine candidate PDSCH occasions for a Type-1 HARQ-ACK codebook based on both TDRA/K0/K1 configuration for single-cell scheduling and TDRA/K0/K1 configuration for multi-cell scheduling, including relative K0/scheduling timeline (denoted by ΔK0) for the set of K0 values associated with multi-cell scheduling, along with an interaction among K1 configurations for different co-scheduled cells, wherein different SCSs are captured in timing relationships. It is also possible that, any serving cell with multi-cell scheduling configuration belongs to only one set of co-scheduled cells or belongs to multiple sets of co-scheduled cells.

In one example, any serving cell is provided a TDRA/K0/K1 configuration for single-cell scheduling, which is potentially different from the corresponding configuration for multi-cells scheduling. For example, a configuration of TDRA/K0/K1 for multi-cell scheduling can be same across different sets of co-scheduled cells or separate configurations of TDRA/K0/K1 can be provided for different sets of co-scheduled cells.

For example, for the Case #4, assuming a SCS configuration $\mu_{PDSCH,c}$ for a PDSCH on serving cell c, and a SCS configuration $\mu_{PDSCH,i}$ for any other serving cell i from the set of co-scheduled cells, wherein $\mu_{PDSCH,c}$ and $\mu_{PDSCH,i}$ can be different, and an SCS $\mu_{PUCCH}$ for a corresponding cell with PUCCH configuration (such as the PCell), the UE determines the set $\widetilde{\mathcal{K}1}_{mc,c}$ of "effective" K1 values for multi-cell scheduling as an extension of the configured set $\mathcal{K}1_{m,c}$ of K1 values for multi-cell scheduling associated with the serving cell c:

$$\widetilde{\mathcal{K}1}_{mc,c} = \mathcal{K}1_{mc,c} \cup \widetilde{\mathcal{K}1}_c \tag{10}$$

and $$\widetilde{\mathcal{K}1}_c = \tag{11}$$
$$\left\{ \begin{array}{c} K1_i + \lfloor |K0_i \cdot 2^{\mu_{PUCCH} - \mu_{PDSCH,i}} - K0_c \cdot 2^{\mu_{PUCCH} - \mu_{PDSCH,c}} | \rfloor : i \in \mathcal{S}_c, K1_i \in \mathcal{K}1_{mc,i}, \\ K0_c \in \mathcal{K}0_{mc,c}, K0_i \cdot 2^{\mu_{PUCCH} - \mu_{PDSCH,i}} \geq K0_c \cdot 2^{\mu_{PUCCH} - \mu_{PDSCH,c}}, \\ \text{and } K0_c \text{ and } K0_i \text{ in a same } TDRA \text{ entry} \end{array} \right\},$$

Here, $\mathcal{S}_c$ denotes the set of co-scheduled cells that includes the serving cell c; $\mathcal{K}0_{mc,c}$ and $\mathcal{K}1_{mc,c}$ denote the (originally configured) set of K0 and K1 values for multi-cell scheduling associated with the serving cell c, respectively; and $\mathcal{K}0_{mc,i}$ and $\mathcal{K}1_{mc,i}$ denote the (originally configured) set of K0 and K1 values for multi-cell scheduling associated with a/any other serving cell i from the set of co-scheduled cells, respectively.

In the examples above, the term $2^{\mu_{PUCCH} - \mu_{PDSCH,i}}$ may be replaced by $2^{\mu_{PDSCH,i} - \mu_{PUCCH}}$, or the term $2^{\mu_{PUCCH} - \mu_{PDSCH,c}}$ may be replaced by $2^{\mu_{PDSCH,c} - \mu_{PUCCH}}$, or the floor operation $\lfloor \cdot \rfloor$ may be replaced by ceiling operation $\lceil \cdot \rceil$.

The above formulation considers a general case with different SCS configurations and different K0/K1 configurations among the co-scheduled cells. The formulas can be simplified in various cases, such as when the UE is provided a same configuration for K0 or K1 parameters, or when the UE is provided separate configuration/indication for TDRA/K0 tables, rather than a joint multi-cell TDRA configuration.

For the Case #4, once the UE determines the "effective" set of K1 values for multi-cell scheduling, the UE performs determination of candidate PDSCH occasions and generates the Type-1 CB as described earlier for Case #1 and Case #2, and Case #3.

The method 1000, as illustrated in FIG. 10, describes an example procedure for Type-1 CB generation in presence of multi-cell scheduling, when a set of co-scheduled cells are provided different SCS (with same or different K0 and K1 values), but transmit the HARQ-ACK information in a same PUCCH. Herein, the UE determines candidate PDSCH occasions of a serving cell based on relative K0 values among a set of co-scheduled cells and K1 values of other serving cells in the set of co-scheduled cells, wherein suitable scaling based on corresponding SCS configurations is applied when determining the relative K0 values.

In step 1010, a UE (such as the UE 116) is configured a set of co-scheduled cells including a first cell and a second cell, and an associated cell with PUCCH (e.g., PCell). In step 1020 the UE is provided a first set of K1 values for the first cell, and a second set of K1 values for the second cell, wherein the first set and second set of K1 values are associated with multi-cell scheduling. In step 130, the UE is provided a first set of K0 values for the first cell, and a second set of K0 values for the second cell, wherein the first set and second set of K0 values are associated with multi-cell scheduling. In step 1040, the UE determines, for the first cell, a set of K1-offset values as difference of scaled K0 values among the K0 values in the first set and in the second set of K0 values, and with scaling based on SCS configurations of the first cell and the second cell and the cell with PUCCH (e.g., PCell). In step 1050, the UE determines, for the first cell, a third set of K1 values by summation of K1 values in the second set of K1 values and values in the set of K1-offset values. In step 1060, the UE determines, for the first cell, an extended set of K1 values for multi-cell scheduling, by taking a union of the first set of K1 values and the third set of K1 values. In step 1070, the UE determines candidate PDSCH occasions on the first cell for a Type-1 HARQ-ACK codebook based on the extended set of K1 values.

Although FIG. 6 illustrates the method 600, FIG. 7 illustrates the diagram 700, FIG. 8 illustrates the method 800, FIG. 9 illustrates the method 900, and FIG. 10 illustrated the method 1000 various changes may be made to FIGS. 6-10. For example, while the methods 600 and 800-1000 are shown as a series of steps, various steps could overlap, occur in parallel, occur in a different order, or occur multiple times. In another example, steps may be omitted or replaced by other steps. For example, steps of the method 700, the method 800, the method 900, and the method 1000 can be executed in a different order.

The following embodiments of the present disclosure, describe generating separate Type-1 HARQ-ACK codebooks for single-cell scheduling and multi-cell scheduling. This is described in the following examples and embodiments, such as those of FIG. 11.

Figure 11:
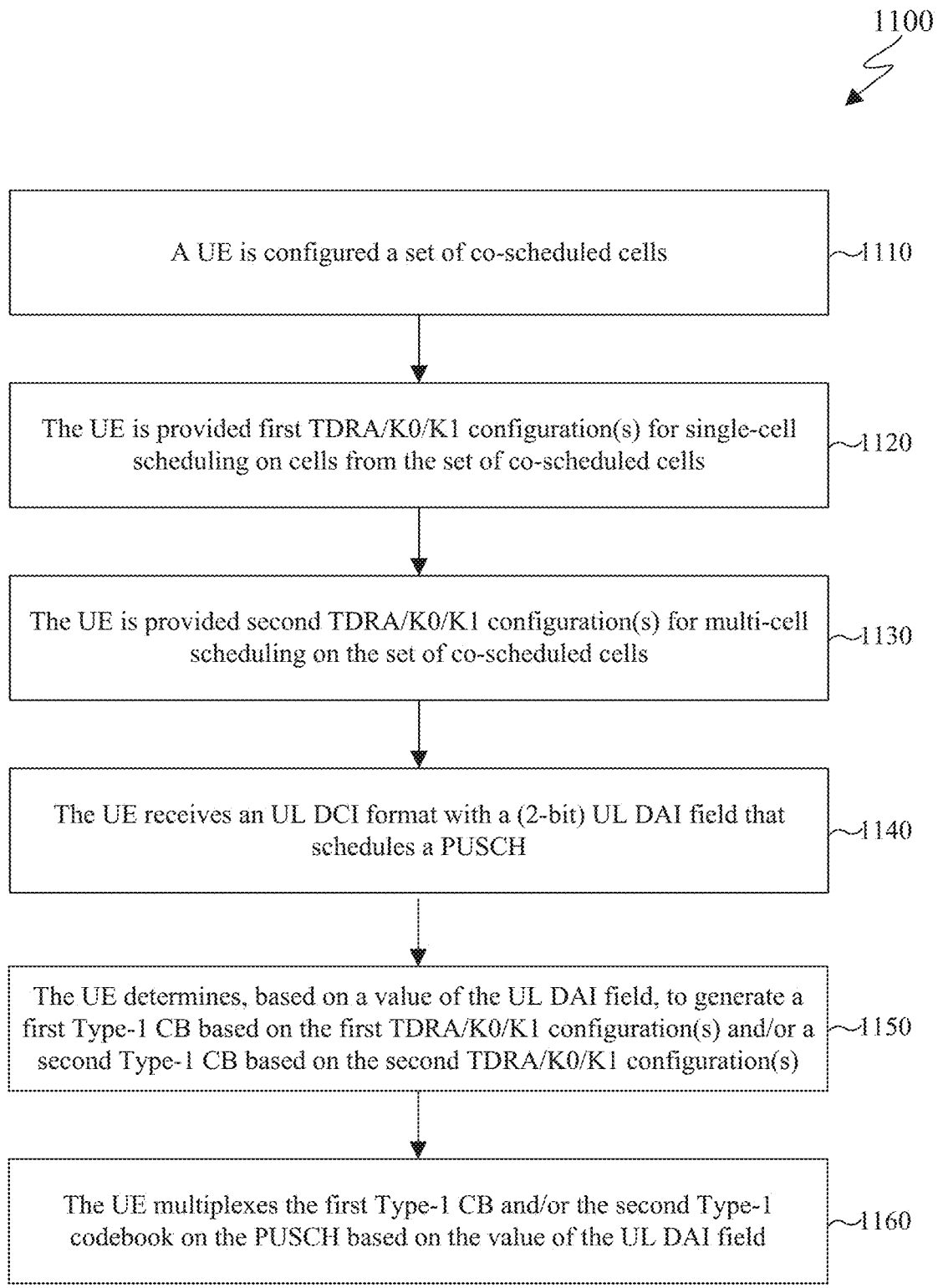
FIG. 11 illustrates an example method for separate Type-1 CBs corresponding to single-cell scheduling and multi-cell scheduling according to embodiments of the present disclosure.

FIG. 11 illustrates an example method 1100 for separate Type-1 CBs corresponding to single-cell scheduling and multi-cell scheduling according to embodiments of the present disclosure. The steps of the method 1100 of FIG. 11 can be performed by any of the UEs 111-116 of FIG. 1, such as the UE 116 of FIG. 3. The method 1100 is for illustration only and other embodiments can be used without departing from the scope of the present disclosure.

In certain embodiments, for a UE (such as the UE 116) configured with multi-cell scheduling, when the UE generates separate Type-1 HARQ-ACK codebooks for single-cell scheduling and multi-cell scheduling, the UE generates a first Type-1 CB for single-cell scheduling and a second Type-1 CB for multi-cell scheduling, wherein each Type-1 CB is based on corresponding configuration(s) for TDRA/K0/K1. The UE can transmit the first and second CBs in PUCCHs using separate PUCCH resources or can append the first and second CBs (in which case, can be also referred to as, first and second sub-CBs) and transmit a PUCCH in a single/same PUCCH resource. Alternatively, the UE can transmit the first and/or the second Type-1 CB on a PUSCH, based on an UL DAI field (with 2 bits, corresponding to single-cell and multi-cell scheduling, instead of 1 bit in case of only single-cell scheduling) in a DCI format that schedules the PUSCH.

The UE generates the first Type-1 CB based on TDRA/K0/K1 configuration for single-cell scheduling per procedure as described in TS 38.213 v16.5.0.

The UE generates the second Type-1 CB based on methods described herein, such as determination of an "effective" set $\mathcal{K}1_{mc,c}$ of K1 values for multi-cell scheduling when applicable. Unlike one or more previously described embodiments, the UE determines candidate PDSCH occasions, corresponding to original or effective/extended set of K1 values for multi-cell scheduling, only based on a TDRA table configured/determined for multi-cell scheduling. Therefore, from terminology of one or more previously described embodiments, only the second set $R_{mc,only}$ that relates to TDRA table for multi-cell scheduling is applicable to the second Type-1 CB (for multi-cell scheduling), and the first set $R_{sc,only}$ and the third set $R_{union}$ that relate to TDRA table for single-cell scheduling are not applicable. The UE then generates the second Type-1 CB by determining HARQ-ACK information for the determined candidate PDSCH occasions for the second Type-1 CB.

For the case that the UE generates a first Type-1 CB for single-cell scheduling, separate from a second Type-1 CB for multi-cell scheduling, the UE can: (i) in a first example, provide the first Type-1 CB in a first PUCCH/PUSCH, and provide the second Type-1 CB in a second PUCCH/PUSCH, or (ii) in a second example, append the first and the second Type-1 CBs, and provide the combined CBs in a same PUCCH/PUSCH, or (iii) in a third example, determine only one of the first Type-1 CB and the second Type-1 CB, and provide only the one determined Type-1 CB in a PUCCH/PUSCH.

For the third example, the UE determination can be based on a field in the DL DCI format(s) for single-cell scheduling or multi-cell scheduling of corresponding PDSCH(s), or can be based on a field, such as UL DAI, in an UL DCI format scheduling a PUSCH that will carry the determined Type-1 HARQ-ACK CB. For example, a 2-bit UL DAI can be used (instead of a 1-bit UL DAI for Type-1 CB only for single-cell scheduling), with an interpretation as described in Table (5). If a UE does not detect any DCI format scheduling PDSCH receptions in multiple cells, the UE does not provide a corresponding Type-1 HARQ-ACK CB in a PUCCH.

Table (5) describes Interpretation of UL DAI for Type-1 CB in presence of multi-cell scheduling.

TABLE 5

| UL DAI | Interpretation (first/second bit corresponds to multi/single-cell scheduling) |
|---|---|
| 00 | No Type-1 CB multiplexed on PUSCH |
| 01 | Type-1 CB for single-cell scheduling multiplexed on PUSCH |

TABLE 5-continued

| UL DAI | Interpretation (first/second bit corresponds to multi/single-cell scheduling) |
|---|---|
| 10 | Type-1 CB for multi-cell scheduling multiplexed on PUSCH |
| 11 | Both Type-1 CBs for single-cell and multi-cell scheduling appended and multiplexed on PUSCH |

For the third example, when a gNB indication is not available, such as for the case of an UL DCI format 0_0 without a DAI field that schedules a PUSCH or for a configured-grant PUSCH, (and assuming that timeline conditions for multiplexing a HARQ-ACK CB on the scheduled PUSCH is satisfied), the UE determination can be based on a default behavior, for example, provide only the Type-1 CB for single-cell scheduling, or the combined Type-1 CBs for both single-cell and multi-cell scheduling, per the specifications for system operation or per higher layer configuration. Alternatively, a UE does not provide Type-1 CB for single-cell scheduling if the UE did not receive any corresponding PDSCH associated with single-cell scheduling or does not provide Type-1 CB for multi-cell scheduling if the UE did not receive any corresponding PDSCH associated with multi-cell scheduling.

The method 1100, as illustrated in FIG. 11, describes an example procedure for separate Type-1 CBs corresponding to single-cell scheduling and multi-cell scheduling, which are multiplexed on a PUSCH based on an UL DAI field of an UL DCI format that schedules the PUSCH.

In step 1110, a UE (such as the UE 116) is configured a set of co-scheduled cells. In step 1120, the UE is provided first TDRA/K0/K1 configuration(s) for single-cell scheduling on cells from the set of co-scheduled cells. In step 1130, the UE is provided second TDRA/K0/K1 configuration(s) for multi-cell scheduling on the set of co-scheduled cells. In step 1140, the UE receives an UL DCI format with a (2-bit) UL DAI field that schedules a PUSCH. In step 1150, the UE determines, based on a value of the UL DAI field, to generate a first Type-1 CB based on the first TDRA/K0/K1 configuration(s) and/or a second Type-1 CB based on the second TDRA/K0/K1 configuration(s). In step 1160, the UE multiplexes the first Type-1 CB and/or the second Type-1 codebook on the PUSCH based on the value of the UL DAI field.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

The following embodiments of the present disclosure, describe Type-1 HARQ-ACK codebook for multi-cell scheduling with two-stage DCI. This is described in the following examples and embodiments.

When a UE is configured a two-stage DCI format for multi-cell scheduling of a set of co-scheduled cells, wherein the UE receives a corresponding $2^{nd}$-stage DCI in a first PDSCH, the UE can provide a HARQ-ACK information corresponding to the first PDSCH in a same or different PUCCH/PUSCH compared to a PUCCH/PUSCH in which the UE provides HARQ-ACK information corresponding to (other) co-scheduled PDSCHs on the set of co-scheduled cells.

In one approach, the UE provides HARQ-ACK information for the first PDSCH in a same PUCCH/PUSCH as that for other co-scheduled PDSCHs indicated by the two-stage DCI. This approach can be beneficial, for example, to reduce PUCCH overhead of the two-stage DCI. According to this approach, the UE determines additional candidate PDSCH occasions corresponding to the first PDSCH, based on a further offset equal to configured K0 values for single-/multi-cell scheduling for any serving cell from the set of co-scheduled cells relative to a candidate occasion for a first/earliest PDSCH from the (other) co-scheduled cells.

In another approach, the UE provides HARQ-ACK information for the first PDSCH in a different PUCCH/PUSCH than the PUCCH for other co-scheduled PDSCHs indicated by the two-stage DCI. This approach can be beneficial, for example, to reduce HARQ-ACK latency of the two-stage DCI. According to this approach, the UE expects to receive a first PUCCH resource indication (PRI) for transmitting HARQ-ACK information of the first PDSCH, and a second PRI for transmitting HARQ-ACK information of the (other) co-scheduled PDSCHs. In one example, the UE receives the first PRI in the $1^{st}$-stage DCI and receives the second PRI in the second PRI.

The following embodiments of the present disclosure, describe other aspects of HARQ-ACK codebook generation in presence of multi-cell scheduling.

The following embodiments of the present disclosure, describe Type-3 HARQ codebook in presence of multi-cell scheduling. This is described in the following examples and embodiments.

For a UE that is configured a number of sets of co-scheduled cells, when a DCI format for multi-cell scheduling includes a flag, such as a One-shot HARQ-ACK request field, that triggers generation of a Type-3 HARQ codebook (also referred to as, a "One-shot" CB), the UE can consider the DCI format for multi-cell scheduling as an implicit triggering state for the Type-3 HARQ codebook.

In one approach, the DCI format for multi-cell scheduling can trigger generation of a Type-3 CB corresponding to all HARQ processes associated with a set of co-scheduled cells that correspond to the DCI format. In one example, the UE can be configured a higher layer parameter based on which the UE determines whether the Type-3 HARQ codebook corresponds to all HARQ processes on all serving cells (per 5G NR Rel-16 specifications) or corresponds to all HARQ processes associated with the set of co-scheduled cells.

In another approach, the DCI format for multi-cell scheduling can trigger generation of a Type-3 CB corresponding to all HARQ processes associated with a subset of serving cells on which co-scheduled PDSCH(s) are scheduled, as indicated by the DCI format. For example, the UE determines the subset of serving cells based on the CIF or a related field in the DCI format that indicates the actually co-schedule cells.

In one example, the UE can be configured a set of 'states' for Type-3 HARQ-ACK generation, wherein each state corresponds to a combination/subset of serving cells from the set of co-scheduled cell. Accordingly, when the UE receives a multi-cell scheduling DCI format that indicate a 'state' from the set of states, the UE generates a Type-3 HARQ codebook corresponding to all HARQ processes associated with serving cells that is indicated by the 'state' in the DCI format.

In one example, higher layers can provide information of a set of HARQ processes for which the UE generates a Type-3 HARQ codebook for the corresponding set/subset of co-scheduled cells, when operating according to the approaches or examples above. The indicated set of HARQ processes can be same for different sets/subsets of co-scheduled cells or for different 'states', or different sets of HARQ processes can be indicated for different sets/subsets of co-scheduled cells or for different 'states'.

In one example, the multi-cell scheduling DCI format can indicate a set of serving cells for Type-3 HARQ codebook generation, wherein the set of serving cells can be different from a corresponding set of co-scheduled cells, including partial or no overlap. For example, the UE can be provided by pdsch-HARQ-ACK-enhType3List (or a multi-cell variant thereof) a list of serving cells and/or corresponding HARQ processes for which the UE can be requested to generate a Type-3 HARQ codebook. For example, a multi-cell scheduling DCI format can include an Enhanced Type 3 codebook indicator field that indicates a row/entry from the configured list. For example, the bit-width of the Enhanced Type 3 codebook indicator field can be 0 bit if pdsch-HARQ-ACK-enhType3DCIfield (or multi-cell variant thereof) is not configured, and can be $\lceil \log_2(n_{CB}) \rceil$ bits such as 1 or 2 or 3 bits otherwise, where $n_{CB}$ is the number of entries in the higher layer parameter pdsch-HARQ-ACK-enhType3List (or multi-cell variant thereof). The Enhanced Type 3 codebook indicator field is a cell-common DCI field that is provided only once in a DCI format for multi-cell scheduling.

The following embodiments of the present disclosure, describe HARQ timeline in presence of two-stage multi-cell scheduling. This is described in the following examples and embodiments.

For a UE that is configured a two-stage DCI format for multi-cell scheduling, the UE determines a minimum PDCCH-to-HARQ ($N_3$) timeline relative to a $2^{nd}$-stage DCI. In addition, when the UE receives a $2^{nd}$-stage DCI in a PDSCH, such as a first PDSCH that is scheduled by a corresponding $1^{st}$-stage DCI, the UE considers an SCS configuration of the (first) PDSCH when determining an SCS configuration for the N3 timeline. An N3/N2 timeline relative to a $2^{nd}$-stage DCI can also be used when the UE determines a minimum time until DL BWP switching.

If a UE determines a first resource for a PUCCH transmission with HARQ-ACK information corresponding only to a PDSCH reception without a corresponding PDCCH or detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_c$ from the beginning of a first symbol of the first resource for PUCCH transmission in the slot where, $\kappa$ and $T_c$ are defined in [REF1, TS 38.211 v16.5.0] and $\mu$ corresponds to the smallest SCS configuration among the SCS configurations of the PDCCHs providing the DCI formats and the SCS configuration of the PUCCH. If the second DCI format is a two-stage DCI format (for multi-cell scheduling), with a $1^{st}$-stage DCI in a first PDCCH, and a $2^{nd}$-stage DCI in a second PDCCH/PDSCH, the UE does not expect to multiplex HARQ-ACK information corresponding to the $2^{nd}$-stage DCI of the second DCI format in a PUCCH resource in the slot if the second PDCCH/PDSCH reception that includes the $2^{nd}$-stage DCI of the second DCI format is not earlier than $N_3 \cdot (2048+144) \cdot \kappa \cdot 2^{-\mu} \cdot T_c$ from the beginning of a first symbol of the first resource for PUCCH transmission in the slot where, $\kappa$ and $T_c$ are defined in [REF1, TS 38.211 v16.5.0] and $\mu$ corresponds to the smallest SCS configuration among the SCS configurations of the PDCCHs providing the DCI formats [including the first PDCCH, and the second PDCCH when applicable], and the SCS configuration of the second PDSCH when applicable, and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=17$ for $\mu=2$, $N_3=20$ for $\mu=3$.

A UE does not expect to detect a DCI format switching a DL BWP within $N_3$ symbols prior to a first symbol of a PUCCH transmission where the UE multiplexes HARQ-ACK information, where $N_3$ is defined in clause 9.2.3 [REF3, TS 38.213 v16.5.0]. If a DCI format is a two-stage DCI format (for multi-cell scheduling), with a $2^{nd}$-stage DCI in a second PDCCH/PDSCH, a UE does not expect to detect/receive the $2^{nd}$-stage DCI of the DCI format switching a DL BWP within $N_3$ symbols prior to a first symbol of a PUCCH transmission where the UE multiplexes HARQ-ACK information, where $N_3$ is defined in clause 9.2.3 of TS 38.213 v16.5.0.

A UE does not expect to detect a DCI format switching a DL BWP within $N_2$ symbols prior to a first symbol of a PUSCH transmission where the UE multiplexes HARQ-ACK information, where $N_2$ is defined in [REF4, TS 38.214 v16.5.0]. If a DCI format is a two-stage DCI format (for multi-cell scheduling), with a $2^{nd}$-stage DCI in a second PDCCH/PDSCH, a UE does not expect to detect/receive the $2^{nd}$-stage DCI of the DCI format switching a DL BWP within $N_2$ symbols prior to a first symbol of a PUSCH transmission where the UE multiplexes HARQ-ACK information, where $N_2$ is defined in [REF4, TS 38.214 v16.5.0].

$N_2$ is based on $\mu$ of Table 6.4-1 and Table 6.4-2 of [REF4, TS 38.214 v16.5.0] for UE processing capability 1 and 2 respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined in clause 4.1 of [REF1, TS 38.211 v16.5.0]. If the PUSCH is (among a set of PUSCHs jointly) scheduled by a two-stage DCI format, with a $1^{st}$-stage DCI in a first PDCCH, and a $2^{nd}$-stage DCI in a second PDCCH/PDSCH, $\mu$ corresponds to the one of ($\mu_{DL1}$, $\mu_{DL2}$, $\mu_{UL}$) resulting with the largest $T_{proc,2}$, where the $\mu_{DL1}$ corresponds to the subcarrier spacing of the downlink with which the first PDCCH carrying the $1^{st}$-stage of the DCI scheduling the PUSCH was transmitted, and $\mu_{DL2}$ corresponds to the subcarrier spacing of the downlink with which the second PDCCH/PDSCH carrying the $2^{nd}$-stage of the DCI scheduling the PUSCH was transmitted, and $\mu_{UL}$ corresponds to the subcarrier spacing of the uplink channel with which the PUSCH is to be transmitted.

The following embodiments of the present disclosure, describe multiplexing HARQ-ACK feedback on co-scheduled PUSCHs. This is described in the following examples and embodiments.

For a UE configured with multi-cell scheduling for PUSCHs, the specifications for system operation may not allow HARQ-ACK multiplexing on co-scheduled PUSCHs, for example, to reduce DCI format size. When multiplexing HARQ-ACK feedback on co-scheduled PUSCHs is supported, an UL DAI field can be a cell-common parameter that applies to all co-scheduled PUSCHs or can be a cell-specific parameter that applies to a reference cell from the co-scheduled cells, such as a first or a last PUSCH. When a DCI format for multi-cell scheduling of PUSCHs is configured to be a two-stage DCI, the UE can receive the UL DAI in the $2^{nd}$-stage DCI. A PUSCH that multiplexes HARQ-ACK information/codebook overlaps with a corresponding PUCCH.

In a first realization, the UE does not expect to multiplex HARQ-ACK information on a PUSCH from a set of co-scheduled PUSCHs. In particular, the UE does not expect that a DCI format for multi-cell scheduling of PUSCHs includes an UL DAI field. Such UE behavior can be beneficial, for example, to maintain a manageable size for a DCI format for multi-cell scheduling, especially when DL DAI is per scheduled PDSCH (instead of per DCI format) or when a number of Type-2 sub-CBs is large, and therefore a size of an UL DAI field is large.

In a second realization, the UE can multiplex HARQ-ACK information only on a last (or on a first) PUSCH among the co-scheduled PUSCHs, based on a value of UL DAI that is provided in the DCI format for multi-cell scheduling. Herein, the last (or the first) PUSCH can refer to a PUSCH that: (i) ends (or starts) in a latest (or first) slot/symbol, among the co-scheduled PUSCHs, (w.r.t.: an SCS configuration for an associated cell with PUCCH configuration (such as the PCell), or an SCS configuration for a corresponding scheduling cell, or a largest (or smallest) SCS configuration among co-scheduled cells/PUSCHs, or an SCS configuration provided by higher layers, or a pre-determined SCS configuration, such as 30 kHz in FR1 and 120 kHz in FR2), or (ii) corresponds to a cell, among the co-scheduled cells, with a largest (or smallest) cell index or CIF, or (iii) corresponds to a cell, among the co-scheduled cells, with a largest (or smallest) SCS, or (iv) corresponds to a cell, among the co-scheduled cells, that is indicated last in the DCI format for multi-cell scheduling, if the DCI format includes an ordered indication for the set of co-scheduled cells, or (v) a combination thereof (such as last/first in ascending order of SCS configuration, and then last/first in ascending order of cell index/CIF).

In a third realization, the UE can multiplex HARQ-ACK information on all co-scheduled PUSCHs. In one variation, the UE is provided a single UL DAI field that is commonly applicable to all co-scheduled PUSCHs. In another variation, the UE is provided separate UL DAI fields, each of which is applicable to one PUSCH from the co-scheduled PUSCHs.

In on example, when a DCI format for multi-cell scheduling of PUSCHs is a two-stage DCI, the UE expects to receive the UL DAI field(s) in the $2^{nd}$-stage DCI, which can be included in a first PDSCH that is scheduled by a corresponding $1^{st}$-stage DCI.

A UE procedure from among the above realizations can be predetermined in the specifications, such as HARQ-ACK multiplexing only on a last (or first) PUSCH or can be provided by higher layer configuration.

The UE determines a size of an UL DAI field in a DCI format for multi-cell scheduling of PUSCHs to be same as a size of an UL DAI field in a UL DCI format for single cell-scheduling of a single PUSCH. When the UE generates a number of Type-2 sub-CBs, the UE expects that an UL DAI field in a DCI format for multi-cell scheduling of PUSCHs includes a same number of UL DAI sub-fields, each corresponding to one of the Type-2 sub-CBs.

In a fourth realization, the UE multiplexes HARQ-ACK information on the PUSCH, from the co-scheduled PUSCHs, that the UE transmits on a cell having the smallest index among the cells with the co-scheduled PUSCH transmissions In one embodiment, for determining a PUSCH that can multiplex HARQ-ACK information (or UCI, in general), a UE assigns a same priority level to a first PUSCH that is scheduled by a DCI format 0_0 as a second PUSCH that is a Type-1 or Type-2 configured grant PUSCH. In another example, the UE assigns a lower priority level to a first PUSCH that is scheduled by a DCI format 0_0 than a second PUSCH that is a Type-1 or Type-2 configured grant PUSCH.

The following embodiments of the present disclosure, describe OoO scheduling in presence of multi-cell scheduling. This is described in the following examples and embodiments.

For a UE configured with multi-cell scheduling, and when the UE does not support out-of-order (OoO) scheduling, as described in TS 38.214 v16.5.0, the UE expects that a DCI format for multi-cell scheduling satisfies the "in-order" scheduling property in a same way as a DCI format for single-cell scheduling. To achieve this property, the OoO property can be defined across all serving cells or across pairs of sets/groups of serving cells, rather than pairs of individual serving cells. In a simplified variation, the OoO property is defined with respect to only a first/earliest PDSCH or PUSCH indicated by a DCI format for multi-cell scheduling (rather than all co-scheduled PDSCHs or PUSCHs).

In one example, when a DCI format (for multi-cell scheduling) is a two-stage DCI, the OoO property can be defined with respect to a stage that leads to a tighter constraint. For example, the OoO property can be defined with respect to the $2^{nd}$-stage DCI when the two-stage DCI format is an earlier DCI, and the OoO property can be defined with respect to the $1^{st}$-stage DCI when the two-stage DCI format is a later DCI.

In one example, a DCI format for multi-cell scheduling can include a PUCCH Cell indicator field that can indicate an alternative PUCCH cell, such as a PUCCH sSCell, that the UE can use for PUCCH transmission, for example, for transmission of HARQ-ACK feedback information corresponding to the co-scheduled PDSCHs or for CSI reporting corresponding to the set of co-scheduled cells.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   receiving:
      first information for a set of cells,
      second information for first time-domain resource allocation (TDRA) tables, corresponding to respective cells from the set of cells, wherein:
         a first TDRA table, from the first TDRA tables, corresponds to a cell from the set of cells, and
         entries of the first TDRA table indicate respective first time resources for receptions of respective first physical downlink shared channels (PDSCHs) on the cell, and
      third information for a second TDRA table corresponding to the set of cells, wherein an entry of the second TDRA table indicates second time resources for receptions of second PDSCHs on the set of cells;
   determining acknowledgment information corresponding to the set of cells based on rows of the first TDRA tables; and
   transmitting a physical uplink control channel (PUCCH) with the acknowledgment information.

2. The method of claim 1, wherein:
   the second time resources include a time resource that corresponds to a PDSCH, from the second PDSCHs, on the cell, and
   the time resource is among the first time resources indicated by entries of the first TDRA table.

3. The method of claim 1, wherein acknowledgment information corresponding to the second PDSCHs have a same priority level.

4. The method of claim 1, wherein the second PDSCHs have a same sub-carrier spacing (SCS) and a same cyclic prefix.

5. The method of claim 1, further comprising:
   receiving fourth information indicating a first set of downlink-data-to-acknowledgment slot timing (K1) values, wherein a K1 value from the first set of K1 values is indicated by a first downlink control information (DCI) format scheduling the receptions of the second PDSCHs on the set of cells;
   receiving the second PDSCHs; and
   determining, with reference to slots of PUCCH transmissions, a slot for the PUCCH transmission to be after a slot of a reference PDSCH, from the second PDSCHs, by a number of slots indicated by the K1 value,
   wherein the reference PDSCH is a PDSCH that ends last.

6. The method of claim 1, wherein the set of cells are in a same PUCCH group.

7. A user equipment (UE) comprising:
   a transceiver configured to receive:
      first information for a set of cells,
      second information for first time-domain resource allocation (TDRA) tables, corresponding to respective cells from the set of cells, wherein:
         a first TDRA table, from the first TDRA tables, corresponds to a cell from the set of cells, and
         entries of the first TDRA table indicate respective first time resources for receptions of respective first physical downlink shared channels (PDSCHs) on the cell, and
      third information for a second TDRA table corresponding to the set of cells, wherein an entry of the second TDRA table indicates second time resources for receptions of second PDSCHs on the set of cells; and
   a processor operably coupled to the transceiver, the processor configured to determine acknowledgment information corresponding to the set of cells based on rows of the first TDRA tables,
   wherein the transceiver is further configured to transmit a physical uplink control channel (PUCCH) with the acknowledgment information.

8. The UE of claim 7, wherein:
   the second time resources include a time resource that corresponds to a PDSCH, from the second PDSCHs, on the cell, and
   the time resource is among the first time resources indicated by entries of the first TDRA table.

9. The UE of claim 7, wherein acknowledgment information corresponding to the second PDSCHs have a same priority level.

10. The UE of claim 7, wherein the second PDSCHs have a same sub-carrier spacing (SCS) and a same cyclic prefix.

11. The UE of claim 7, wherein:
    the transceiver is further configured to receive:
       fourth information indicating a first set of downlink-data-to-acknowledgment slot timing (K1) values, wherein a K1 value from the first set of K1 values is indicated by a first downlink control information (DCI) format scheduling the receptions of the second PDSCHs on the set of cells, and
       the second PDSCHs;
    the processor is further configured to determine, with reference to slots of PUCCH transmissions, a slot for the PUCCH transmission to be after a slot of a reference PDSCH reception, from the first second PDSCHs, by a number of slots indicated by the K1 value; and
    the reference PDSCH is a PDSCH that ends last.

12. The UE of claim 7, wherein the set of cells are in a same PUCCH group.

13. A base station comprising:
    a transceiver configured to:
       transmit first information for a set of cells,
       transmit second information for first time-domain resource allocation (TDRA) tables, corresponding to respective cells from the set of cells, wherein:
          a first TDRA table, from the first TDRA tables, corresponds to a cell from the set of cells, and
          entries of the first TDRA table indicate respective first time resources for transmissions of respective first physical downlink shared channels (PDSCHs) on the cell,
       transmit third information for a second TDRA table corresponding to the set of cells, wherein an entry of the second TDRA table indicates second time resources for transmissions of second PDSCHs on the set of cells, and
       receive a physical uplink control channel (PUCCH) with acknowledgment information; and
    a processor operably coupled to the transceiver, the processor configured to determine the acknowledgment information corresponding to the set of cells based on rows of the first TDRA tables.

14. The base station of claim 13, wherein:
    the second time resources include a time resource that corresponds to a PDSCH, from the second PDSCHs, on the cell, and
    the time resource is among the first time resources indicated by entries of the first TDRA table.

15. The base station of claim 13, wherein acknowledgment information corresponding to the second PDSCHs have a same priority level.

16. The base station of claim 13, wherein the second PDSCHs have a same sub-carrier spacing (SCS) and a same cyclic prefix.

17. The base station of claim 13, wherein:
the transceiver is further configured to transmit:
fourth information indicating a first set of downlink-data-to-acknowledgment slot timing (K1) values, wherein a K1 value from the first set of K1 values is indicated by a first downlink control information (DCI) format scheduling the transmissions of the second PDSCHs on the set of cells, and
the second PDSCHs;
the processor is further configured to determine, with reference to slots of PUCCH receptions, a slot for the PUCCH reception to be after a slot of a reference PDSCH transmission, from the second PDSCHs, by a number of slots indicated by the K1 value; and
the reference PDSCH is a PDSCH that ends last.

18. The base station of claim 17, wherein the first set of K1 values is same as a second set of K1 values corresponding to second DCI formats each scheduling a transmission of a PDSCH from the first PDSCHs.

19. The method of claim 5, wherein the first set of K1 values is same as a second set of K1 values corresponding to second DCI formats each scheduling a reception of a PDSCH from the first PDSCHs.

20. The UE of claim 11, wherein the first set of K1 values is same as a second set of K1 values corresponding to second DCI formats each scheduling a reception of a PDSCH from the first PDSCHs.

* * * * *